(12) United States Patent
Boettcher et al.

(10) Patent No.: US 10,899,394 B2
(45) Date of Patent: Jan. 26, 2021

(54) STRUCTURAL REINFORCEMENT MEMBER FOR A VEHICLE BODY

(71) Applicant: Honda Motor Co., Ltd., Tokyo (JP)

(72) Inventors: Eric J. Boettcher, Columbus, OH (US); Derik Thomas Voigt, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 16/253,801

(22) Filed: Jan. 22, 2019

(65) Prior Publication Data

US 2019/0152534 A1    May 23, 2019

Related U.S. Application Data

(63) Continuation of application No. 15/668,015, filed on Aug. 3, 2017, now Pat. No. 10,232,886, which is a (Continued)

(51) Int. Cl.
*B62D 25/04* (2006.01)
*B62D 25/02* (2006.01)
(Continued)

(52) U.S. Cl.
CPC ........... *B62D 25/04* (2013.01); *B62D 21/157* (2013.01); *B62D 25/025* (2013.01);
(Continued)

(58) Field of Classification Search
CPC .... B62D 25/04; B62D 21/157; B62D 25/025; B62D 27/026; B62D 29/001; B62D 29/005; F16F 7/003; F16F 7/121; F16F 7/124
See application file for complete search history.

(56) References Cited

U.S. PATENT DOCUMENTS

| 5,613,727 A | 3/1997 | Yamazaki |
| 6,305,136 B1 | 10/2001 | Hopton et al. |

(Continued)

FOREIGN PATENT DOCUMENTS

| DE | 102009044417 | 5/2011 |
| EP | 2154052 | 2/2010 |

(Continued)

OTHER PUBLICATIONS

Chinese Office Action for Chinese patent application No. 201610210505. X, dated Dec. 21, 2018, 15 pages (English and Chinese).

*Primary Examiner* — Lori L Lyjak
(74) *Attorney, Agent, or Firm* — Rankin, Hill & Clark LLP

(57) ABSTRACT

A vehicle body includes a structural member having an inner surface defining an elongated cavity. The structural member includes an outer panel member joined to an inner panel member. A reinforcement member is positioned in the cavity wherein a gap is provided between the reinforcement member and the inner surface of the structural member. The reinforcement member includes an outer section, an inner section and a tension web interposed between and contacting the outer section and inner section. The outer section faces the outer panel member and the inner section faces the inner panel member. The tension web is secured to the outer panel member and inner panel member. An adhesive secured to the reinforcement member is activatable to expand toward the inner surface of the structural member to define a joint between the reinforcement member and the structural member and to at least partially fill the gap.

20 Claims, 57 Drawing Sheets

Related U.S. Application Data continuation of application No. 15/019,404, filed on Feb. 9, 2016, now Pat. No. 9,758,193.

(60) Provisional application No. 62/158,878, filed on May 8, 2015, provisional application No. 62/114,105, filed on Feb. 10, 2015.

(51) Int. Cl.
  *B62D 27/02* (2006.01)
  *B62D 29/00* (2006.01)
  *B62D 21/15* (2006.01)
  *F16F 7/00* (2006.01)
  *F16F 7/12* (2006.01)

(52) U.S. Cl.
  CPC ......... *B62D 27/026* (2013.01); *B62D 29/001* (2013.01); *B62D 29/005* (2013.01); *F16F 7/003* (2013.01); *F16F 7/121* (2013.01); *F16F 7/124* (2013.01)

(56) References Cited

U.S. PATENT DOCUMENTS

| | | |
|---|---|---|
| 6,341,467 B1 | 1/2002 | Wycech |
| 6,941,719 B2 | 9/2005 | Busseuil et al. |
| 7,105,112 B2 | 9/2006 | Czaoplicki et al. |
| 8,002,339 B2 | 8/2011 | Rill et al. |
| 8,011,721 B2 | 9/2011 | Yamada et al. |
| 8,366,185 B2 | 2/2013 | Herntier |
| 8,409,725 B2 | 4/2013 | Hashimura et al. |
| 9,227,666 B2 | 1/2016 | Yoshioka et al. |
| 2007/0101679 A1 | 5/2007 | Harthcock et al. |
| 2008/0202674 A1 | 8/2008 | Schneider et al. |
| 2014/0292007 A1 | 10/2014 | Kawamata et al. |

FOREIGN PATENT DOCUMENTS

| | | |
|---|---|---|
| JP | H05270447 | 10/1993 |
| JP | H07117727 | 5/1995 |
| WO | 2015157250 | 10/2015 |

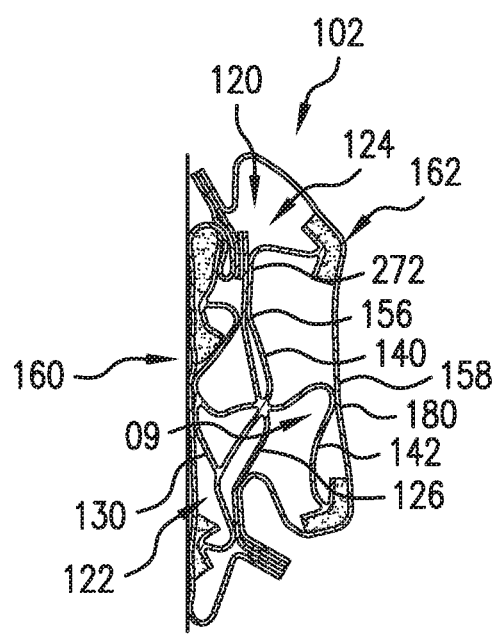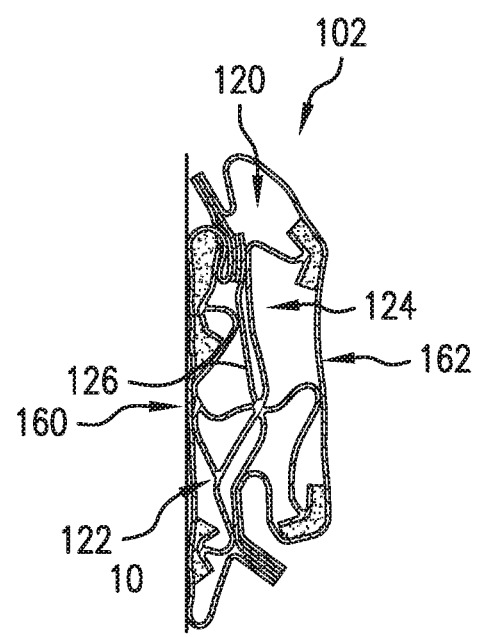

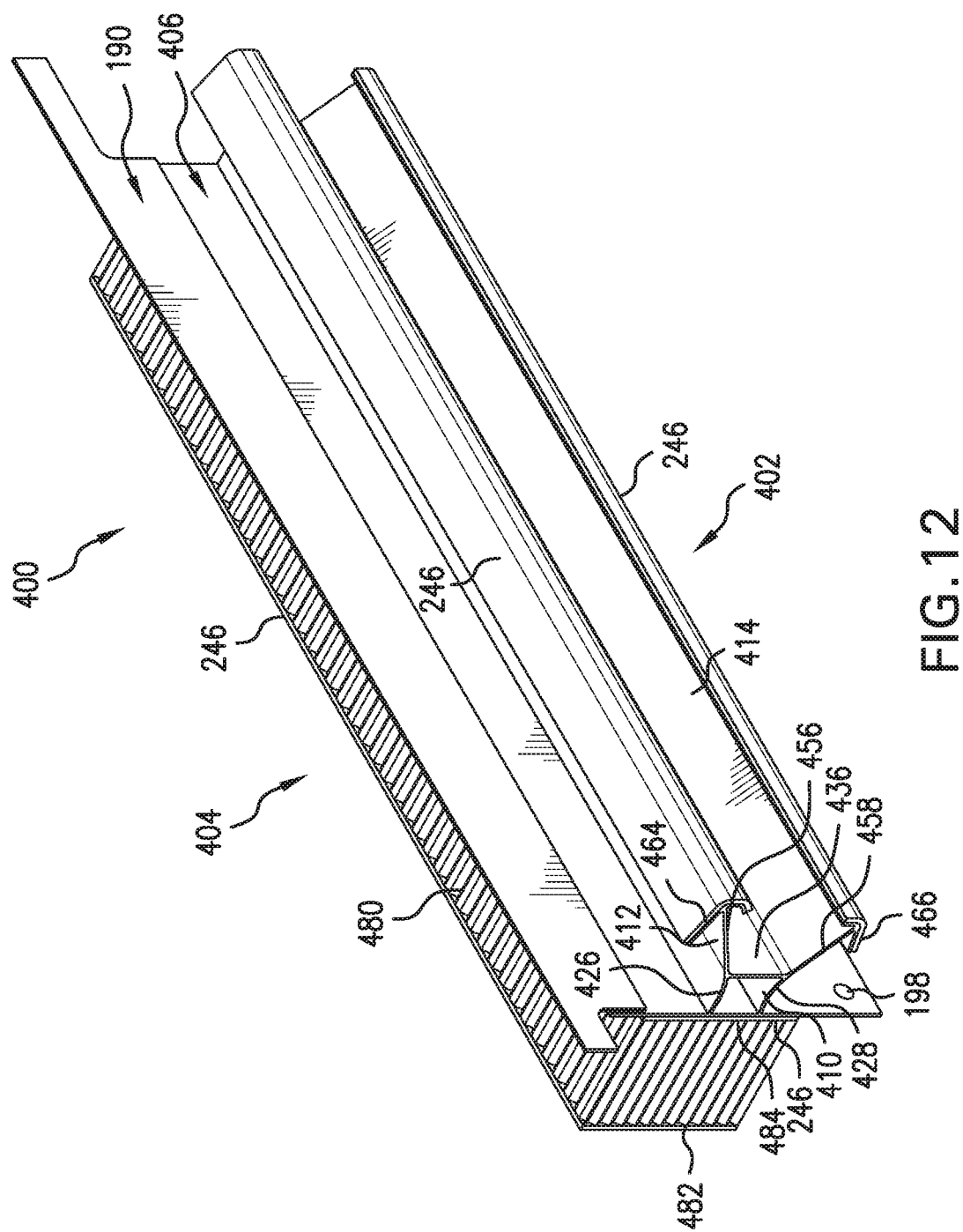

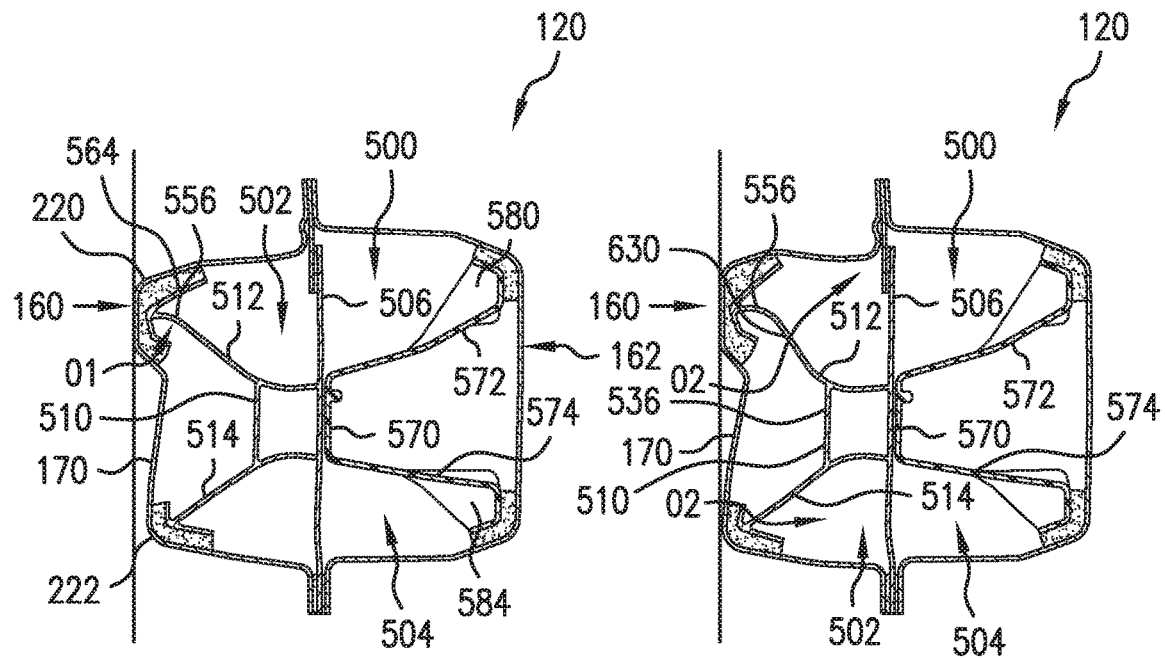
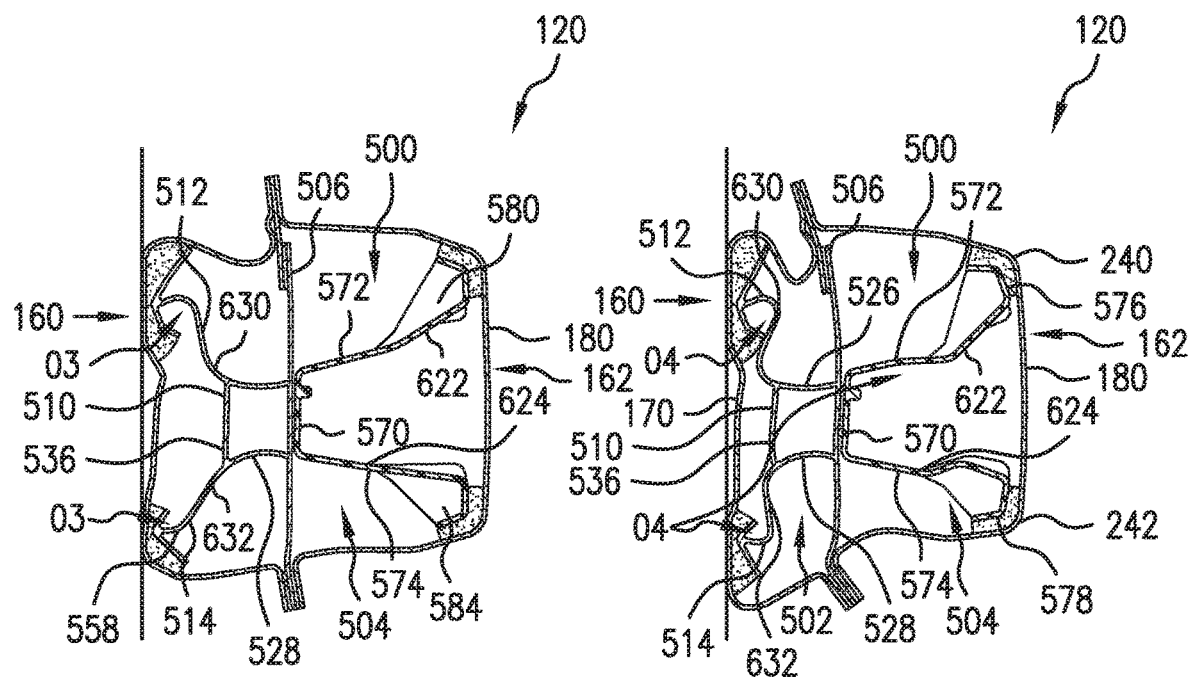

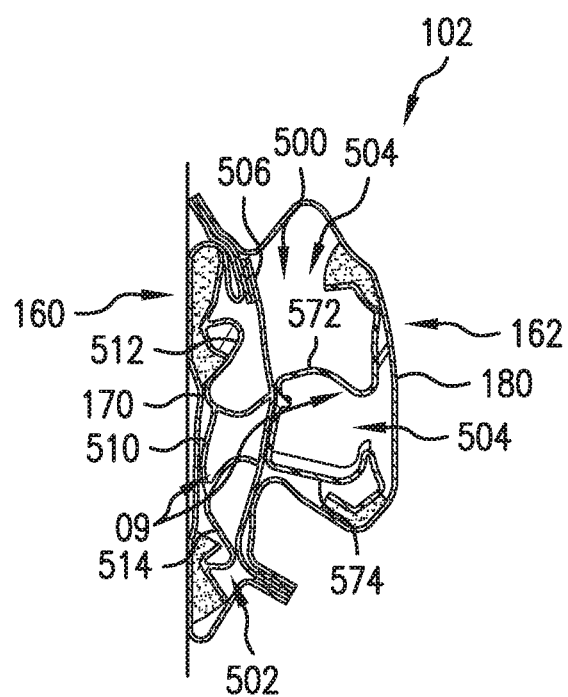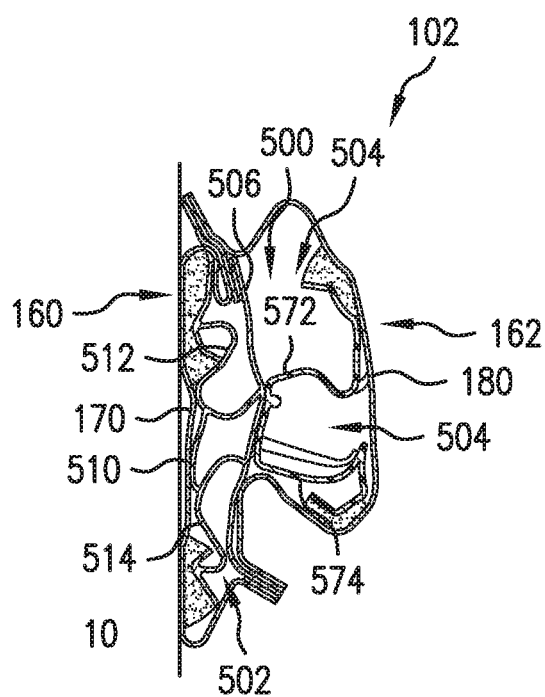

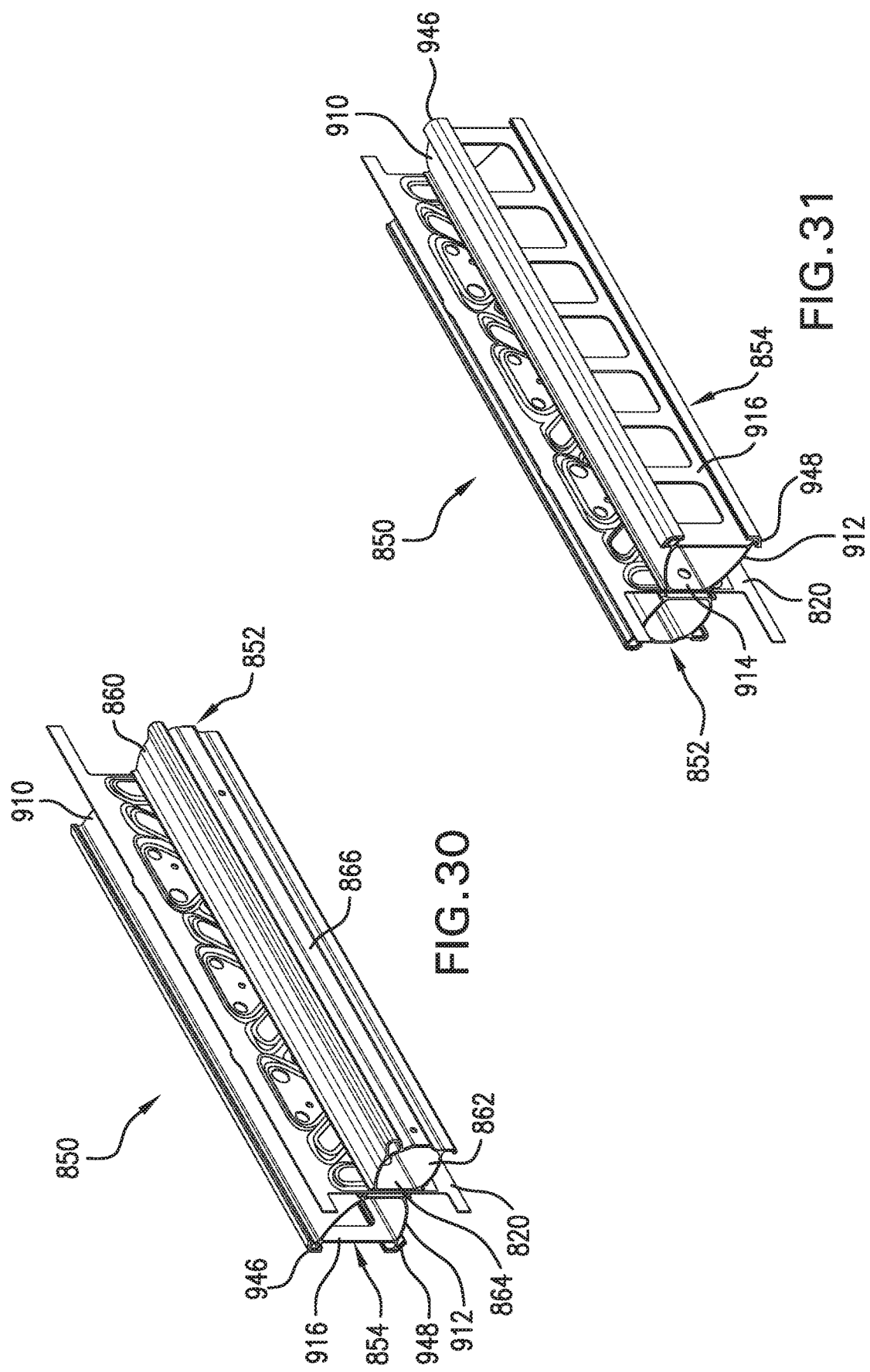

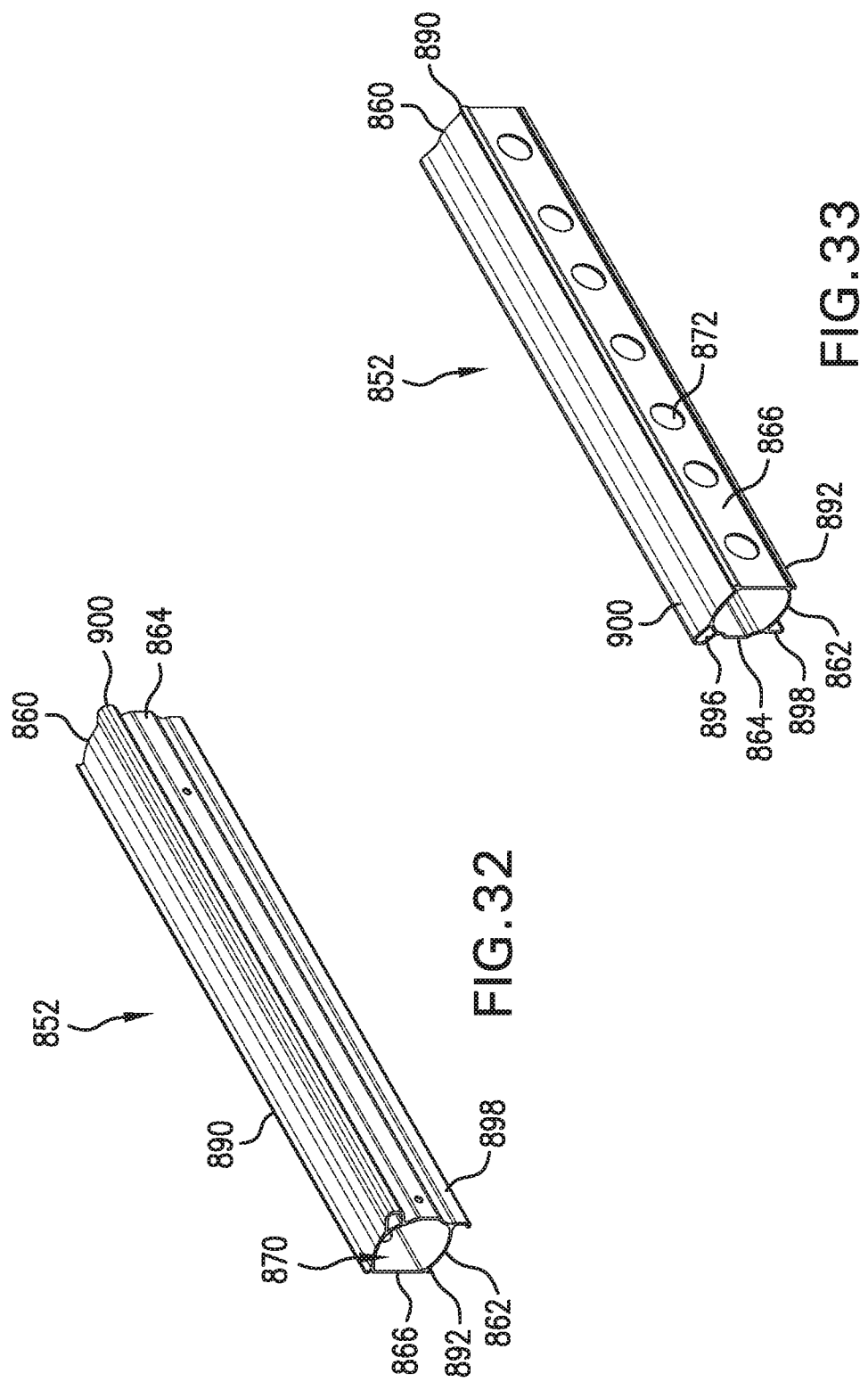

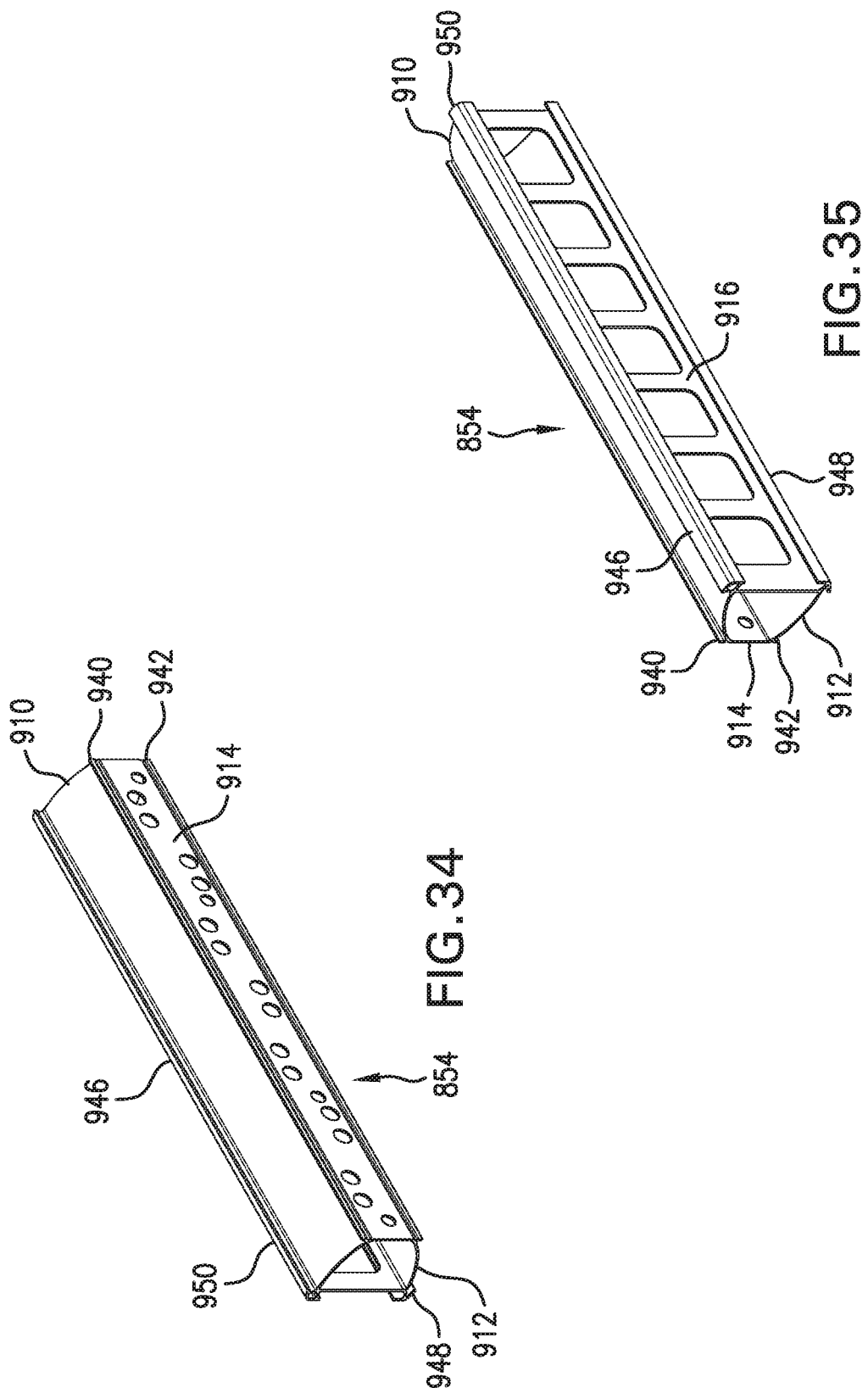

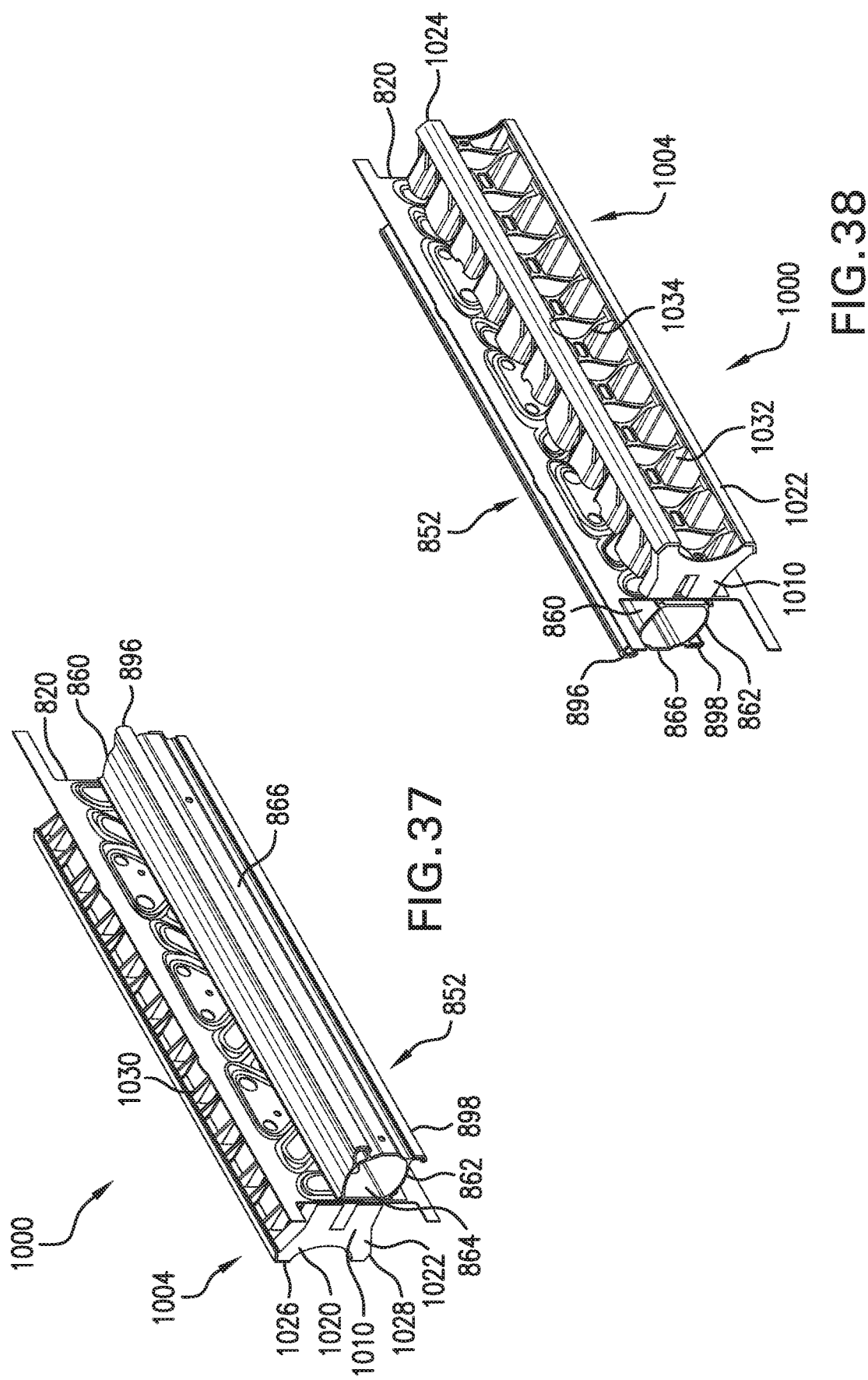

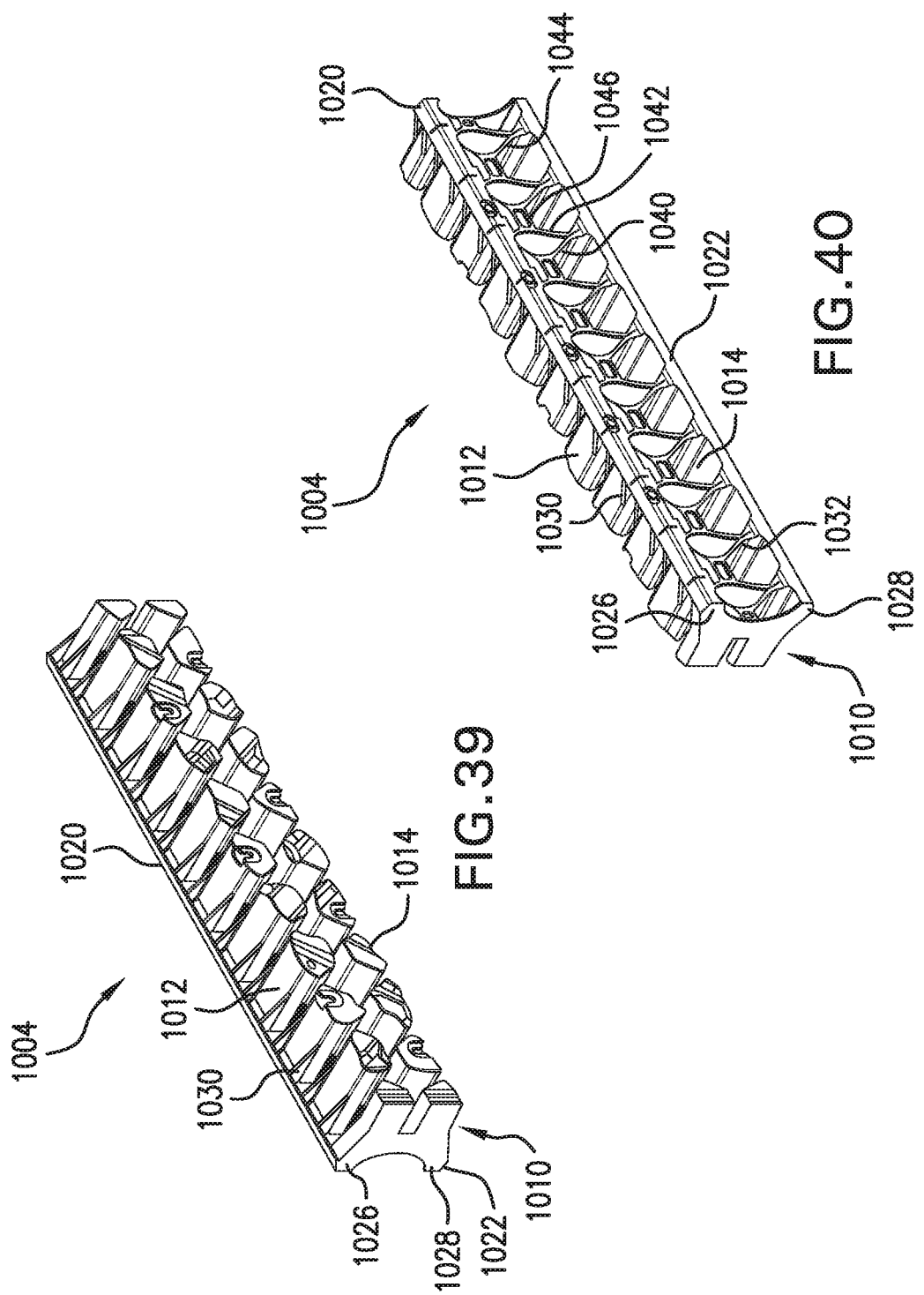

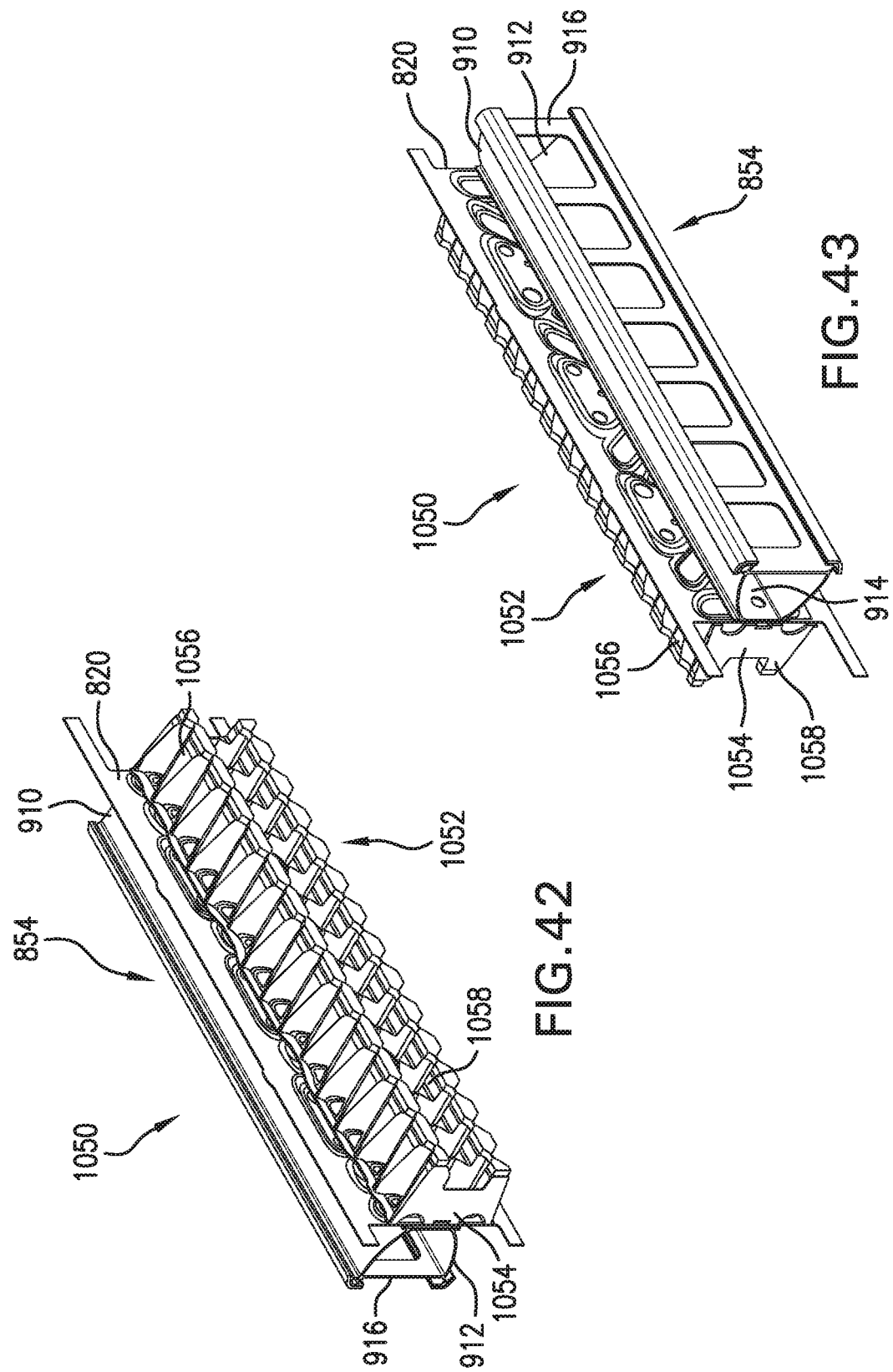

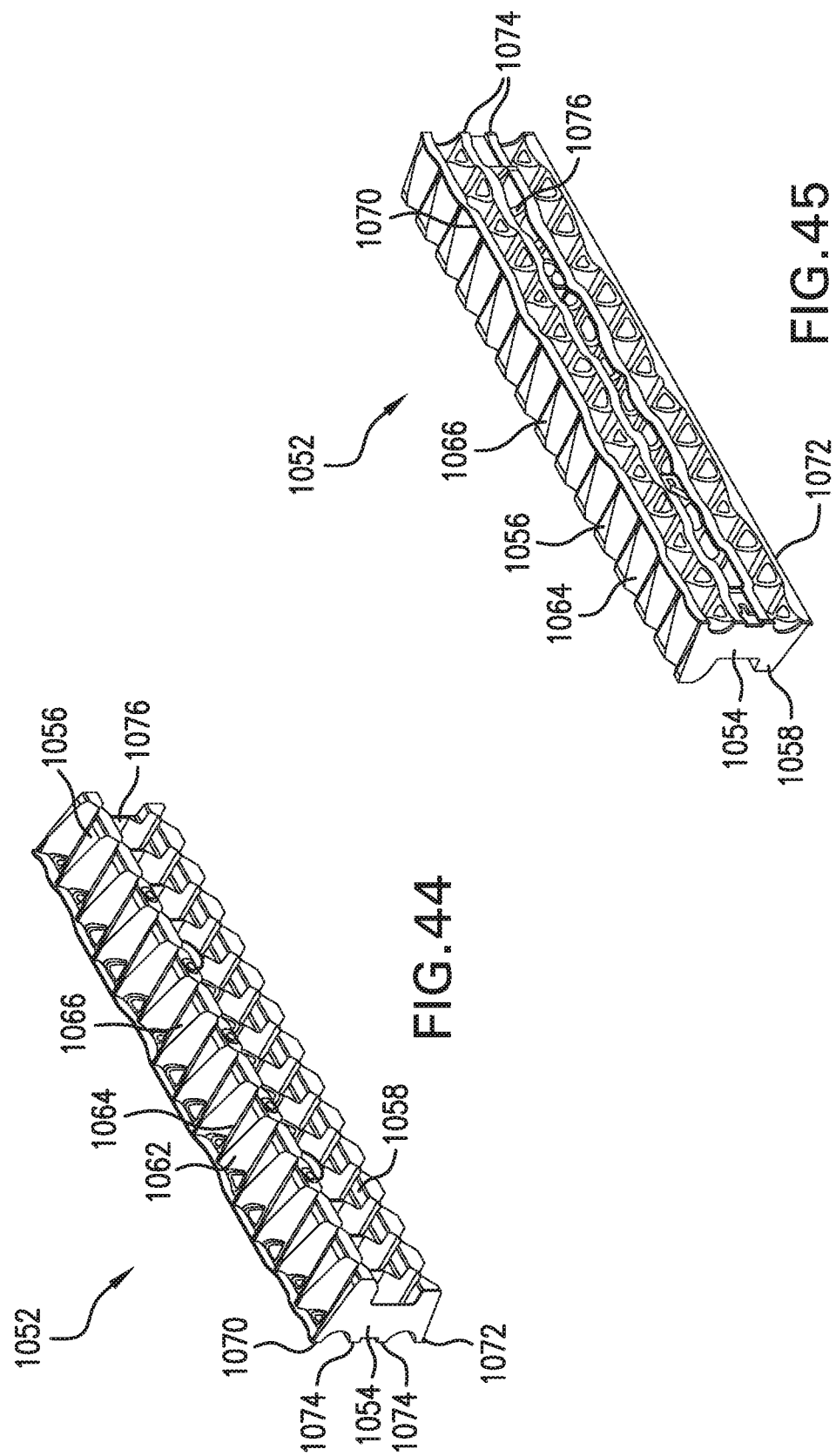

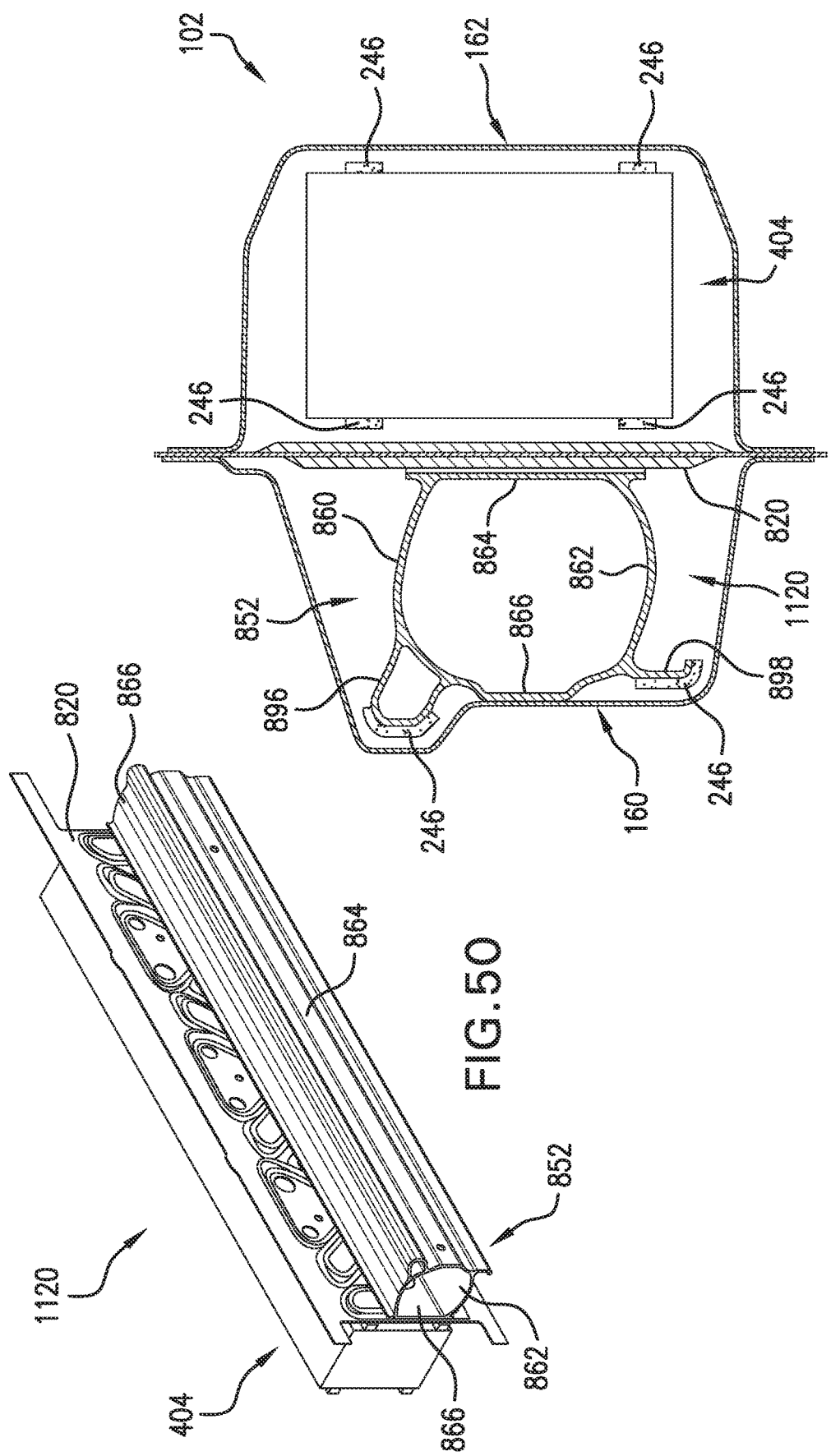

STRUCTURAL REINFORCEMENT MEMBER FOR A VEHICLE BODY

The present application is a continuation of U.S. patent application Ser. No. 15/668,015, filed Aug. 3, 2017, which claims priority to U.S. patent application Ser. No. 15/019,404, filed Feb. 9, 2016, which claims priority to U.S. Prov. Patent Appl. Ser. No. 62/114,105, filed Feb. 10, 2015, and U.S. Prov. Patent Appl. Ser. No. 62/158,878, filed May 8, 2015, the disclosures of each being incorporated herein by reference.

BACKGROUND

The trends in vehicle design are towards lighter vehicles to improve fuel consumption. At the same time, manufacturers continue to demand more rigorous structural performance standards. The use of lighter hollow cross-sectional structural members that are used to form a vehicle body has lead to the need for additional reinforcement members in various locations in the vehicle body. As is well known, the vehicle body generally undergoes an electrocoat process in which the vehicle body is passed through a bath of anticorrosion fluid whereby an anticorrosion coating is deposited onto the vehicle body by electrolysis. The vehicle body is subsequently heated to bake the coating on the metal. Therefore, it is desirable that the reinforcement member does not prevent the provision of the anticorrosion coating on the inner surface of the hollow member by the electrocoat process.

It is known to provide longitudinal reinforcement members within the hollow structural members of the vehicle body. The reinforcement member is typically provided with an expandable adhesive on two surfaces, which can be foamed upon heating to bond the reinforcement member to two opposed walls of the structural member. However, this technique is not suitable for use in the electrocoat process described above as it can prevent the proper electrocoat over the entire inner surface of the structural member, which can lead to local areas of corrosion. Another known reinforcement member includes a light weight and high strength aluminum insert. However, it is difficult to isolate the aluminum insert from the structural member, which is typically formed of steel or steel alloy, and to correctly position the reinforcement member inside the structural member. It is also known to provide foamable plastic moldings within the structural members which can be foamed upon application of heat, such as is provided by the baking step in the electrocoat process, to provide a foamed baffle that fills the cross-section to provide sound adsorption. These moldings are generally used to provide acoustic baffles and seals.

BRIEF DESCRIPTION

In accordance with one aspect, a vehicle body comprises a structural member having an inner surface defining an elongated cavity. The structural member includes an outer panel member joined to an inner panel member. A reinforcement member is positioned in the cavity of the structural member wherein a gap is provided between the reinforcement member and the inner surface of the structural member. The reinforcement member includes an outer section, an inner section and a tension web interposed between and contacting the outer section and inner section. The outer section faces the outer panel member and the inner section faces the inner panel member. The tension web is secured to the outer panel member and inner panel member. An adhesive is secured to the reinforcement member. The adhesive is activatable to expand toward the inner surface of the structural member to define a joint between the reinforcement member and the structural member and to at least partially fill the gap.

In accordance with another aspect, a structural reinforcement member for a vehicle body is provided. The vehicle body includes a structural member having an inner surface and defining an elongated cavity. The structural member includes a first metal or metal alloy. The reinforcement member is adapted for insertion in the elongated cavity with a gap between the reinforcement member and the inner surface. The reinforcement member comprises an outer section, an inner section and a tension web interposed between the inner and outer sections. The outer section includes a plurality of laterally extending projections adapted to be secured to the inner surface of the structural member. The inner section includes a plurality of laterally extending projections configured to be secured to the tension web. Each of the outer section and the inner section includes a reinforced polymer.

In accordance with yet another aspect, a method of reinforcing a structural member of a vehicle body is provided. The structural member includes an inner surface defining an elongated cavity, and an outer panel member joined to an inner panel member. The method comprises providing a reinforcement member including an outer section, an inner section and a tension web interposed between and directly secured to the outer and inner sections; providing an adhesive on the reinforcement member; securing the tension web to the structural member so that the tension web substantially separates the outer and inner panel members; providing a gap between the adhesive and the inner surface of the structural member prior to activation of the adhesive; and activating the adhesive to expand the adhesive outward from the reinforcement member into engagement with the inner surface of the structural member.

In accordance with yet another aspect, a vehicle body comprises a structural member having an inner surface defining an elongated cavity. The structural member includes an outer panel member joined to an inner panel member. A reinforcement member is positioned in the cavity of the structural member wherein a gap is provided between the reinforcement member and the inner surface of the structural member. The reinforcement member includes an outer section facing the outer panel member and having a closed cross-sectional portion, a separate inner section facing the inner panel member, and a tension web interposed between and contacting the outer section and inner section. The tension web is secured to the outer panel member and inner panel member. The closed cross-sectional portion is adapted to increase stiffness and stability to the tension web. An adhesive is secured to the reinforcement member. The adhesive is activatable to expand toward the inner surface of the structural member to define a joint between the reinforcement member and the structural member and to at least partially fill the gap.

In accordance with yet another aspect, a structural reinforcement member for a vehicle body is provided. The vehicle body includes a structural member having an inner surface and defining an elongated cavity. The structural member includes a first metal or metal alloy. The reinforcement member is adapted for insertion in the elongated cavity with a gap between the reinforcement member and the inner surface. The reinforcement member comprises an outer section, an inner section and a tension web interposed between the inner and outer sections. The outer section includes a closed cross-sectional portion having a side wall part spaced from and substantially parallel to the tension web. The closed cross-sectional portion is in direct contact with the tension web. The outer section and the tension web include a second metal or metal alloy different than the first metal or metal alloy. The inner section includes one of the first metal or metal alloy, the second metal or metal alloy, a reinforced polymer, and a honeycomb structure.

BRIEF DESCRIPTION OF THE DRAWINGS

FIGS. 6A-6J depict the displacement of the structural member and reinforcement member of FIG. 4 at selected points on the graph of FIG. 5.

FIG. 12 is a perspective view of an exemplary reinforcement member according to another embodiment of the present disclosure for the structural member of the vehicle body portion of FIG. 1.

FIGS. 21A-21J depict the displacement of the structural member and reinforcement member of FIG. 17A at selected points on the graph of FIG. 20.

FIGS. 30 and 31 are perspective views of an exemplary reinforcement member according to a further embodiment of the present disclosure for the structural member of the vehicle body portion of FIG. 1.

FIGS. 32 and 33 are perspective views of an outer section for the reinforcement member of FIGS. 30 and 31.

FIGS. 34 and 35 are perspective views of an inner section for the reinforcement member of FIGS. 30 and 31.

FIGS. 37 and 38 are perspective views of an exemplary reinforcement member according to a further embodiment of the present disclosure for the structural member of the vehicle body portion of FIG. 1.

FIGS. 39 and 40 are perspective views of an inner section for the reinforcement member of FIGS. 30 and 31.

FIGS. 42 and 43 are perspective views of an exemplary reinforcement member according to a further embodiment of the present disclosure for the structural member of the vehicle body portion of FIG. 1.

FIGS. 44 and 45 are perspective views of an outer section for the reinforcement member of FIGS. 30 and 31.

FIG. 50 is a perspective view of an exemplary reinforcement member according to a further embodiment of the present disclosure for the structural member of the vehicle body portion of FIG. 1.

FIG. 51 is a cross-sectional view of the structural member of the vehicle body portion of FIG. 1 taken along line A-A of FIG. 1, the structural member including the reinforcement member of FIG. 50 prior to attachment to the structural member.

DETAILED DESCRIPTION

It should, of course, be understood that the description and drawings herein are merely illustrative and that various modifications and changes can be made in the structures disclosed without departing from the present disclosure. In general, the figures of the exemplary structural reinforcement members are not to scale. As used herein, width or lateral directions are transverse across the vehicle body, i.e., left and right directions, and the terms inner and outer are relative to the width direction of the vehicle body. Likewise, longitudinal directions refer to forward and rearward directions of vehicle travel, and the vertical directions relate to elevation, i.e., upward and downward directions. It will also be appreciated that the various identified components of the exemplary structural reinforcement members disclosed herein are merely terms of art that may vary from one manufacturer to another and should not be deemed to limit the present disclosure.

Figure 1:
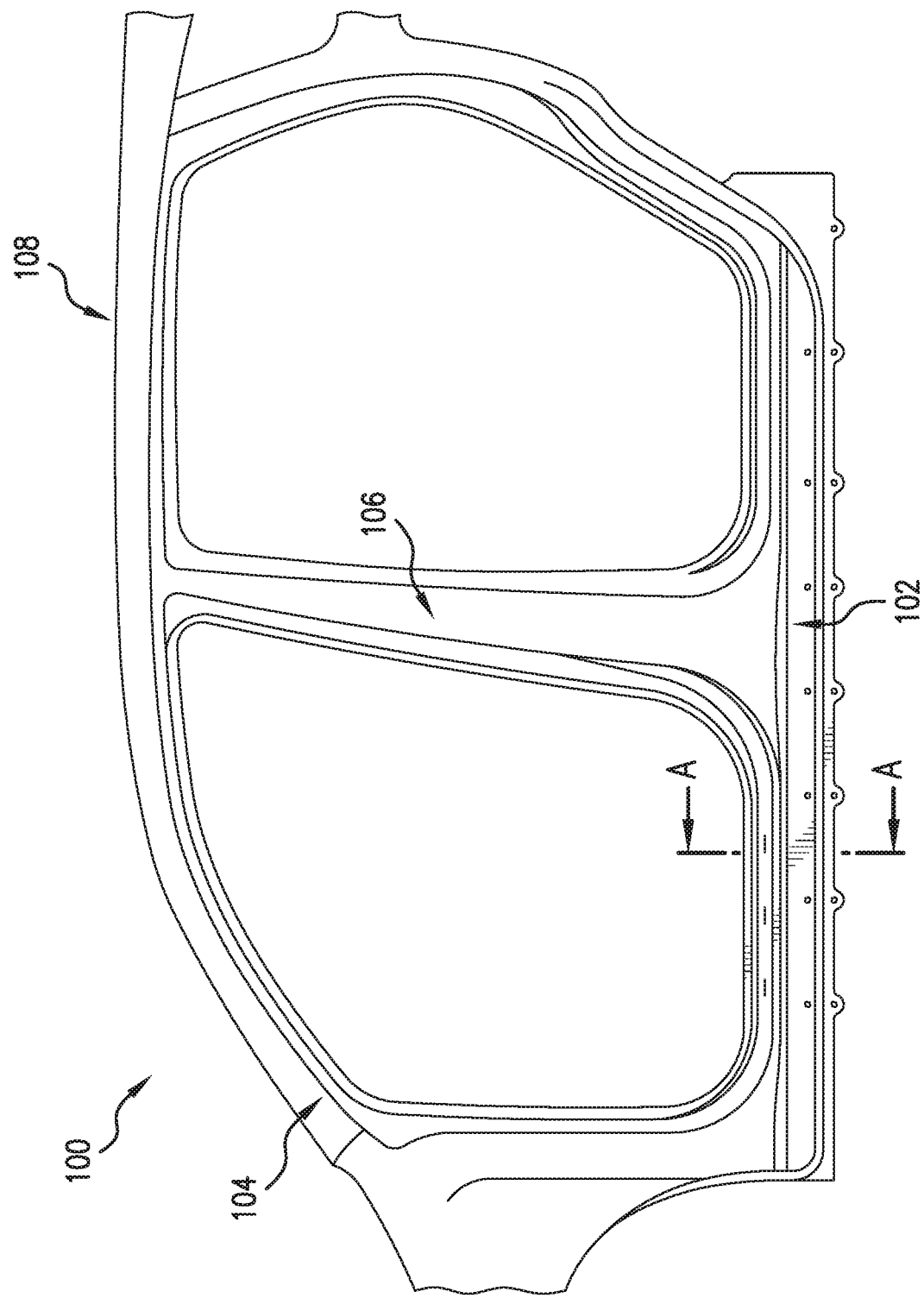
FIG. 1 is a schematic view of a portion of a vehicle body.

Referring now to the drawings, wherein like numerals refer to like parts throughout the several views, FIG. 1 illustrates a portion of a vehicle body 100. The portion of the vehicle body 100 is formed of generally hollow structural members, such as a side sill 102, an A-pillar 104 and a B-pillar 106, that are joined together to define a frame 108. Each of the structural members 102, 104, 106 can be reinforced with an exemplary structural reinforcement member by locating the reinforcement member in a hollow or cavity portion of the structural member as will be described in greater detail below. The structural reinforcement member can be disposed along a substantial portion of a longitudinal extent of the structural member, and is adapted such that when properly positioned in the structural member, a gap is provided between the reinforcement member and an inner surface of the structural member. Therefore, the exemplary reinforcement member does not prevent the provision of the anticorrosion coating on the inner surface of the structural member by an electrocoat process.

Figure 2:
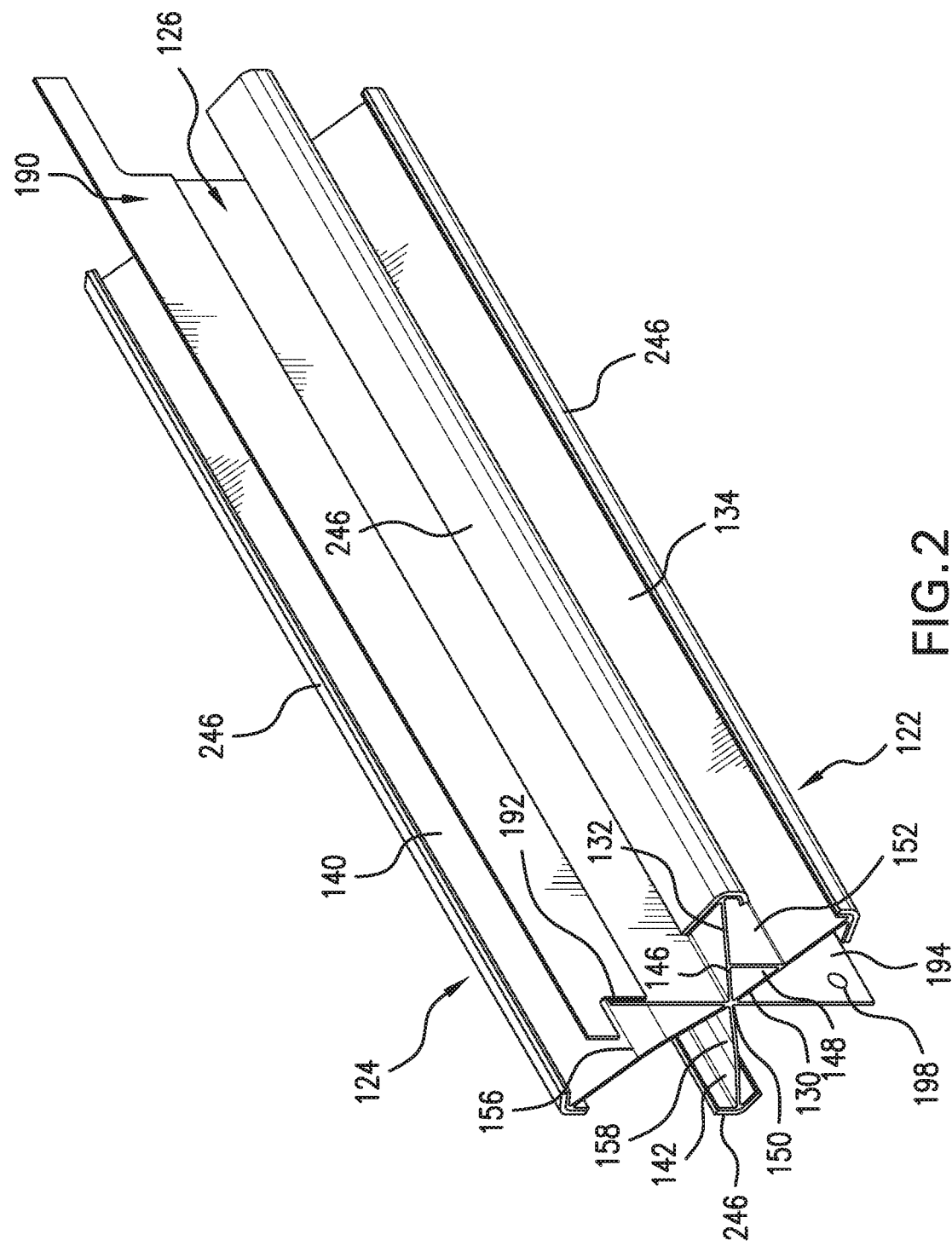
FIG. 2 is a perspective view of an exemplary reinforcement member according to one embodiment of the present disclosure for a structural member of the vehicle body portion of FIG. 1.

FIG. 2 depicts an exemplary reinforcement member 120 according to one embodiment of the present disclosure. The reinforcement member 120 incudes an outer section 122, an inner section 124, and a tension web 126 interposed between and directly contacting the outer section 122 and the inner section 124. The outer section 122 of the reinforcement member 120 includes a closed cross-sectional portion 130 and first and second legs 132, 134 extending outwardly from the closed cross-sectional portion 130. It should be appreciated that the closed cross-sectional portion 130 effectively shortens the first and second legs 132, 134, making the first and second legs 132, 134 stiffer in compression. The closed cross-sectional portion 130 abuts the tension web 126, and as will be described below, is adapted to increase stiffness and stability of the outwardly extending first and second legs 132, 134 (and, in turn, the tension web 124), particularly during a side or lateral impact to the structural member. This is advantageous for achieving a preferred force response curve and deformation mode (see FIG. 5). The inner section 124 of the reinforcement member 120 includes first and second legs 140, 142 in contact with and extending outwardly from the tension web 126.

In the depicted embodiment of the reinforcement member 120, the closed cross-sectional portion 130 is triangular shaped and is at least partially defined by respective end portions 146, 148 of the first and second legs 132, 134. The end portions 146, 148 converge toward one another and intersect to define an apex or node 150 of the closed cross-sectional portion 130. Stability of the reinforcement member 120 is achieved though having the first and second legs 132, 134 converge on the node 150. A separate wall part 152 of the closed cross-sectional portion 130 is spaced from and extends substantially parallel to the tension web 126. It should be appreciated that the closed cross-sectional portion 130 can have alternative polygonal shapes and is not limited to the depicted shape. The first and second legs 140, 142 of the inner section 124 converge toward and intersect at the node 150. At least one of the first and second legs 140, 142 of the inner section 124 has a kink or bend which moves the one leg slightly toward the other leg. The kink is provided to control deformation of that leg during a side or lateral impact to the structural member. According to one aspect, the first leg 140 includes an upward kink 156 located substantially centrally on the first leg 140. According to another aspect, the second leg 142 includes a downward kink 158 located substantially centrally on the second leg 142. As will be described in detail below, the kink or bend 156, 158 in each of the respective first and second legs 140, 142 are adapted to allow a portion each leg to fold at least partially into the tension web 126 during a side impact to the structured member.

Figure 3:
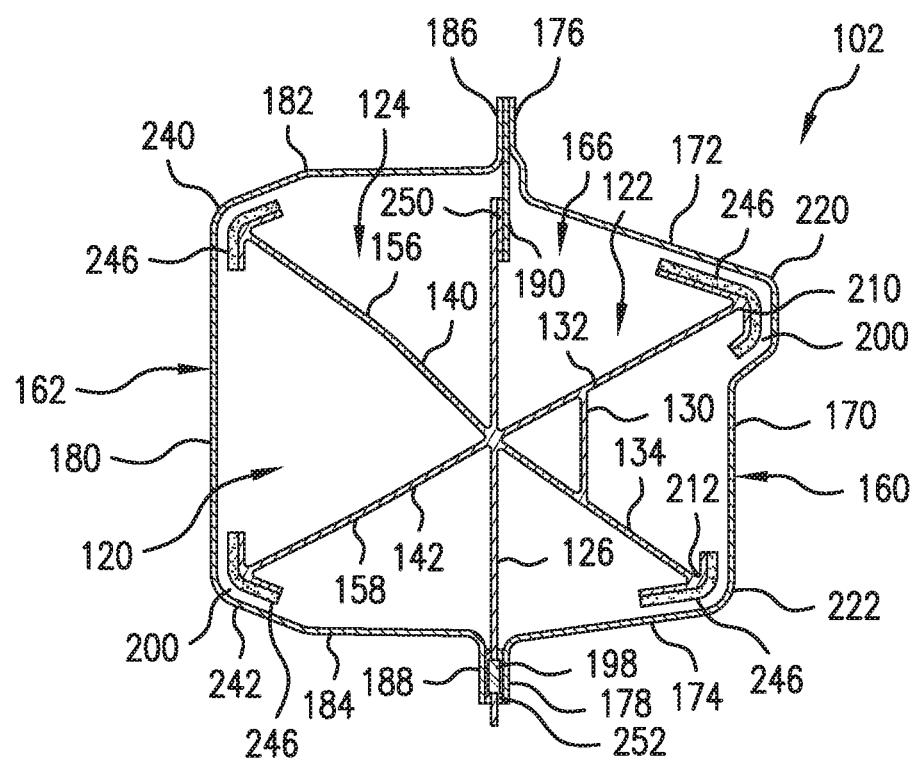
FIG. 3 is a cross-sectional view of the structural member of the vehicle body portion of FIG. 1 taken along line A-A of FIG. 1, the structural member including the reinforcement member of FIG. 2 prior to attachment to the structural member.
Figure 4:
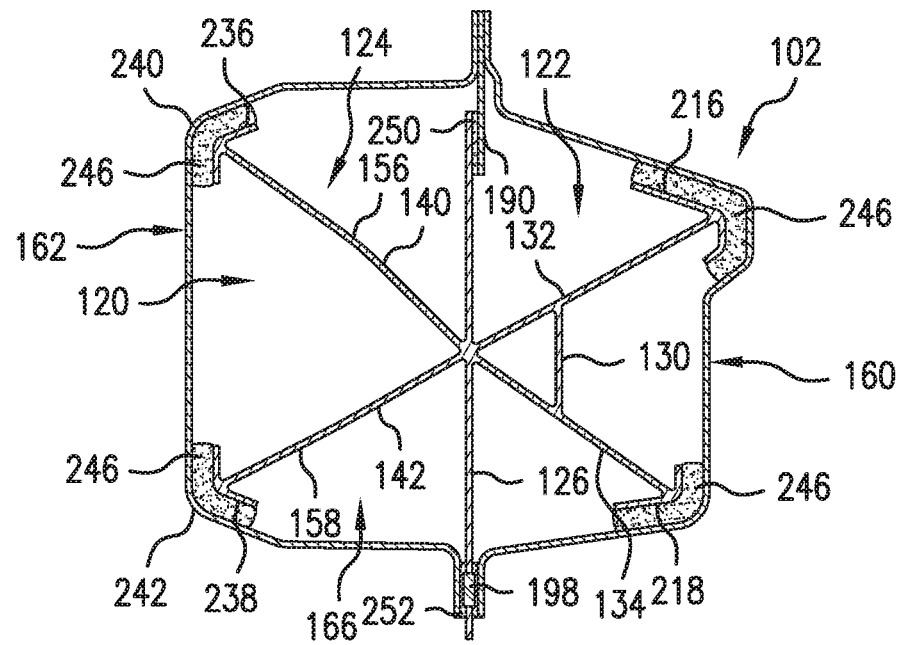
FIG. 4 depicts the reinforcement member of FIG. 3 fixedly attached to the structural member.

FIGS. 3 and 4 depict the structural member or side sill 102 having the exemplary reinforcement member 120 located therein. The structural member or side sill 102 can be formed of an outer panel member 160 joined to an inner panel member 162, inner surfaces of the inner and outer panel members 160, 162 defining an elongated cavity 166. The outer panel member 160 can be hat-shaped in cross-section and includes a base or side wall 170, a top wall 172 and a bottom wall 174. A flange 176 extends outwardly from an end portion of the top wall 172 and a flange 178 extends outwardly from an end portion of the bottom wall 174. Similarly, the inner panel member 162 can be hat-shaped in cross-section and includes a base or side wall 180, a top wall 182, and a bottom wall 184. The top wall 182 and bottom wall 184 can each include a kink or bend allowing a portion each wall 182, 184 to fold during a side impact to the structured member 102. A flange 186 extends outwardly from an end portion of the top wall 182, and a flange 188 extends outwardly from an end portion of the bottom wall 184. The flanges 176, 178 of the outer panel member 160 are fixedly attached (e.g., by welding) to the corresponding flanges 186, 188 of the inner panel member 162.

The structural member or side sill 102, which can be a stamped member, includes a first metal or a metal alloy, and can be formed of a steel or steel alloy. The outer section 122 of the exemplary reinforcement member 120 includes a second metal or metal alloy different from the first metal or metal alloy, and can be formed of an aluminum or aluminum alloy. According to one aspect, the tension web 126 is also formed of the second metal or metal alloy. As depicted in FIGS. 3 and 4, the tension web 126 is secured to the outer and inner panel members 160, 162 of the structural member or side sill 102. To prevent the occurrence of galvanic corrosion between the differing materials of the tension web 126 and the structural member 102, a separate segment member 190 formed of the first metal or metal alloy is provided at an upper portion 192 of the tension web 126. The segment member 190 is adapted to connect the upper flanges 176, 186 of the outer and inner panel members to the upper portion of the tension web 126. A lower portion 194 of the tension web 126 is provided with a joining part 198 formed of the first metal or metal alloy. According to one aspect, the joining part 198 can be a slug of the first metal or metal alloy provided formed in the lower portion 194. According to another aspect, the joining part 198 can be a separate segment member similar to segment member 190. The joining part 198 is adapted to connect the lower flanges 178, 188 of the outer and inner panel members 160, 162 to the lower portion of the tension web 126. The inner section 124 of the exemplary reinforcement member 120 can include the second metal or metal alloy. This allows the reinforcement member 120 to be integrally formed as a one-piece, unitary member, such as by an extrusion process.

As shown in FIGS. 3 and 4, the reinforcement member 120 is positioned in the cavity 166 of the structural member 102 wherein a gap 200 is provided between the reinforcement member 120 and the inner surfaces of the outer and inner panel members 160, 162. The outer section 122 faces the outer panel member 160 with the first and second legs 132, 134 extending toward the inner surface of the outer panel member 160, and the inner section 124 faces the inner panel member 162 with the first and second legs 142, 144 extending toward the inner surface of the inner panel member 162. End portions 210, 212 of the respective first and second legs 132, 134 of the outer section 122 (which are opposite end portions 146, 148) are provided with flanges 216, 218 shaped to conform to respective upper and lower corner portions 220, 222 of the outer panel member 160. Similarly, end portions 230, 232 of the respective first and second legs 142, 144 of the inner section 124 are provided with flanges 236, 238 shaped to conform to respective upper and lower corner portions 240, 242 of the inner panel member 162.

An adhesive 246, which can be structural foam, is secured to the reinforcement member 120. In the depicted embodiment, the adhesive is secured to each of the flanges 216, 216 of the outer section 122 and each of the flanges 236, 238 of the inner section 124. The adhesive 246 is selected so as to be activatable under a desired condition. Used herein, activatable means that the adhesive 246 softens (e.g., melts), cures, expands, foams or a combination thereof upon exposure to a condition. Thus, according to one embodiment, the adhesive 246 may be a heat-activated and/or epoxy-based resin having foamable characteristics. Of course, the adhesive 246 may be activated by other conditions or stimuli. The choice of the adhesive 246 used will typically be dictated by performance requirements and economics of the specific application and requirements. The gap 200 provided between the adhesive 246 and the inner surfaces of the outer panel member 160 and inner panel member 162 allows anticorrosion fluid to flow between the reinforcement member 120 and the inner surface of the structural member 102. According to the present disclosure, the adhesive is substantially dry to the touch prior to activation and is activatable to expand toward the inner surface of the side sill 102 to fill at least a portion of the gap 200 when the vehicle body 100 is sent through a paint process and the adhesive is exposed to increased temperatures. The adhesive 246 also has increased ductility for better load distribution along the entire longitudinal axis of the reinforcement member 120. To secure the adhesive 246 to the reinforcement member 120, the adhesive can be preheated to a temperature suitable to make it tacky, yet low enough that it will not exceed its cure or expansion temperature.

To secure the exemplary structural reinforcement member 120 within the cavity 166 of the structural member 102, the segment member 190 is attached to the upper portion 192 of the tension web 126. It should be appreciated that the segment member 190 can be attached to the upper portion 192 by conventional fasteners, such as self-piercing rivets, and a separate adhesive/insulator 250 can be placed between the tension web 126 and segment member 190 to prevent galvanic corrosion. The segment member 190 is interposed between and is directly secured (e.g., by welding) to the upper flanges 176, 186 of the outer and inner panel members 160, 162. The lower portion 194 of the tension web is interposed between the lower flanges 178, 188 of the outer and inner panel members 160, 162. Again, an adhesive/ insulator 252 can be placed between the tension web 126 and lower flanges 178, 188 to prevent galvanic corrosion. The joining part 198 is directly secured (e.g., by welding) to the lower flanges 178, 188 of the outer and inner panel members 160, 162.

Figure 5:
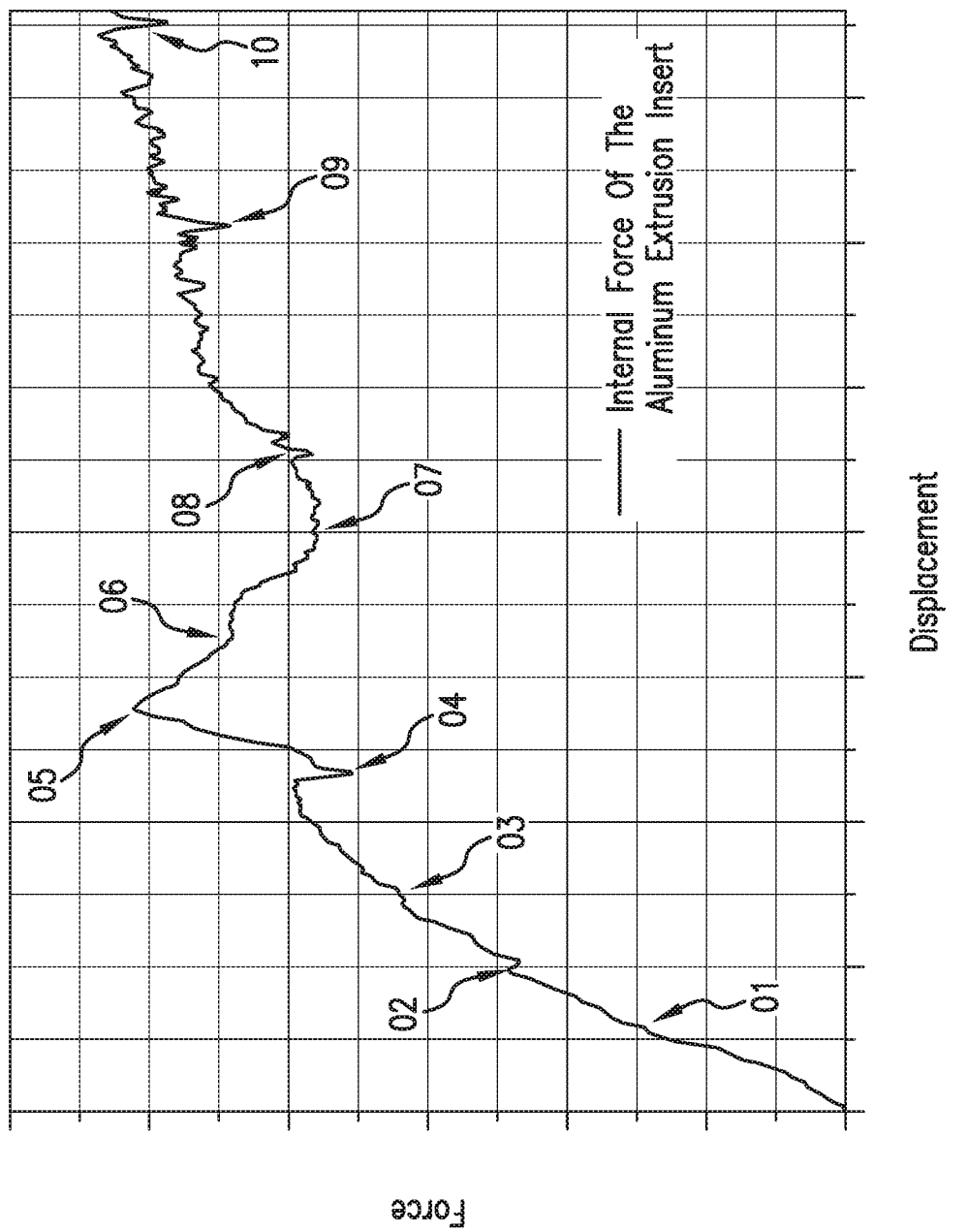
FIG. 5 is a graph illustrating impact force/displacement of the structural member including the reinforcement member of FIG. 2 caused by a side impact to the structural member.

FIG. 5 graphically depicts an impact or test barrier force verses displacement caused by a side impact to the structural member or side sill 102 having the reinforcement member 102 positioned in the cavity 166 of the structural member. FIGS. 6A-6J schematically depict, in cross-section, the deformation of the structural member 102 and reinforcement member 120 at selected points on the graph of FIG. 5. It should be appreciated from the description below that the first and second legs 132, 134 of the outer section 122 and the first and second legs 140, 142 of the inner section 124 define a lateral load path between the outer and inner panel members 160, 162 during a side impact to the structural member 102.

Figure 6A:
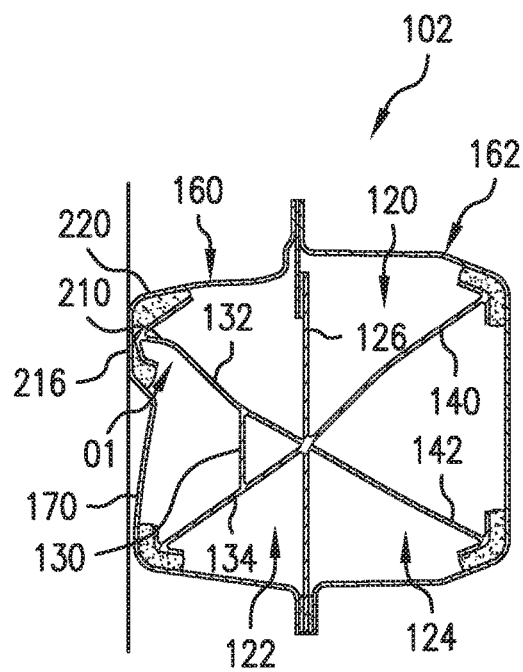
Figure 6B:
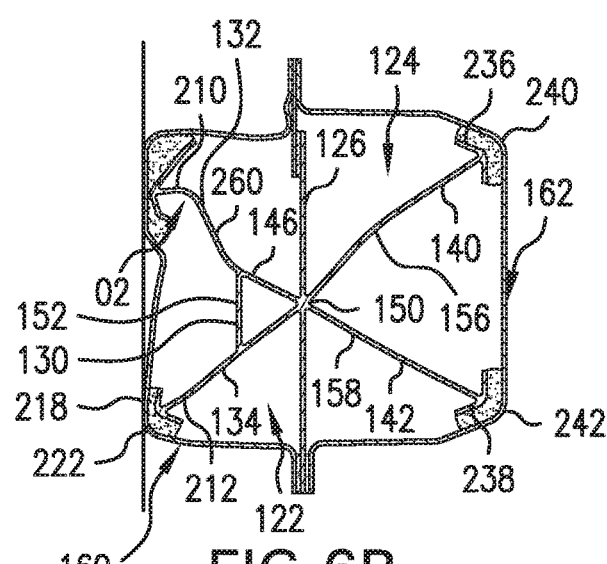

In FIG. 6A, initial force from a side impact to the outer panel member 160 of the structural member 102 causes partial deformation of the side wall 170 and the first leg 132 of the outer section 122. The end portion 210 of the first leg 132 begins to kink or bend at point 01 due to deformation of the joint defined by the flange 216 adhered to the upper corner portion 220. FIG. 6B shows the first leg 132 continuing to kink or bend at point 02, wherein a section 260 of the first leg 132 located between the end portions 146, 210 begins to fold upwardly in the vehicle body height direction toward the tension web 126 generally about the intersection between the wall part 152 of the closed cross-sectional portion 130 and the end portion 146 of the first leg 132 (which at least partially defines the closed cross-sectional portion 130). The end portion 212 of the second leg 134 also begins to kink or bend caused by deformation of the joint defined by the flange 218 adhered to the lower corner portion 222. It should also be appreciated that the lateral load path of each of the first and second legs 132, 134 is directed though the node 150 to the first and second legs 140, 142 of the inner section 124. This, in turn, causes each of the first and second legs 140, 142 to start to deform at their respective kinks 156, 158 due to the joints defined by the respective flanges 236, 238 adhered to the upper and lower corner portions 240, 242.

Figure 6C:
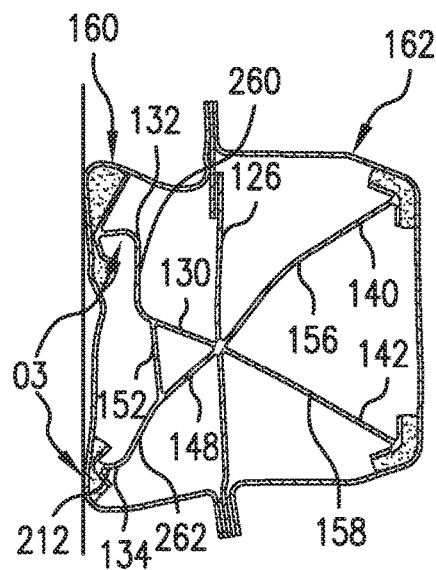
Figure 6D:
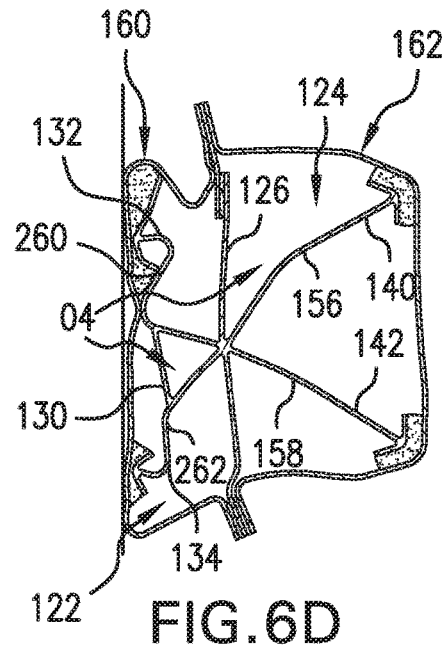

In FIG. 6C, the lateral load continues to fold the first leg 132 at point 03, and the section 260 of the first leg 132 is moved substantially parallel to the tension web 126. Further, a section 262 of the second leg 134 located between the end portions 148, 212 folds downwardly in the vehicle body height direction toward the tension web 126 generally about the intersection between the wall part 152 of the closed cross-sectional portion 130 and the end portion 148 of the second leg 134 (which at least partially defines the closed cross-sectional portion 130). FIG. 6D depicts the section 260 of the first leg 132 bended more toward the tension web 126 and the section 262 of the second leg 134 substantially parallel to the tension web 126. The closed cross-sectional portion 130 begins to partially deform and the first leg 140 of the inner section 124 continues to deform about the kink 156 (see point 04). Further, the continued lateral force applied to the outer panel member 160 starts to deform the tension web 126.

Figure 6E:
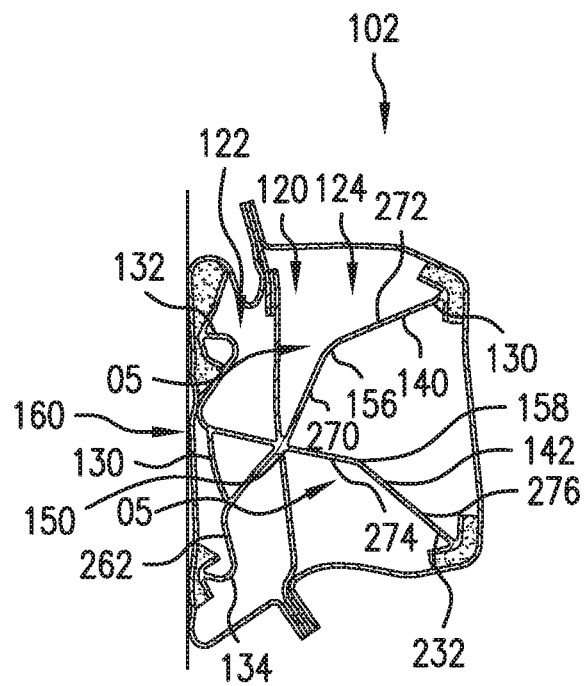
Figure 6F:
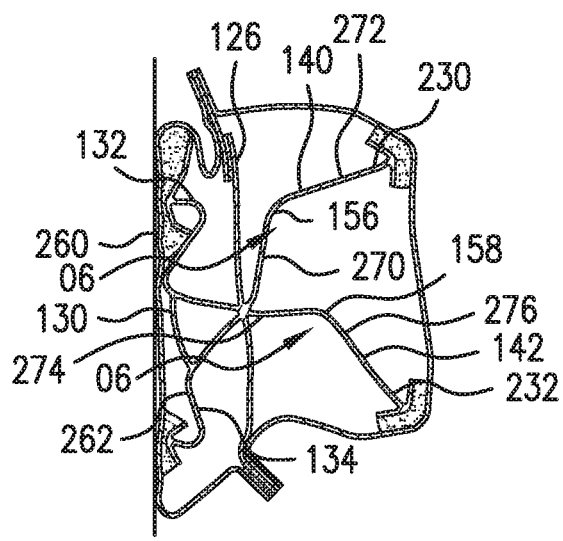

FIGS. 6E and 6F depict each of the sections 260, 262 of the respective first and second legs 132, 134 of the outer section 122 folded more toward the tension web 126. With continued lateral force applied to the structural member 102, the kink or bend 156, 158 in each of the first and second legs 140, 142 of the inner section 124 is adapted to allow a section each leg 140, 142 to fold at least partially into the tension web 126 (see points 05 and 06). Particularly, the first leg 140 is adapted to fold upwardly in the vehicle body height direction such that a section 270 of the first leg 140 located between the node 150 and the kink 156 is substantially parallel to the tension web 126, and a section 272 of the first leg 140 located between the kink 156 and the end portion 230 is substantially perpendicular to the tension web 126. The second leg 142 is also adapted to fold upwardly in the vehicle body height direction (because kink 158 is moving upwardly relative to its original position) such that a section 274 of the second leg 142 located between the node 150 and the kink 158 is substantially perpendicular to the tension web 126, and a section 276 of the second leg 142 located between the kink 158 and the end portion 232 is substantially parallel to the tension web 126.

Figure 6G:
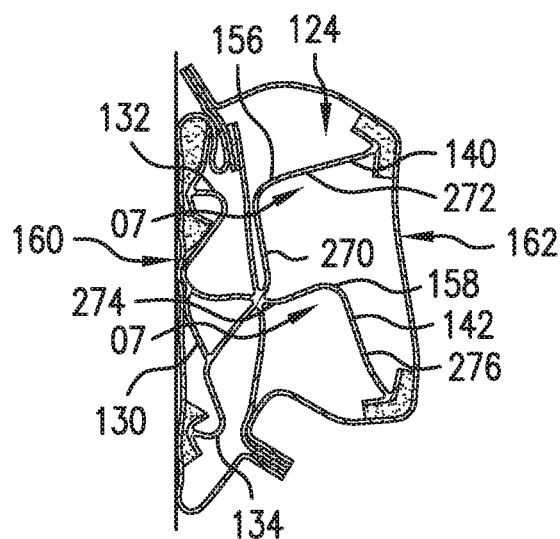
Figure 6H:
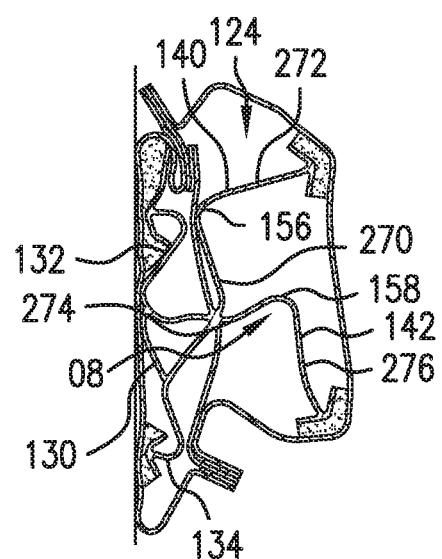

As illustrated in FIGS. 6G and 6H, the closed cross-sectional portion 130 of the outer section 122 continues to deform from the lateral force applied to the structural member 120. And the first and second legs 140, 142 of the inner section 124 continue to fold about their respective kinks 156, 158 (see point 07). The section 270 of the first leg 140 is moved into engagement with the tension web 126, and the kink 158 of the second leg 142 moves upward in the vehicle body height direction (see point 08). FIG. 6I depicts the first and second legs 132, 134 of the outer section 122 in direct contact with the tension web 126. The first leg 140 of the inner section 124 is further folded upwards such that a part of the section 272 of the first leg 140 is in contact with the tension web 126. The kink 158 of the second leg of the inner section 124 engages the side wall 180 of the inner panel member 162 (see point 09). FIG. 6J depicts a final deformed state of the structural member 102 and reinforcement member 120 at point 10 on the graph of FIG. 5.

Figure 7:
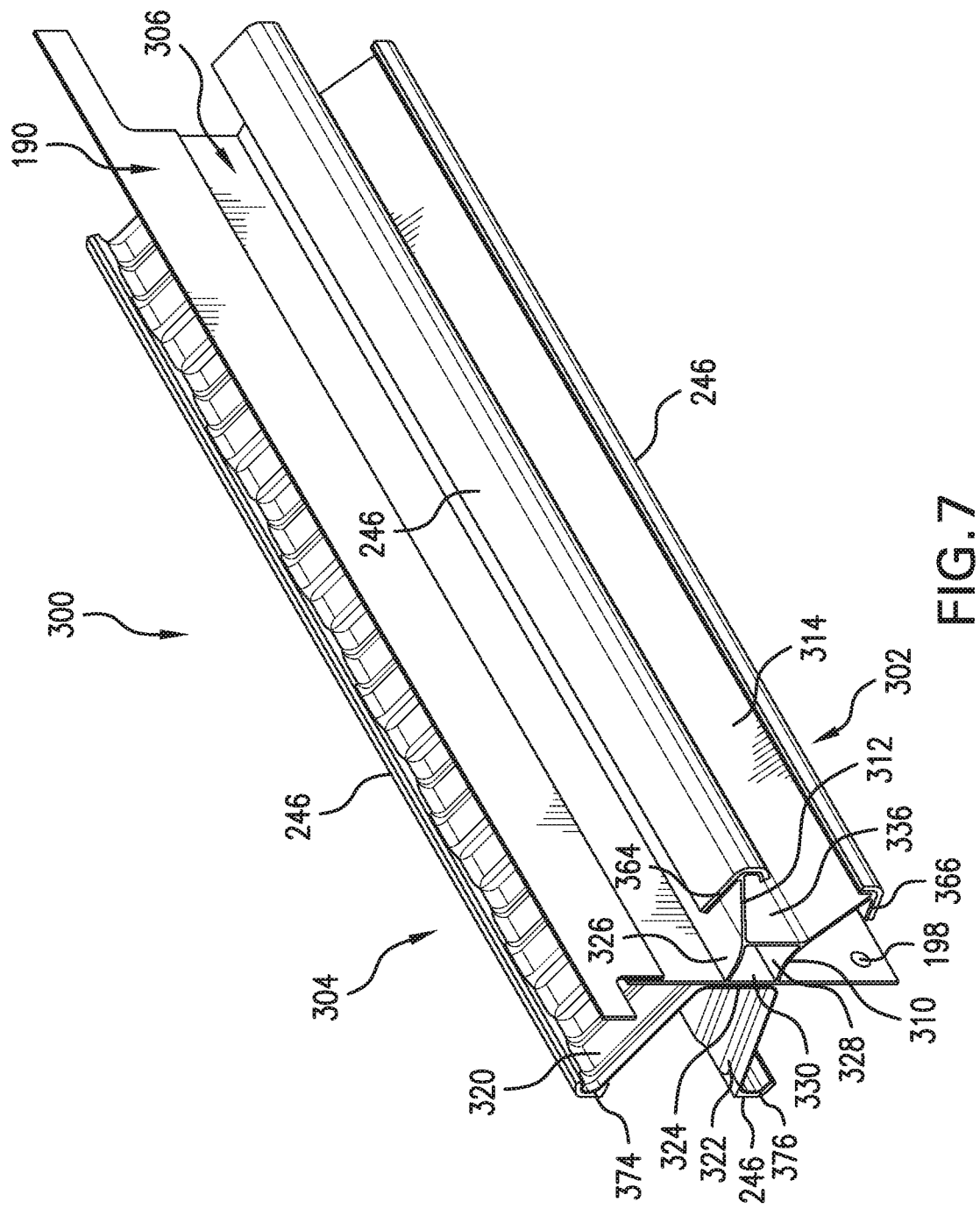
FIG. 7 is a perspective view of an exemplary reinforcement member according to another embodiment of the present disclosure for the structural member of the vehicle body portion of FIG. 1.

FIG. 7 depicts an exemplary reinforcement member 300 according to another embodiment of the present disclosure. The reinforcement member 300 incudes an outer section 302, an inner section 304, and a tension web 306 interposed between and directly contacting the outer section 302 and the inner section 304. The outer section 302 of the reinforcement member 300 includes a closed cross-sectional portion 310 and first and second legs 312, 314 extending outwardly from the closed cross-sectional portion 310. Similar to the reinforcement member 120, the closed cross-sectional portion 310 effectively shortens the first and second legs 312, 314, making the first and second legs stiffer in compression. The closed cross-sectional portion 310 abuts the tension web 306 and is adapted to increase stiffness and stability of the first and second legs 312, 314 (and, in turn, the tension web 306), particularly during a side or lateral impact to the structural member. The inner section 304 of the reinforcement member 300 is generally hat-shaped and includes first and second legs 320, 322 extending outwardly from a base member 324 in contact with the tension web 306.

Figure 8:
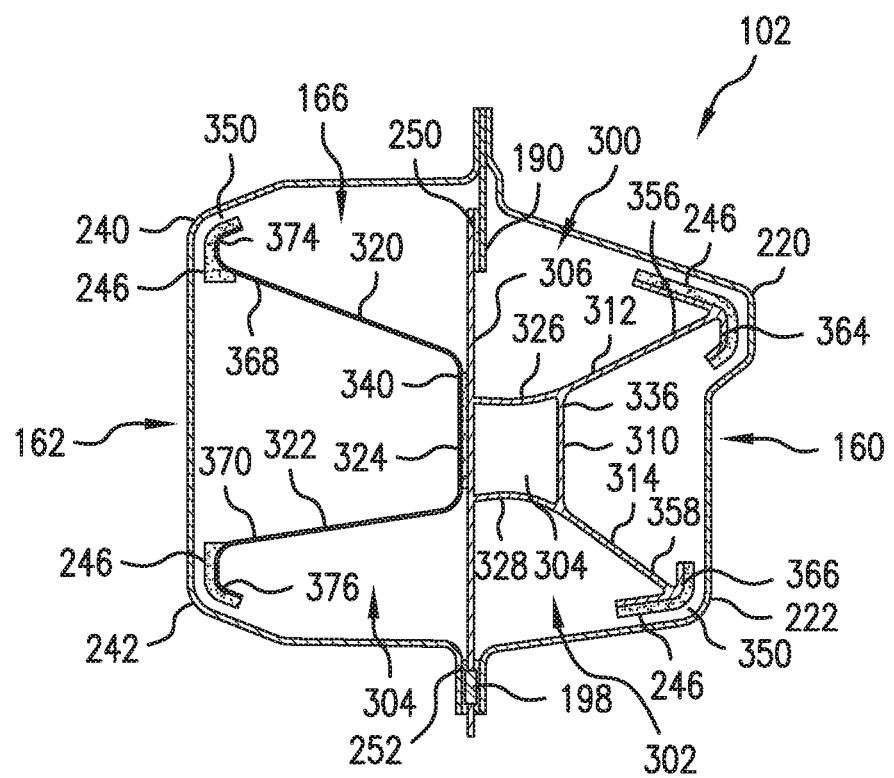
FIG. 8 is a cross-sectional view of the structural member of the vehicle body portion of FIG. 1 taken along line A-A of FIG. 1, the structural member including the reinforcement member of FIG. 7 prior to attachment to the structural member.
Figure 9:
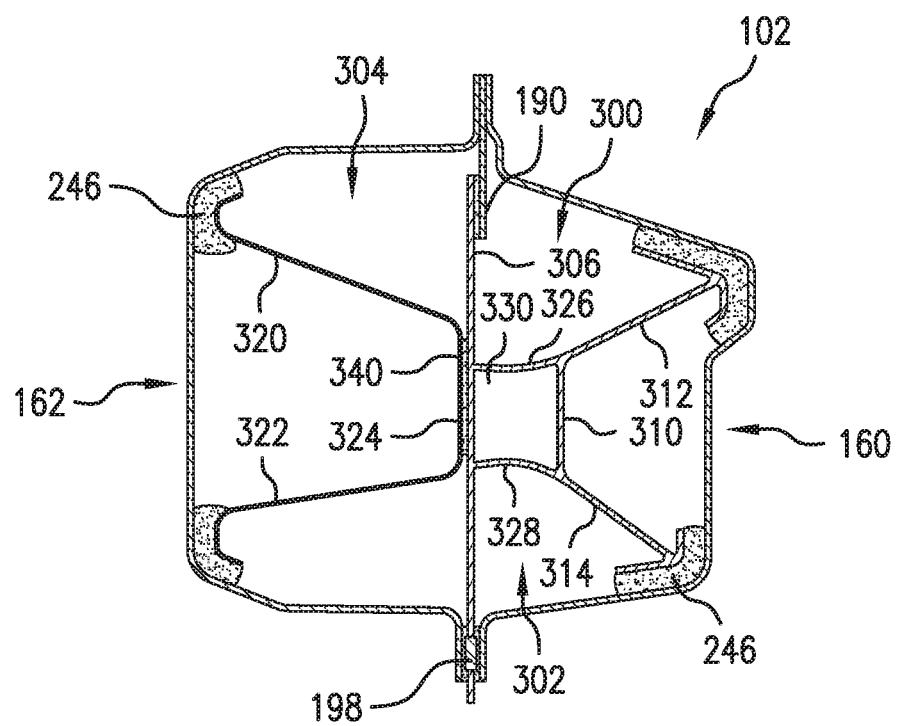
FIG. 9 depicts the reinforcement member of FIG. 8 fixedly attached to the structural member.

The closed cross-sectional portion 310 is rectangular shaped and is at least partially defined by respective end portions 326, 328 of the first and second legs 312, 314. It should be appreciated that due to the single node 150 of the reinforcement member 120 being effectively replaced by two nodes in this embodiment (the two nodes defined by the intersection of each end portion 326, 328 and the tension web 306), the tension web 306 is enhanced compared to the tension web 126. The end portions 326, 328 define substantially horizontal wall parts of the closed cross-sectional portion 310. As best shown in FIGS. 8 and 9, the substantially horizontal wall parts 326, 328 of the closed cross-sectional portion 310 are at least partially curved toward one another, and are adapted to at least partially collapse into an enclosed space 330 defined by the cross-sectional portion 310. A separate wall part 336 of the closed cross-sectional portion 310 is spaced from and extends substantially parallel to the tension web 306. The base member 324 of the inner section 304 is secured to the tension web 306 at the same location on the tension web as the closed cross-sectional portion 310.

As indicated previously, the structural member or side sill 102 includes a first metal or a metal alloy, and can be formed of a steel or steel alloy. The outer section 302 of the exemplary reinforcement member 300 includes a second metal or metal alloy different from the first metal or metal alloy, and can be formed of an aluminum or aluminum alloy. According to one aspect, the tension web 306 is also formed of the second metal or metal alloy. This allows the outer section 302 and tension web 306 to be integrally formed as a one-piece, unitary member, such as by an extrusion process. In contrast to the reinforcement member 120, the inner section 304 of the exemplary reinforcement member 300 can include the first metal or metal alloy. It should be appreciated that the inner section 304 can be attached to the tension web 306 by conventional fasteners, such as self-piercing rivets, and an adhesive/insulator 340 can be placed between the tension web 306 and base member 324 to prevent galvanic corrosion (see FIG. 8). As depicted in FIGS. 8 and 9, the tension web 306 is secured to the outer and inner panel members 160, 162 of the structural member or side sill 102 in the same manner as the tension web 126 (e.g., by use of the separate segment member 190 and joining part 198). Accordingly, further discussion of the connection of the reinforcement member 300 within the cavity 166 of the structural member 102 will be omitted for conciseness.

As shown in FIGS. 8 and 9, and similar to the previous embodiment, the reinforcement member 300 is positioned in the cavity 166 of the structural member 102 such that a gap 350 is initially provided between the reinforcement member 300 and the inner surfaces of the outer and inner panel members 160, 162. As indicated previously, the gap 350 allows for the provision of the anticorrosion coating on the inner surface of the structural member by an electrocoat process. The outer section 302 faces the outer panel member 160 with the first and second legs 312, 314 extending toward the inner surface of the outer panel member 160, and the inner section 304 faces the inner panel member 162 with the first and second legs 320, 322 extending toward the inner surface of the inner panel member 162. End portions 356, 358 of the respective first and second legs 312, 314 of the outer section 302 (which are opposite end portions 326, 328) are provided with flanges 364, 366 shaped to conform to the respective upper and lower corner portions 220, 222 of the outer panel member 160. Similarly, end portions 368, 370 of the respective first and second legs 320, 322 of the inner section 304 are provided with flanges 374, 376 shaped to conform to the respective upper and lower corner portions 240, 242 of the inner panel member 162. In the depicted embodiment, the adhesive 246 is secured to each of the flanges 364, 366 of the outer section 302 and each of the flanges 374, 376 of the inner section 304. The adhesive 246 attaches the flanges 364, 366 to the respective upper and lower corner portions 220, 222 of the outer panel member 160 and attaches the flanges 374, 376 to the respective upper and lower corner portions 240, 242 of the inner panel member 162.

Figure 10:
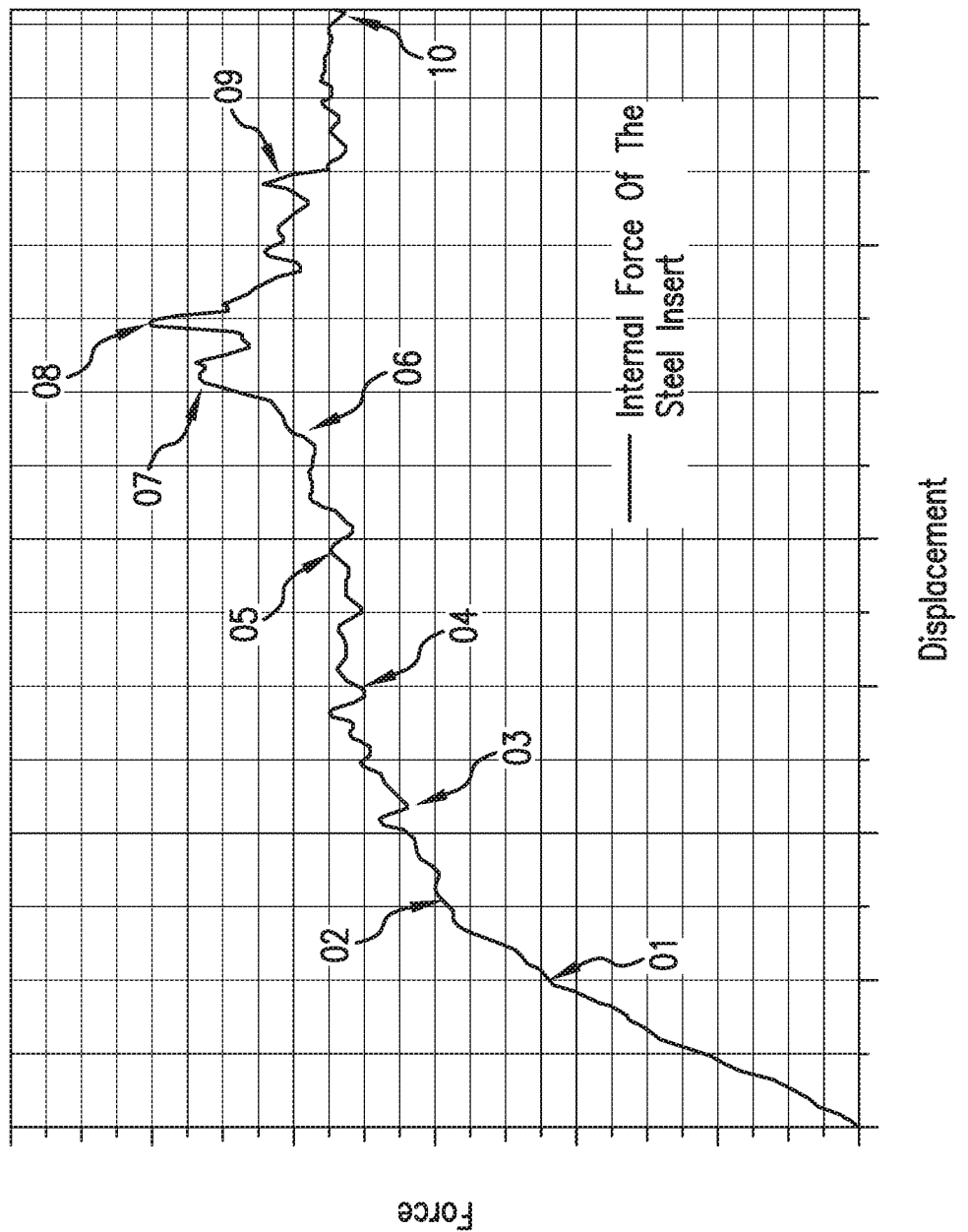
FIG. 10 is a graph illustrating impact force/displacement of the structural member including the reinforcement member of FIG. 7 caused by a side impact to the structural member.

FIG. 10 graphically depicts an impact or test barrier force verses displacement caused by a side impact to the structural member or side sill 102 having the reinforcement member 300 positioned in the cavity 166 of the structural member. FIGS. 11A-11J schematically depict, in cross-section, the deformation of the structural member 102 and reinforcement member 300 at selected points on the graph of FIG. 10. Similar to the previous embodiment of the reinforcement member, the first and second legs 312, 314 of the outer section 302 and the first and second legs 320, 322 of the inner section 304 of the exemplary reinforcement member 300 define a lateral load path from the outer panel member 160 toward the inner panel member 162 during a side impact to the structural member 102.

Figure 11A:
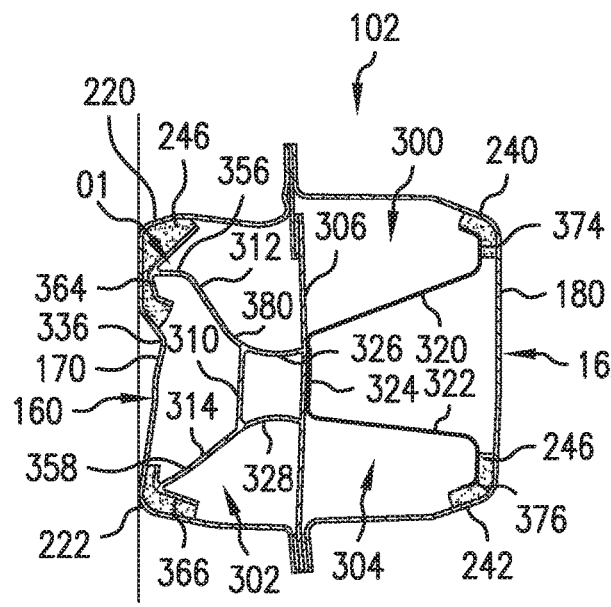
FIGS. 11A-11J depict the displacement of the structural member and reinforcement member of FIG. 7 at selected points on the graph of FIG. 10.
Figure 11B:
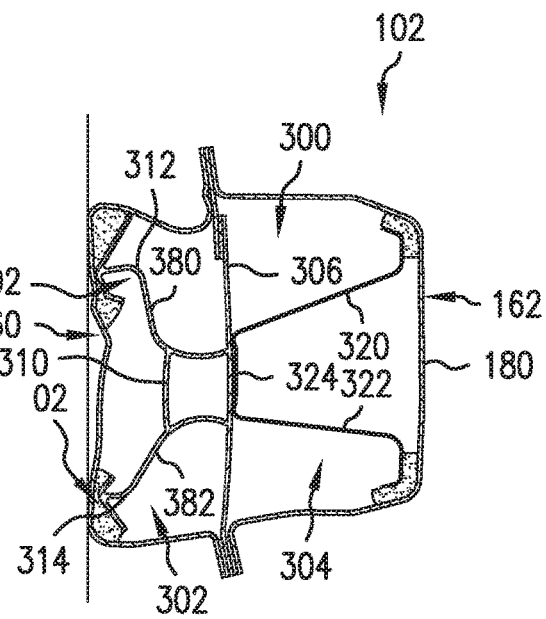

In FIG. 11A, initial force from a side impact to the outer panel member 160 of the structural member 102 causes partial deformation of the side wall 170 and the first and second legs 312, 314 of the outer section 302. The end portion 356 of the first leg 312 begins to kink or bend at point 01 due to deformation of the joint defined by the flange 364 adhered to the upper corner portion 220. FIG. 11B shows the first leg 312 continuing to kink or bend at point 02, wherein a section 380 of the first leg 312 located between the end portions 326, 356 begins to fold upwardly in the vehicle body height direction toward the tension web 306 generally about the intersection between the wall part 336 of the closed cross-sectional portion 310 and the end portion 326 of the first leg 312 (which defines a substantially horizontal wall part of the closed cross-sectional portion 310). The end portion 358 of the second leg 314 also begins to kink or bend caused by deformation of the joint defined by the flange 366 adhesively adhered to the lower corner portion 222. It should be appreciated that the lateral load path of each of the first and second legs 312, 314 is directed though the closed cross-sectional portion 310 and the tension web 306 to the inner section 304.

Figure 11C:
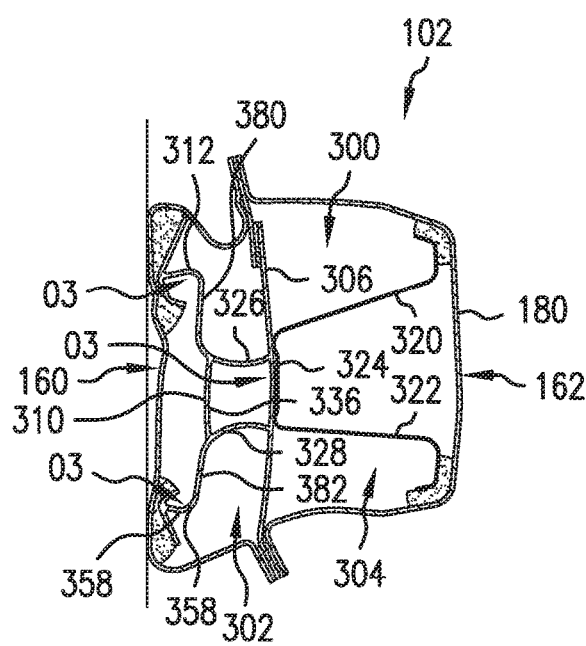
Figure 11D:
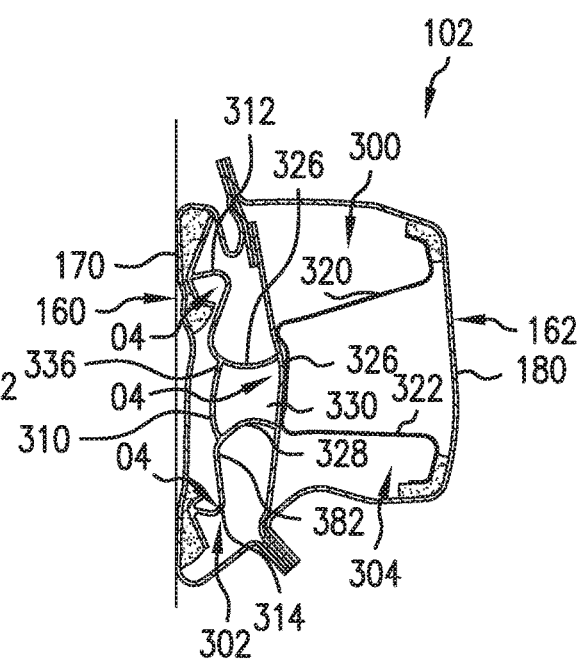

In FIG. 11C, the lateral load continues to fold the first leg 312 of the outer section 302 at point 03, and the section 380 of the first leg 312 is moved substantially parallel to the tension web 306. Further, a section 382 of the second leg 314 located between the end portions 328, 358 folds downwardly in the vehicle body height direction toward the tension web 306 (see point 03) generally about the intersection between the wall part 336 of the closed cross-sectional portion 310 and the end portion 328 of the second leg 314 (which defines a substantially horizontal wall part of the closed cross-sectional portion 310). FIG. 11D depicts the section 380 of the first leg 312 bended more toward the tension web 306 and the section 382 of the second leg 314 substantially parallel to the tension web 306. The closed cross-sectional portion 310 begins to partially deform (see point 04). As depicted, the end portions 326, 328 (i.e., the substantially horizontal wall parts of the closed cross-sectional portion 310) begin to at least partially collapse into the enclosed space 330 defined by the closed cross-sectional portion. The wall part 336 bulges toward the side wall 170 of the outer panel member 160. And the closed cross-sectional portion 310 at least partially forces the base member 324 of the inner section 304 toward the side wall 180 of the inner panel member 162. This, in turn, causes each of the first and second legs 320, 322 to deform due to the joints defined by the respective flanges 374, 376 adhered to the upper and lower corner portions 240, 242. Further, the continued lateral force applied to the outer panel member 160 starts to deform the tension web 306.

Figure 11E:
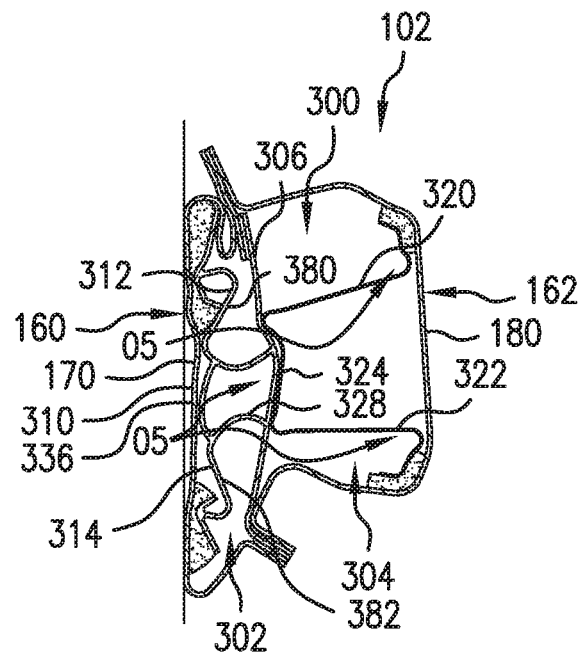
Figure 11F:
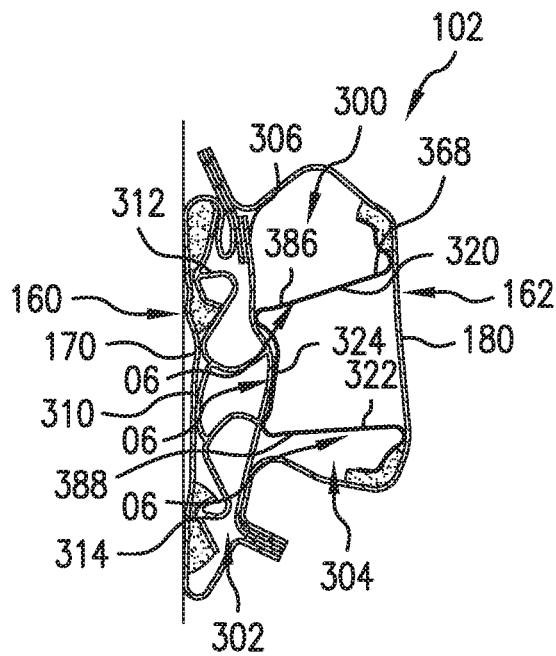

FIGS. 11E and 11F depict each of the sections 380, 382 of the respective first and second legs 312, 314 of the outer section 302 folded more toward the tension web 306. The wall part 336 of the closed cross-sectional portion 310 is moved into contact with the side wall 170 of the outer panel member 160, and the end portions 326, 328 are collapsed further toward one another. The tension web 306 in the area of the closed cross-sectional portion 310 bulges more toward the side wall 180 of the inner panel member 162 (see points 05 and 06). The continued lateral force applied to the structural member 102 further causes end portions 386, 388 of the first and second legs 320, 322 to fold along the tension web 306 (which increases the stiffness and energy absorbing characteristics of the tension web 306) and the end portions 368, 370 of the first and second legs 320, 322 to fold along the side wall 180 (see points 05 and 06).

Figure 11G:
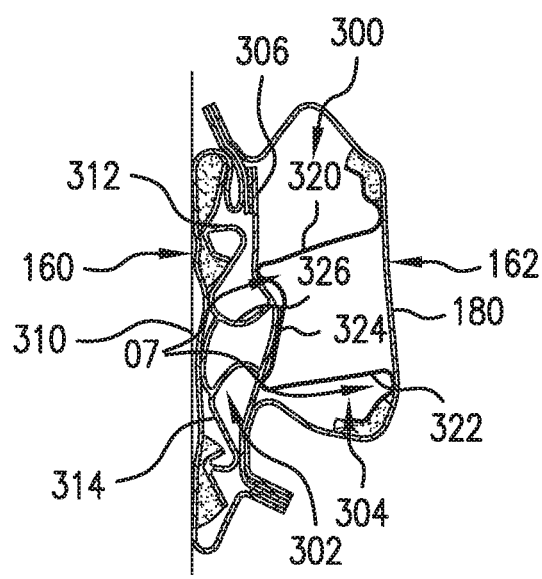
Figure 11H:
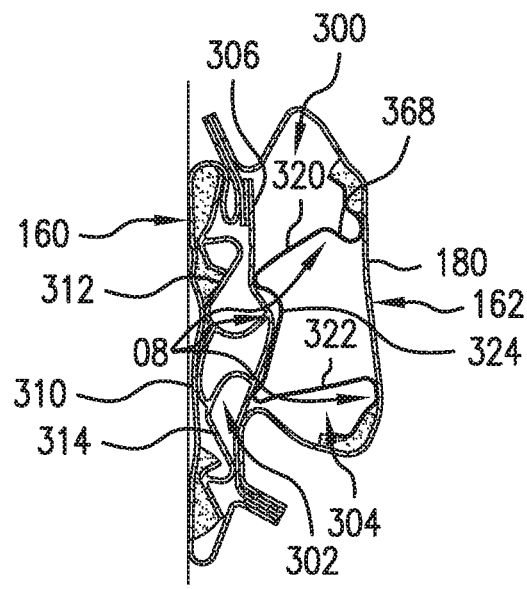
Figure 11I:
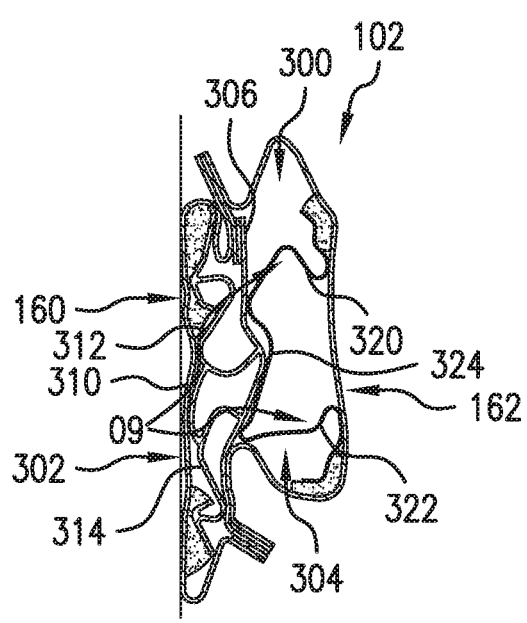
Figure 11J:
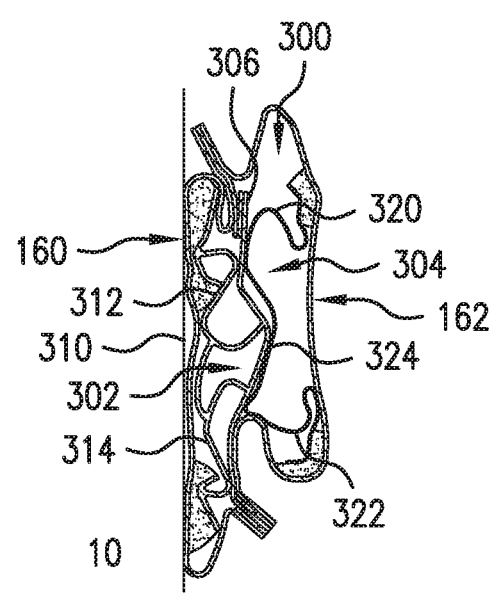

As illustrated in FIGS. 11G and 11H, the closed cross-sectional portion 310 of the outer section 302 continues to deform from the lateral force applied to the structural member 120. And the first and second legs 320, 322 of the inner section 304 continue to fold along the tension web 306 and the side wall 180 of the inner panel member 162 (see point 07). The tension web 306 bulges further toward the side wall 180 particularly at the intersection of the end portion 326 of the first leg 312 of the outer section 302 and the tension web 306 (see point 08). Further, at point 08 the first leg 320 of the inner section 304 begins to kink or bend near the end portion 368. FIG. 11I depicts the first and second legs 320, 322 of the inner section 304 further deformed (see point 09). FIG. 11J depicts a final deformed state of the structural member 102 and reinforcement member 300 at point 10 on the graph of FIG. 10.

FIG. 12 depicts an exemplary reinforcement member 400 according to another embodiment of the present disclosure. The reinforcement member 400 incudes an outer section 402, an inner section 404, and a tension web 406 interposed between and directly contacting the outer section 402 and the inner section 404. The outer section 402 is structurally similar to the outer section 302 of the reinforcement member 300. Therefore, similar components are identified with like reference numerals, but with the integer "4" (e.g., closed cross-sectional portion 310 is referenced as 410). Like the outer section 302, the outer section 402 includes a closed cross-sectional portion 410 and first and second legs 412, 414 extending outwardly from the closed cross-sectional portion 410. End portions 426, 428 of the respective first and second legs 412, 414 define substantially horizontal wall parts of the closed cross-sectional portion 410. Again, the end portions 426, 428 are curved toward one another and are adapted to at least partially collapse into the closed cross-sectional portion during a side impact to the structural member 102. Wall part 436 of the closed cross-sectional portion 410 is spaced from and extends substantially parallel to the tension web 406. Flanges 464, 466 located on end portions 456, 458 of the respective first and second legs 412, 414 have placed thereon the adhesive 246.

The inner section 404 of the reinforcement member 400 is a honeycomb structure 480 defining a plurality of openings or cells which are oriented substantially normal to a longitudinal axis defined by the structural member 102. The honeycomb structure 480 is adhered to the tension web 406 via the adhesive 246, and can have a shape that substantially conforms to a cross-section of a section of the structural member 102 to be reinforced by the honeycomb structure. It should be appreciated that the size of the openings or cells of the honeycomb structure can be dimensioned to suite the specific design requirements of the reinforcement member 400 and structural member 102, the smaller the cell size the increased stiffness of the honeycomb structure 480. The adhesive 246 is provided on opposite side surfaces 482, 484 of the honeycomb structure 480, which positions the adhesive 426 on opposite sides of the openings of the honeycomb structure 480.

As indicated previously, the structural member or side sill 102 includes a first metal or a metal alloy, and can be formed of a steel or steel alloy. The outer section 402 of the exemplary reinforcement member 400 includes a second metal or metal alloy different from the first metal or metal alloy, and can be formed of an aluminum or aluminum alloy. The tension web 406 can also formed of the second metal or metal alloy, which allows the outer section 402 and tension web 406 to be integrally formed as a one-piece, unitary member, such as by an extrusion process. According to one aspect, the honeycomb structure 480 of the inner section 404 can include the second metal or metal alloy; although, this is not required.

Figure 13:
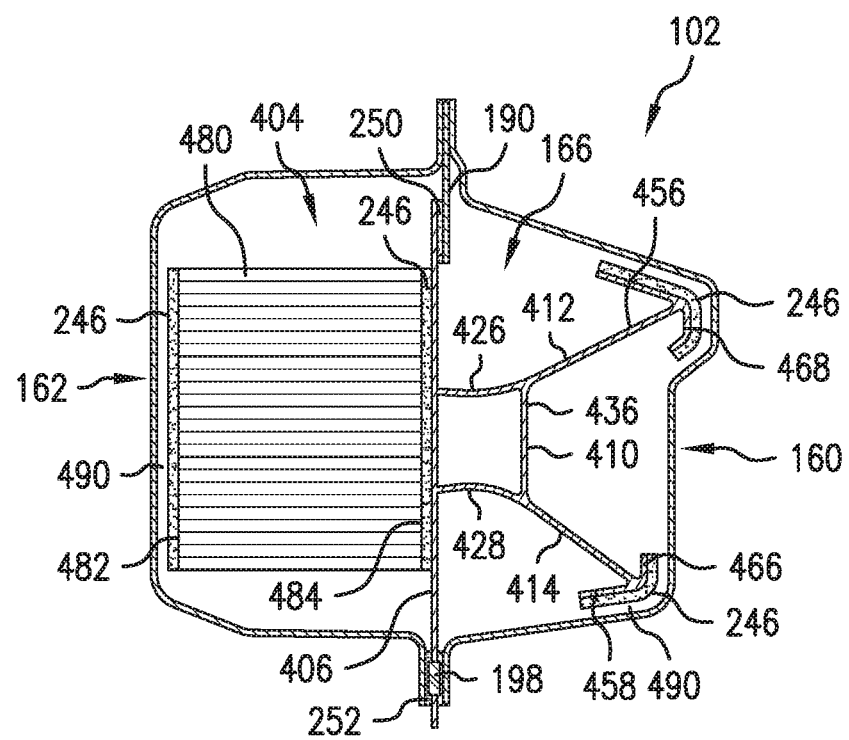
FIG. 13 is a cross-sectional view of the structural member of the vehicle body portion of FIG. 1 taken along line A-A of FIG. 1, the structural member including the reinforcement member of FIG. 12 prior to attachment to the structural member.
Figure 14:
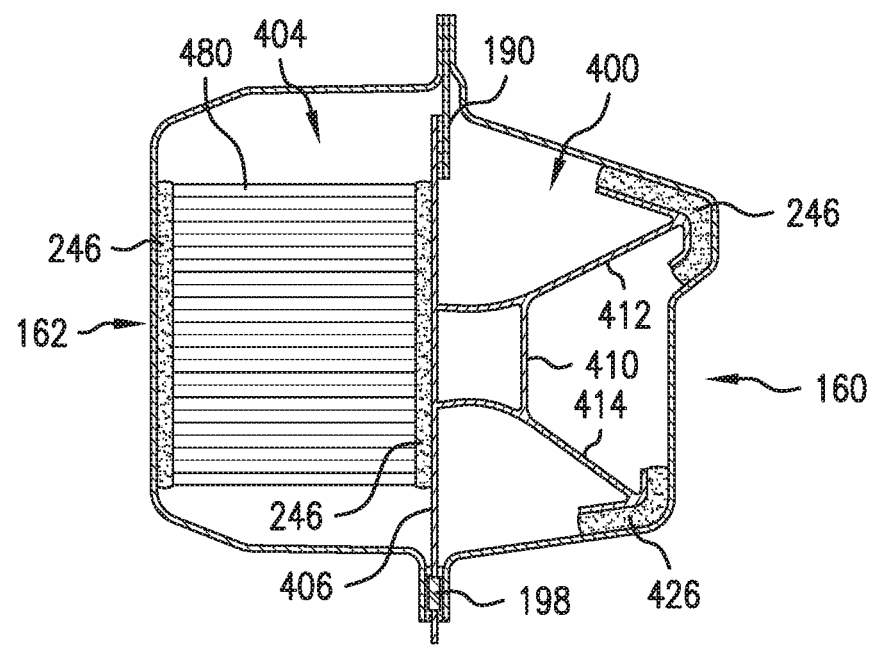
FIG. 14 depicts the reinforcement member of FIG. 13 fixedly attached to the structural member.

As depicted in FIGS. 13 and 14, the tension web 406 is secured to the outer and inner panel members 160, 162 of the structural member or side sill 102 in the same manner as the tension webs 126, 306 (e.g., by use of the separate segment member 190 and joining part 198). Accordingly, further discussion of the connection of the reinforcement member 400 within the cavity 166 of the structural member 102 will also be omitted for conciseness. As shown in FIG. 13, the reinforcement member 400 is initially positioned in the cavity 166 of the structural member 102 such that a gap 490 is provided between the reinforcement member 400 and the inner surfaces of the outer and inner panel members 160, 162. Again, the gap 490 allows for the provision of the anticorrosion coating on the inner surface of the structural member by an electrocoat process. The outer section 402 faces the outer panel member 160 with the first and second legs 412, 414 extending toward the inner surface of the outer panel member 160, and the inner section 404 faces the inner panel member 162. The honeycomb structure 480 is adhered to the tension web 406 beneath the segment member 190.

Figure 15:
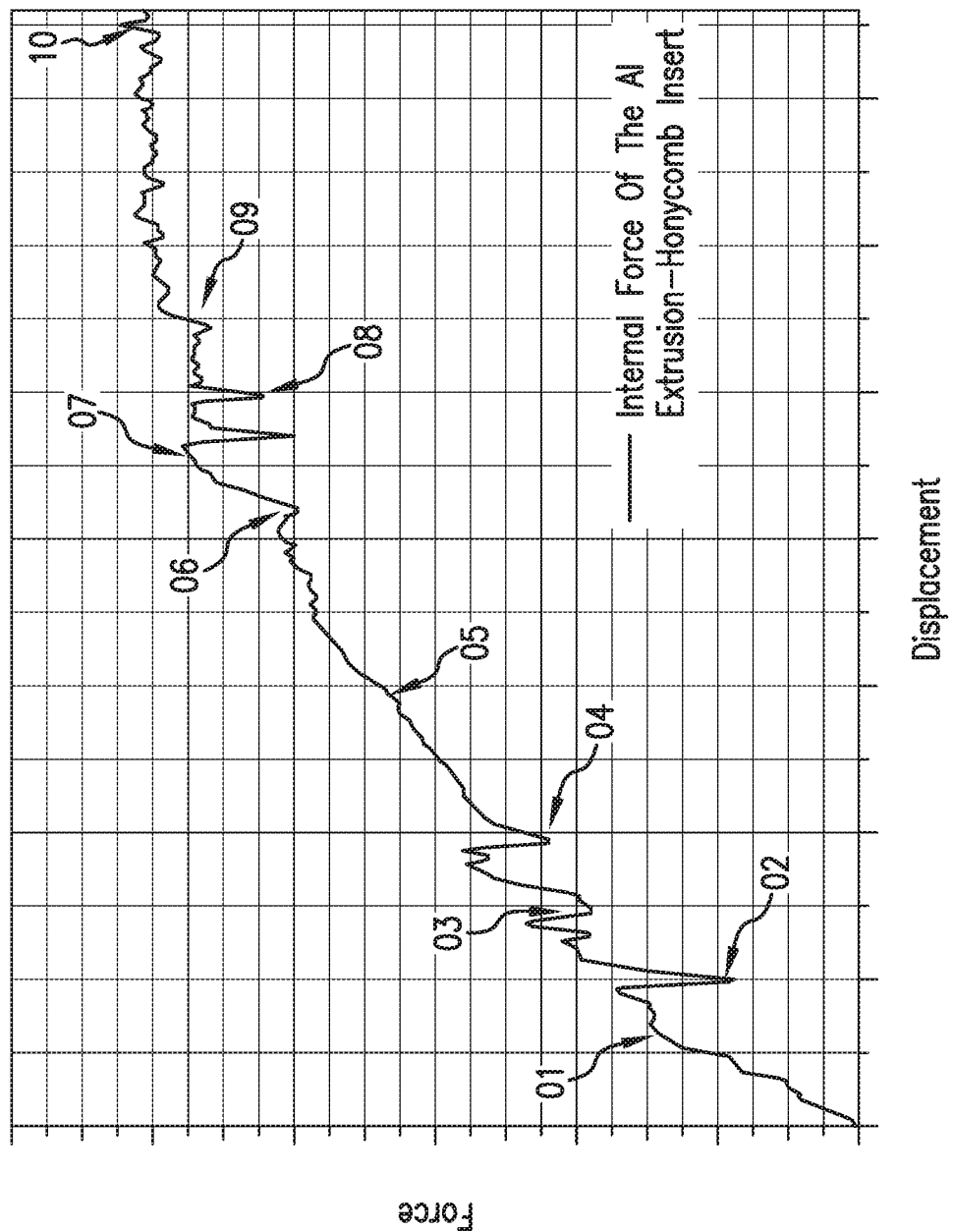
FIG. 15 is a graph illustrating impact force/displacement of the structural member including the reinforcement member of FIG. 12 caused by a side impact to the structural member.

FIG. 15 graphically depicts an impact or test barrier force verses displacement caused by a side impact to the structural member or side sill 102 having the reinforcement member 400 positioned in the cavity 166 of the structural member. FIGS. 11A-11J schematically depict, in cross-section, the deformation of the structural member 102 and reinforcement member 400 at selected points on the graph of FIG. 15. Similar to the previous embodiments of the reinforcement member, the first and second legs 412, 414 of the outer section 402 together with the honeycomb structure 480 define a lateral load path from the outer panel member 160 to the inner panel member 162 during a side impact to the structural member 102.

Figure 16A:
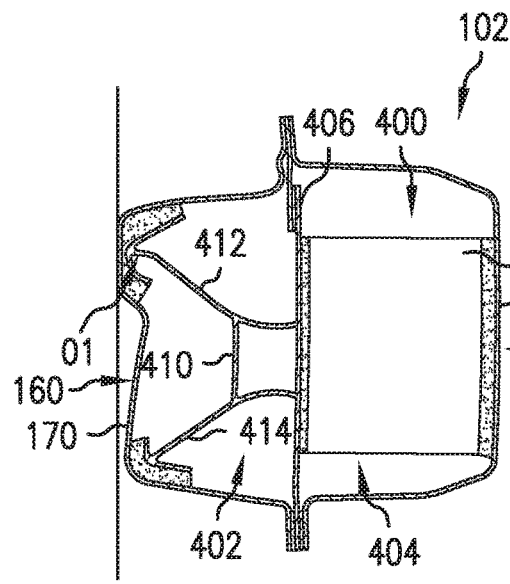
FIGS. 16A-16J depict the displacement of the structural member and reinforcement member of FIG. 12 at selected points on the graph of FIG. 15.
Figure 16B:
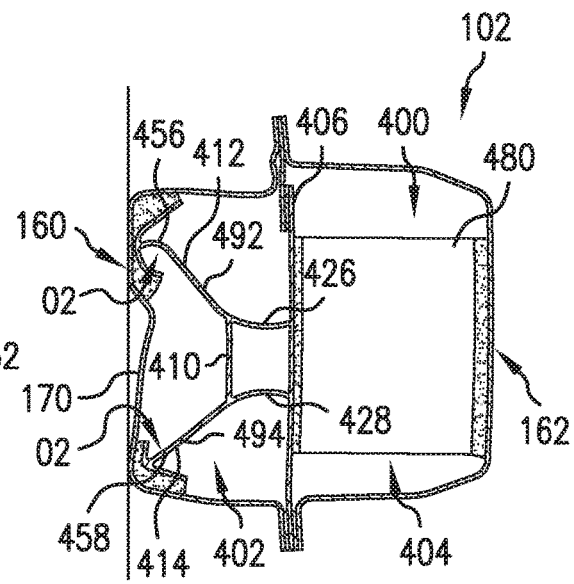

In FIG. 16A, initial force from a side impact to the outer panel member 160 of the structural member 102 causes partial deformation of the side wall 170 and the first and second legs 412, 414 of the outer section 402. The end portion 456 of the first leg 412 begins to kink or bend at point 01 due to deformation of the joint defined by the flange 464 adhered to the upper corner portion 220. FIG. 16B shows the first leg 412 continuing to kink or bend at point 02, wherein a section 492 of the first leg 412 located between the end portions 426, 456 begins to fold upwardly in the vehicle body height direction toward the tension web 406 generally about the intersection between the wall part 436 of the closed cross-sectional portion 410 and the end portion 426 of the first leg 412. The end portion 458 of the second leg 414 also begins to kink or bend caused by deformation of the joint defined by the flange 466 adhered to the lower corner portion 222.

Figure 16C:
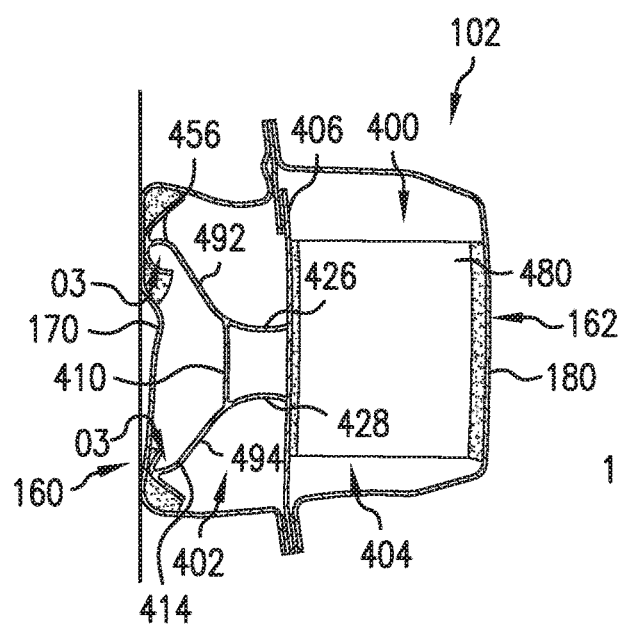
Figure 16D:
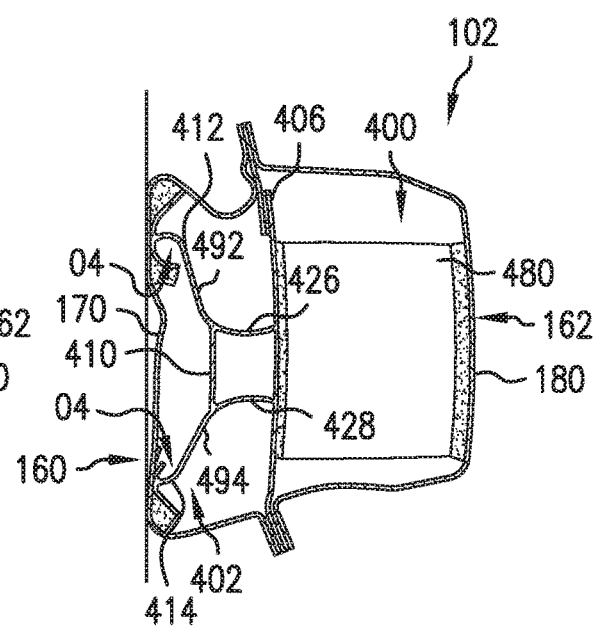

In FIG. 16C, the lateral load continues to fold the first leg 412 of the outer section 402 at point 03, and the section 492 of the first leg 412 is moved substantially parallel to the tension web 406. Further, a section 494 of the second leg 414 located between the end portions 428, 458 starts to fold downwardly in the vehicle body height direction toward the tension web 306 (see point 03) generally about the intersection between the wall part 436 of the closed cross-sectional portion 410 and the end portion 428 of the second leg 414. FIG. 16D depicts the section 492 of the first leg 412 and the section 494 of the second leg 414 bended more toward the tension web 406 (see point 04). The closed cross-sectional portion 410 presses against tension web 406 causing the tension web to at least partially bulge toward the side wall 180 of the inner panel member 162. This, in turn, causes partial bulging of the honeycomb structure 480 and the side wall 180. As depicted, the end portions 426, 428 (i.e., the substantially horizontal wall parts of the closed cross-sectional portion 410) also begin to at least partially collapse into the enclosed space 430 defined by the closed cross-sectional portion 410.

Figure 16E:
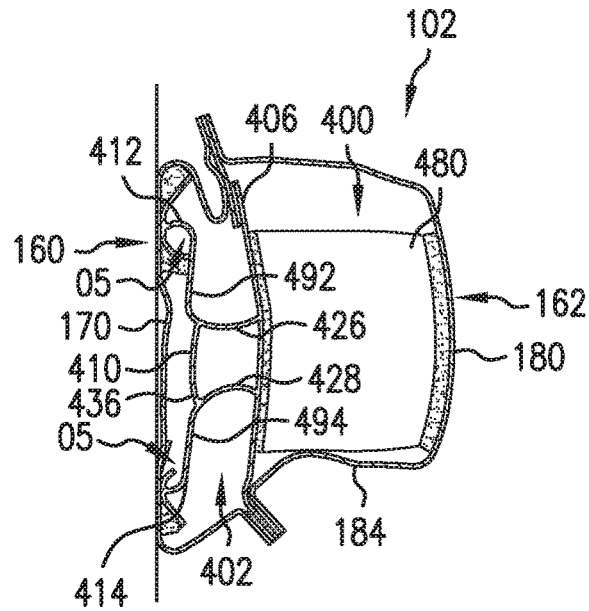
Figure 16F:
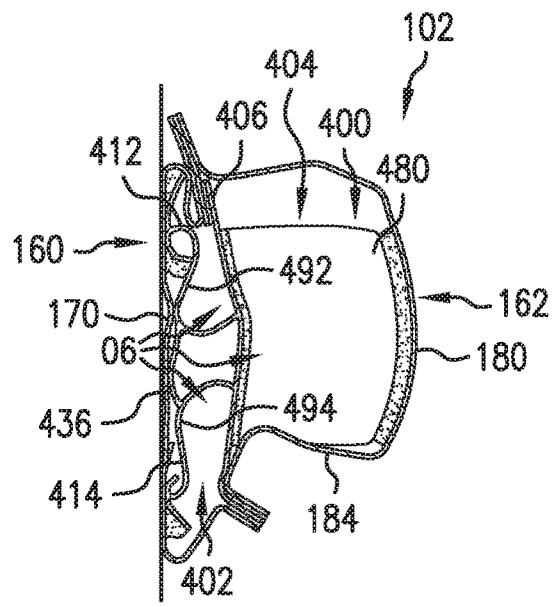

FIG. 16E depicts each of the sections 492, 494 of the respective first and second legs 412, 414 of the outer section 402 folded more toward the tension web 406, wherein each of the sections 492, 494 are oriented substantially parallel to the tension web 406 (see point 05). The tension web 406 and the honeycomb structure 480 are deformed more toward the side wall 180 of the inner panel member 162. In FIG. 16E, the wall part 436 of the closed cross-sectional portion 410 is in contact with the side wall 170 of the outer panel member 160, and the end portions 426, 428 are collapsed further toward one another. The tension web 406 in the area of the closed cross-sectional portion 410 bulges more toward the side wall 180 of the inner panel member 162 (see point 06). The continued lateral force applied to the structural member 102 further bulges the side wall 180 via the honeycomb structure 480. Further, the bottom wall 184 of the inner panel member protrudes into the honeycomb structure 480.

Figure 16G:
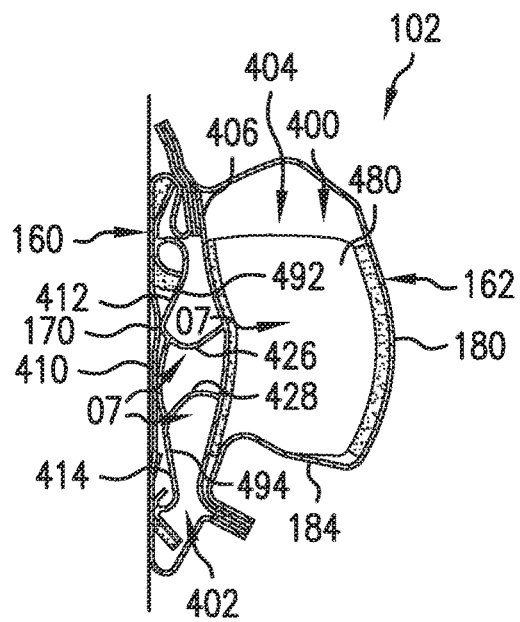
Figure 16H:
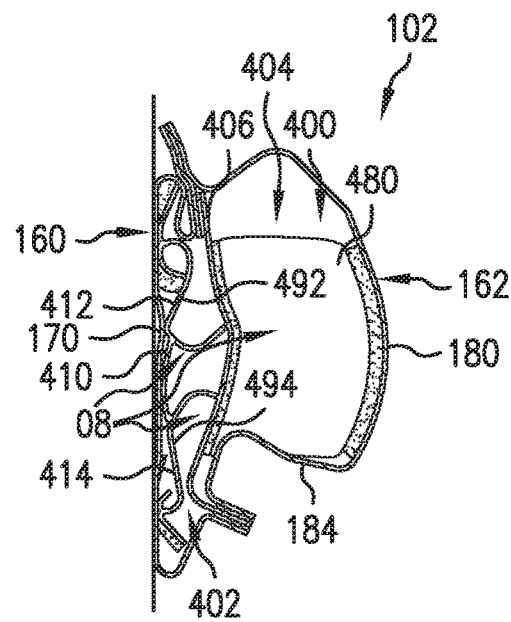
Figure 16I:
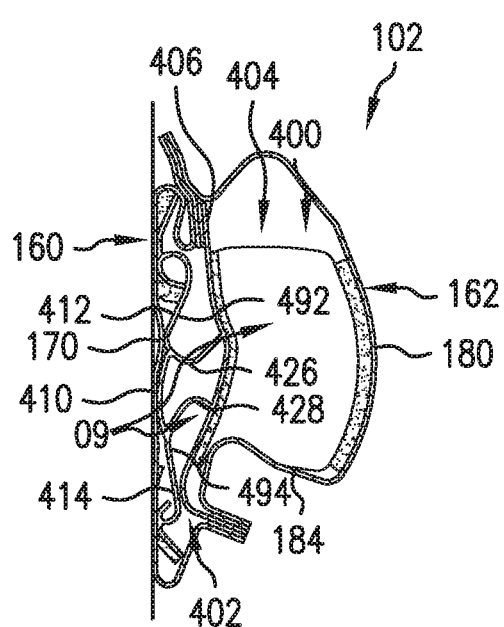
Figure 16J:
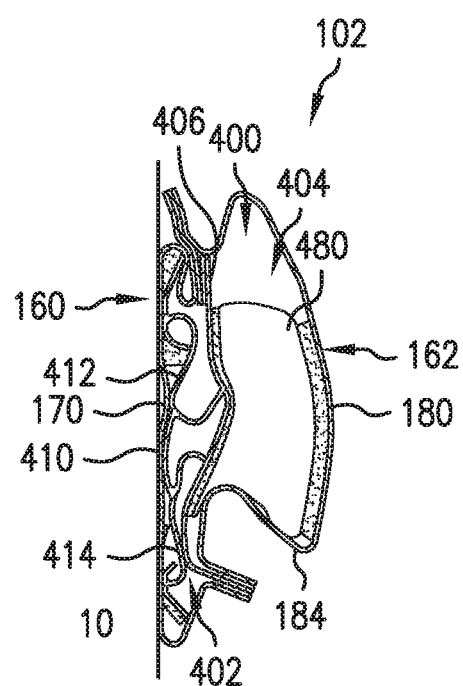

As illustrated in FIGS. 16G and 16H, the closed cross-sectional portion 410 of the outer section 402 continues to deform from the lateral force applied to the structural member 120. And the tension web 406 and honeycomb structure 480 deform further toward the side wall 180 of the inner panel member 162 (see points 07 and 08). FIG. 16I depicts the first and second legs 412, 414 and the closed cross-sectional portion 410 of the outer section 402 further deformed (see point 09). FIG. 16J depicts a final deformed state of the structural member 102 and reinforcement member 400 at point 10 on the graph of FIG. 15.

Figure 17A:
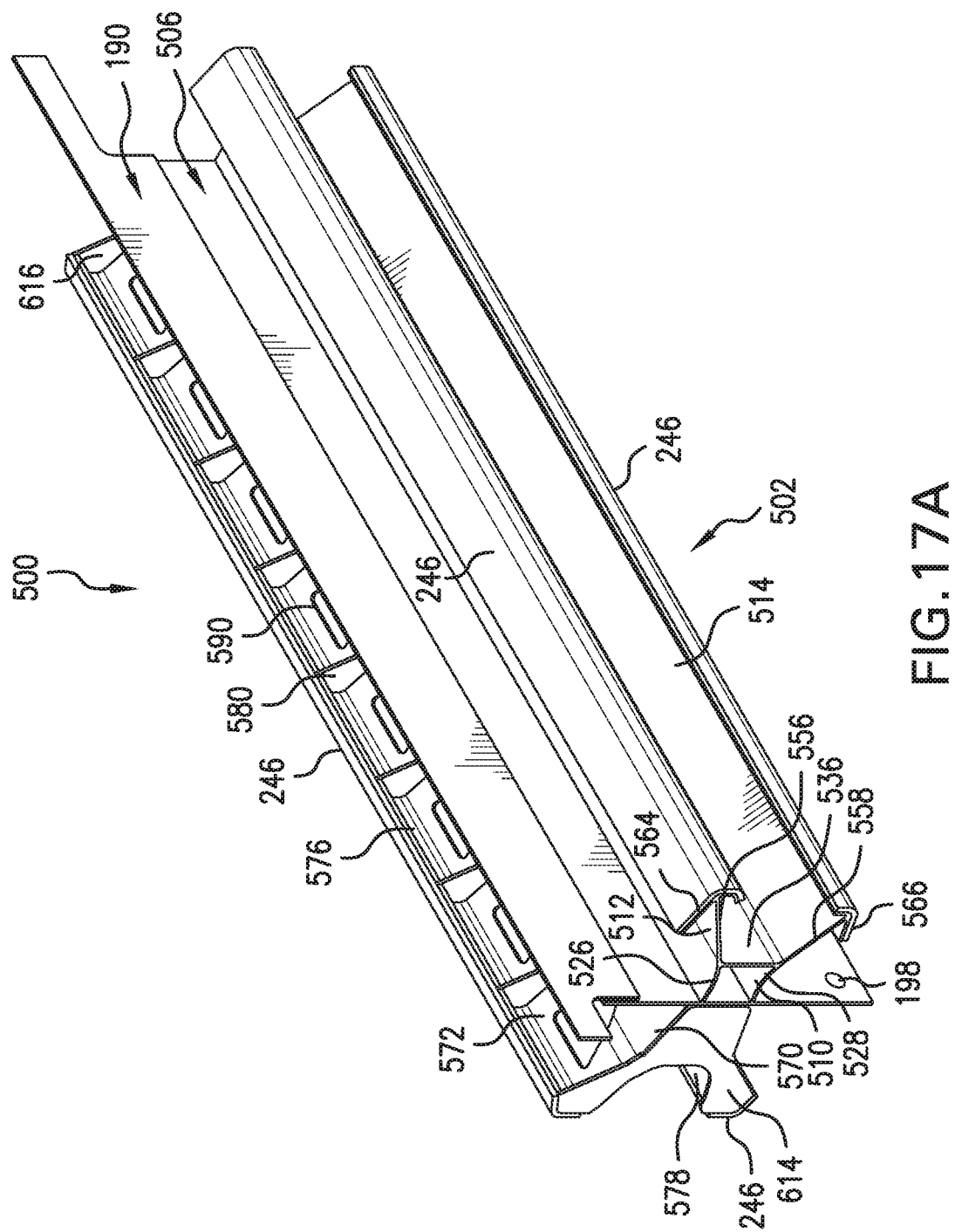
FIG. 17A is a perspective view of an exemplary reinforcement member according to yet another embodiment of the present disclosure for the structural member of the vehicle body portion of FIG. 1.
Figure 17B:
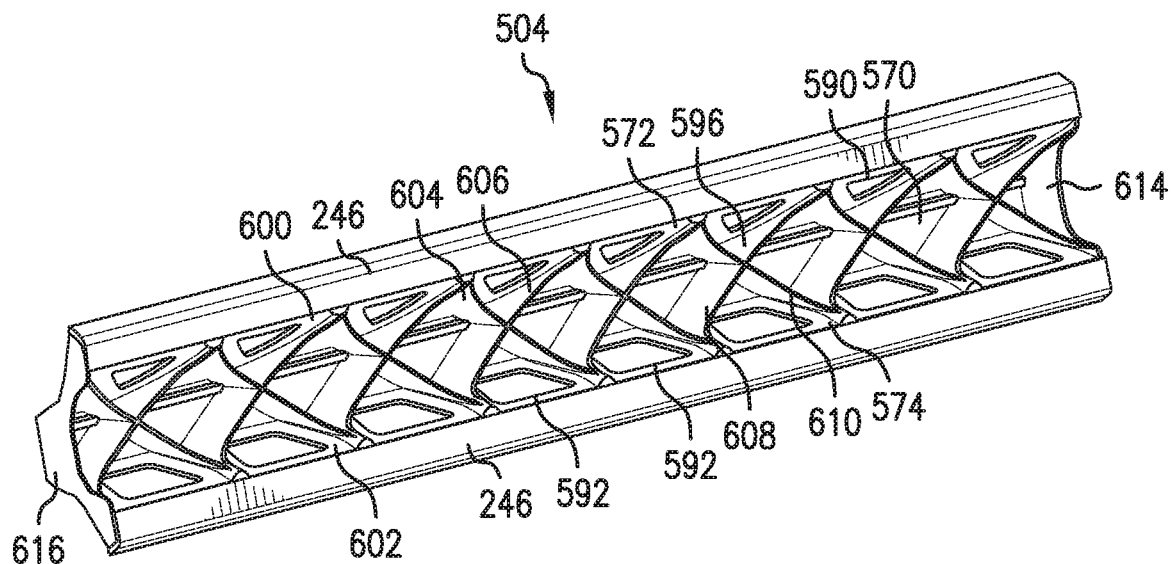
FIGS. 17B and 17C are perspective views of part of the reinforcement member of FIG. 17A.
Figure 17C:
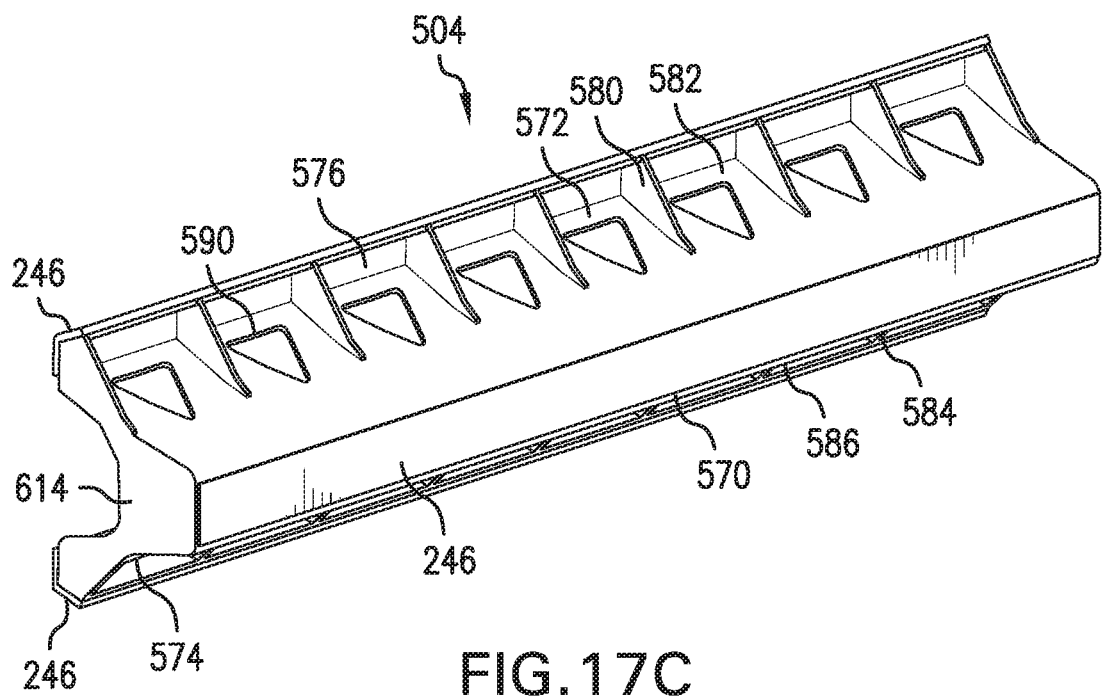

FIGS. 17A-17C depict an exemplary reinforcement member 500 according to another embodiment of the present disclosure. The reinforcement member 500 includes an outer section 502, an inner section 504, and a tension web 506 interposed between and directly contacting the outer section 502 and the inner section 504. The outer section 502 is structurally similar to the outer sections 302, 402 of the reinforcement members 300, 400. Therefore, similar components are identified with like reference numerals, but with the integer "5" (e.g., closed cross-sectional portion 310, 410 is referenced as 510). Like the outer sections 302, 402, the outer section 502 includes a closed cross-sectional portion 510 and first and second legs 512, 514 extending outwardly from the closed cross-sectional portion 510. End portions 526, 528 of the respective first and second legs 512, 514 define substantially horizontal wall parts of the closed cross-sectional portion 510. Again, the end portions 526, 528 are curved toward one another and are adapted to at least partially collapse into the closed cross-sectional portion during a side impact to the structural member 102. Wall part 536 of the closed cross-sectional portion 510 is spaced from and extends substantially parallel to the tension web 506. Flanges 564, 566 located on end portions 556, 558 of the respective first and second legs 512, 514 have placed thereon the adhesive 246. The adhesive 246 attaches the flanges 564, 566 to the respective upper and lower corner portions 220, 222 of the outer panel member 160.

The inner section 504 includes a base member 570 having an upper first leg 572 and a lower second leg 574. The base member 570 is adhered to the tension web 506 via the adhesive 246. It should be appreciated that the base member 570 can also be attached to the tension web 506 by conventional fasteners, such as clips or rivets. The first leg 572, which can extend continuously without interruption along the longitudinal extent of the base member 570, extends upwardly and outwardly from the base member. Similarly, the second leg 574, which can also extend continuously without interruption along the longitudinal extent of the base member 570, extends downwardly and outwardly from the base member. A distal end portion 576 of the first leg 572 has a shape complimentary to the upper corner portion 240 of the inner panel member 162. And a distal end portion 578 of the second leg 574 has a shape complimentary to the lower corner portion 242 of the inner panel member 162. The adhesive 246 is provided on each end portion 576, 578, which attaches the end portions to the respective upper and lower corner portions 240, 242 of the inner panel member 162.

According to one aspect, a plurality of spaced apart first reinforcing ribs 580 can be provided on an outer surface 582 of the first leg 572 along the elongated length of the first leg 572. And a plurality of spaced apart second reinforcing ribs 584 can be provided an outer surface 586 of the second leg 582 along the elongated length of the second leg 574. According to another aspect, located between each pair of adjacent first reinforcing ribs 580 is a first cutout 590, and located between each pair of adjacent second reinforcing ribs 584 is a second cutout 592. The first and second cutouts 590, 592 can reduce the overall weight of the inner section 504. In the depicted exemplary embodiment, a plurality of generally X-shaped third reinforcing ribs 596 can extend between an inner surface 600 of the first leg 572 and an inner surface 602 of the second leg 574. Upper end portions 604, 606 of each third reinforcing rib 596 flank one of the first cutouts 590, and lower end portions 608, 610 of each third reinforcing rib 596 flank one of the second cutouts 592. The inner section 504 can further include opposite end supports 614, 616.

The inner section 504 of the exemplary reinforcement member 500 is a one-piece, unitary member formed of a reinforced polymer. In one embodiment, the inner section 504 is formed from a fiber reinforced plastic including a plastic matrix material that encapsulates a fiber material. For example, the plastic matrix material can be nylon and/or the fiber material can be a plurality of glass fibers, which provides preferred structural characteristics while maintaining a reasonable weight for the inner section 504.

Figure 18:
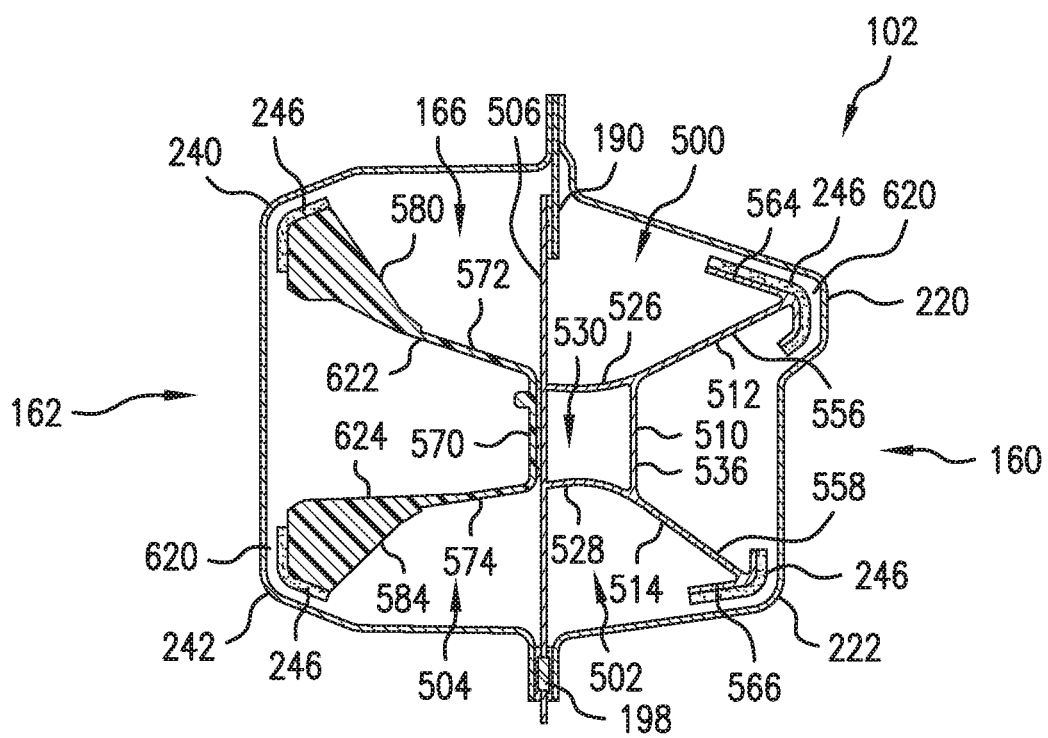
FIG. 18 is a cross-sectional view of the structural member of the vehicle body portion of FIG. 1 taken along line A-A of FIG. 1, the structural member including the reinforcement member of FIG. 17A prior to attachment to the structural member.
Figure 19:
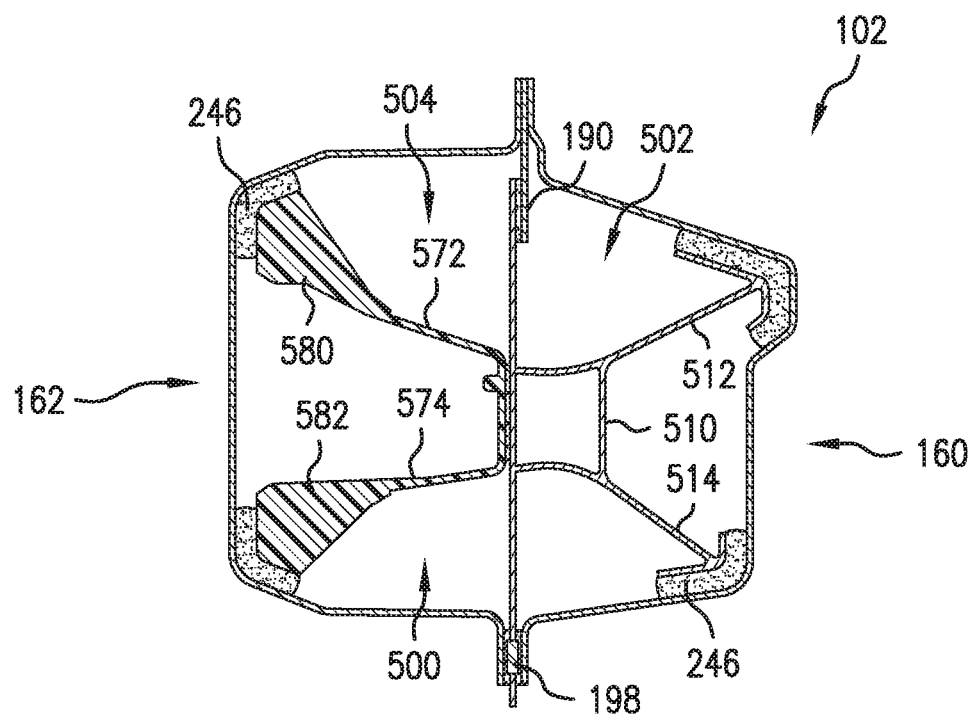
FIG. 19 depicts the reinforcement member of FIG. 18 fixedly attached to the structural member.

As depicted in FIGS. 18 and 19, the tension web 506 is secured to the outer and inner panel members 160, 162 of the structural member or side sill 102 in the same manner as the tension webs 126, 306, 406 (e.g., by use of the separate segment member 190 and joining part 198). Accordingly, further discussion of the connection of the reinforcement member 500 within the cavity 166 of the structural member 102 will also be omitted for conciseness. As shown in FIG.

18, the reinforcement member 500 is initially positioned in the structural member 102 such that a gap 620 is provided between the reinforcement member 500 and the inner surfaces of the outer and inner panel members 160, 162. Again, the gap 620 allows for the provision of the anticorrosion coating on the inner surface of the structural member by an electrocoat process. The outer section 502 faces the outer panel member 160 with the first and second legs 512, 514 extending toward the inner surface of the outer panel member 160, and the inner section 504 faces the inner panel member 162 with the first and second legs 572, 574 extending toward the inner surface of the inner panel member 162. As best depicted in FIGS. 18 and 19, a kink or bend 622 is provided in the first leg 572 adjacent the first reinforcing ribs 580, and a kink or bend 624 is provided in the second leg 574 adjacent the second reinforcing ribs 582. It should be appreciated that the kinks 622, 624 in the respective first and second legs 572, 574 are adapted to tune or control deformation and bending of the inner section 504 to prevent breakage of the inner section 504 during a side impact to the structural member 102.

Figure 20:
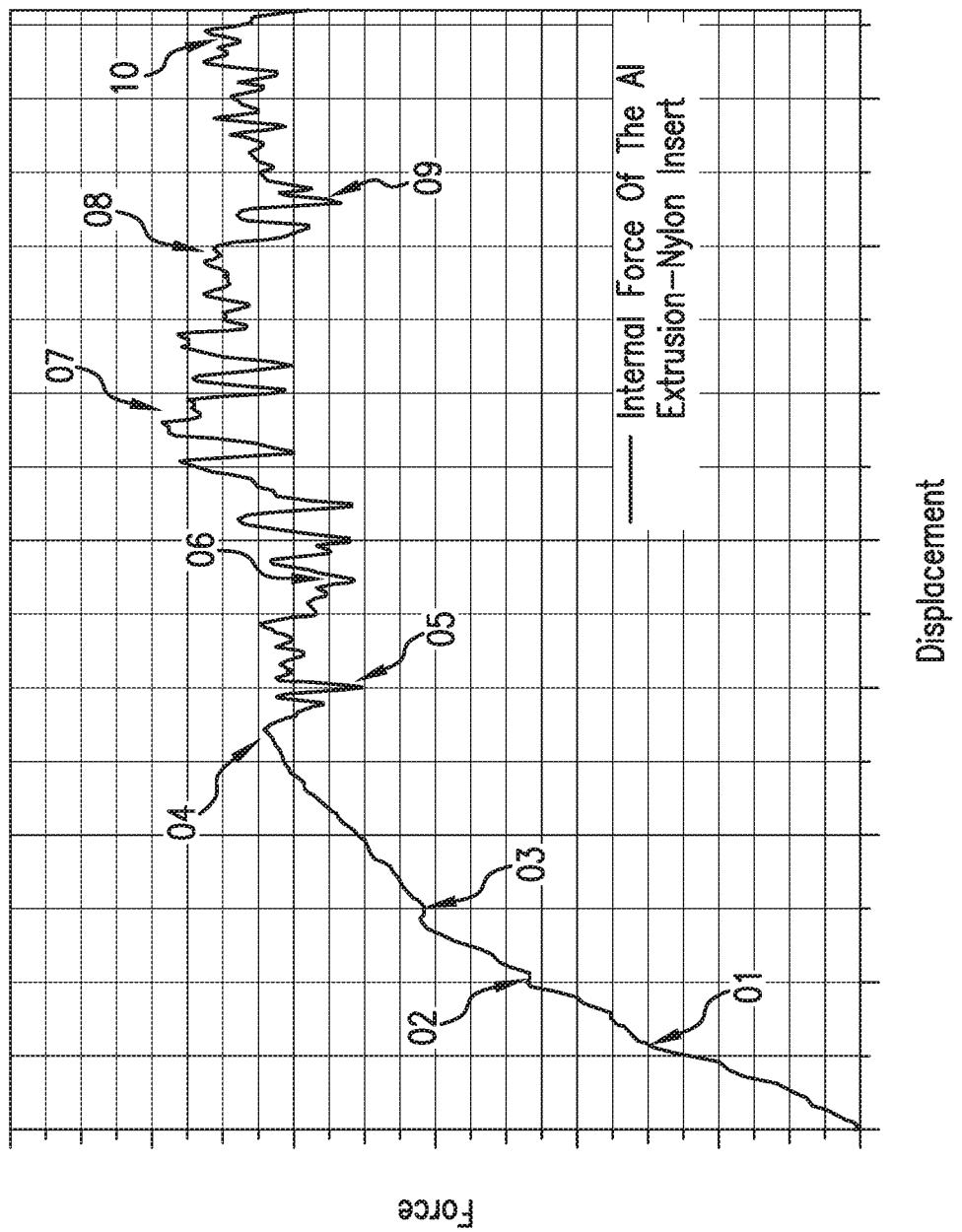
FIG. 20 is a graph illustrating impact force/displacement of the structural member including the reinforcement member of FIG. 17A caused by a side impact to the structural member.

FIG. 20 graphically depicts an impact or test barrier force verses displacement caused by a side impact to the structural member or side sill 102 having the reinforcement member 500 positioned in the cavity 166 of the structural member. FIGS. 21A-21J schematically depict, in cross-section, the deformation of the structural member 102 and reinforcement member 500 at selected points on the graph of FIG. 20. Similar to the previous embodiments of the reinforcement member, the first and second legs 512, 514 of the outer section 502 together with the first and second legs 572, 574 of the inner section 504 define a lateral load path from the outer panel member 160 to the inner panel member 162 during a side impact to the structural member 102.

In FIG. 21A, initial force from a side impact to the outer panel member 160 of the structural member 102 causes partial deformation of the side wall 170 and the first and second legs 512, 514 of the outer section 502. The end portion 556 of the first leg 512 begins to kink or bend at point 01 due to deformation of the joint defined by the flange 564 adhered to the upper corner portion 220. FIG. 21B shows the first leg 512 continuing to kink or bend, wherein a section 630 of the first leg 512 located between the end portions 526, 556 begins to fold upwardly in the vehicle body height direction toward the tension web 506 generally about the intersection between the wall part 536 of the closed cross-sectional portion 510 and the end portion 526 of the first leg 512 (which defines a substantially horizontal wall part of the closed cross-sectional portion 510). Lateral load is also being transferred to the tension web 506 at point 02 causing slight deformation of the tension web 506.

In FIG. 21C, the lateral load continues to fold the first leg 512 of the outer section 502 at point 03, and the section 630 of the first leg 512 is moved substantially parallel to the tension web 506. The end portion 558 of the second leg 514 also begins to kink or bend at point 03 caused by deformation of the joint defined by the flange 566 adhered to the lower corner portion 222. Further, a section 632 of the second leg 514 located between the end portions 528, 558 folds downwardly in the vehicle body height direction toward the tension web 506 (see point 03) generally about the intersection between the wall part 536 of the closed cross-sectional portion 510 and the end portion 528 of the second leg 514 (which defines a substantially horizontal wall part of the closed cross-sectional portion 510). It should be appreciated that the lateral load path of each of the first and second legs 512, 514 is directed though the closed cross-sectional portion 510 and the tension web 506 to the inner section 504. The tension web 506 begins to bulge toward the side wall 180 of the inner panel member 162. This causes slight deformation of the first and second legs 572, 574 of the inner section 504 at their respective kinks 622, 624.

FIG. 21D depicts the section 630 of the first leg 512 bended more toward the tension web 506 and the section 622 of the second leg 514 substantially parallel to the tension web 506. The closed cross-sectional portion 510 begins to partially deform, and the end portions 526, 528 (i.e., the substantially horizontal wall parts of the closed cross-sectional portion 510) begin to at least partially collapse into the enclosed space defined by the closed cross-sectional portion 510. The wall part 536 bulges toward the side wall 170 of the outer panel member 160. And the closed cross-sectional portion 510 at least partially forces the base member 570 of the inner section 504 toward the side wall 180 of the inner panel member 162. This, in turn, causes each of the first and second legs 572, 574 to further deform at their respective kinks 622, 624 due to the joints defined by the respective end portions 576, 578 adhered to the upper and lower corner portions 240, 242. As depicted, the first leg 572 begins to fold upward in the vehicle height direction about the kink 622, and the second leg 574 also begins to fold upward in the vehicle height direction about the kink 624 Further, the continued lateral force applied to the outer panel member 160 continues to deform the tension web 506.

Figure 21E:
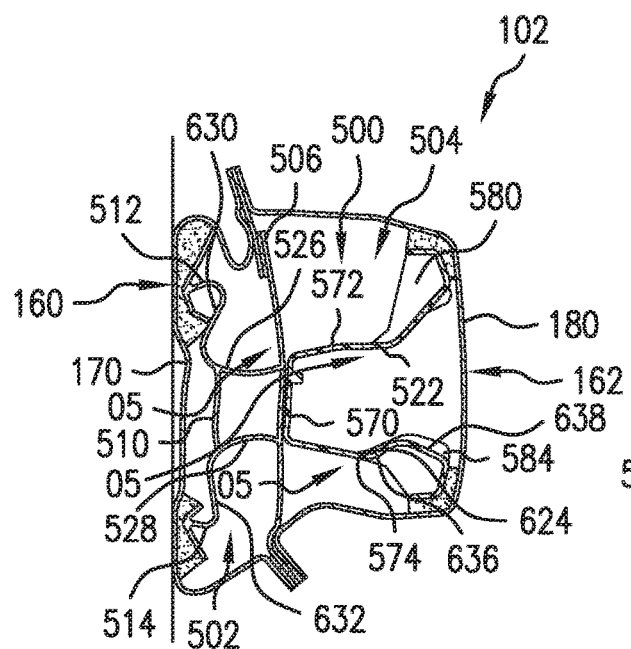
Figure 21F:
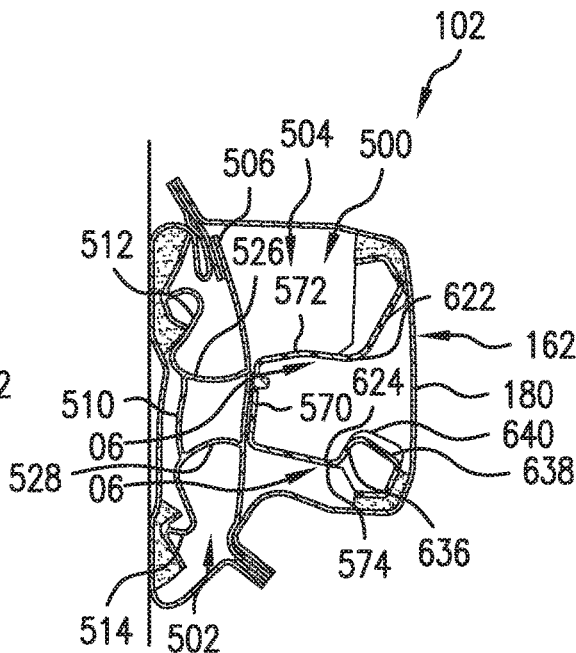

FIGS. 21E and 21F depict each of the sections 630, 632 of the respective first and second legs 512, 514 of the outer section 502 folded more toward the tension web 506. The portions 526, 528, which define the substantially horizontal wall parts of the closed cross-sectional portion 510, are collapsed further toward one another. The tension web 506 in the area of the closed cross-sectional portion 510 bulges more toward the side wall 180 of the inner panel member 162 (see point 05). The continued lateral force applied to the structural member 102 causes the first leg 572 to fold further upward about the kink 622. A section 636 of the second leg 574 folds upward about the kink 624 and a section 638 of the second leg laterally inward of the section 636 begins to fold downward about a separate kink or bend 640 (see points 05 and 06). This is at least partially due to engagement of the second reinforcing ribs 584 with the side wall 180.

Figure 21G:
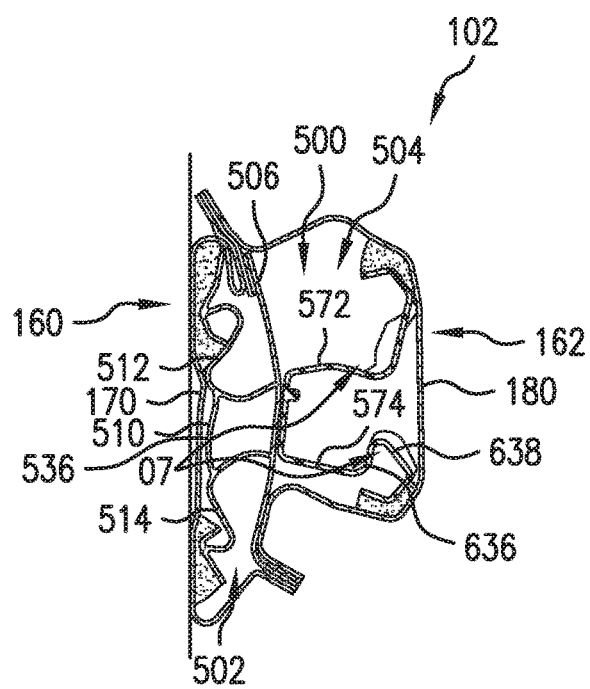
Figure 21H:
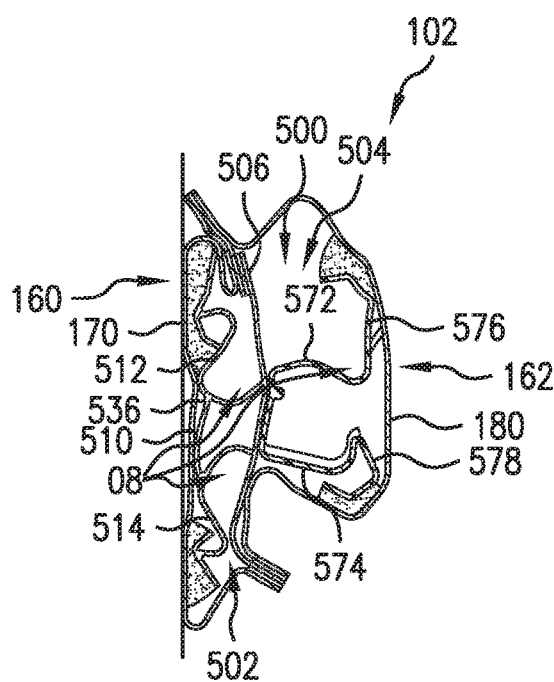

As illustrated in FIGS. 21G and 21H, the closed cross-sectional portion 510 of the outer section 502 continues to deform from the lateral force applied to the structural member 120. The wall part 536 of the closed cross-sectional portion 510 is moved into contact with the side wall 170 of the outer panel member 160. And the end portions 576, 578 of the first and second legs 572, 574 of the inner section 504 continue to fold along the side wall 180 of the inner panel member 162 (see points 07 and 08). FIG. 21I depicts the first and second legs 572, 574 of the inner section 504 further deformed (see point 09). FIG. 21J depicts a final deformed state of the structural member 102 and reinforcement member 500 at point 10 on the graph of FIG. 20.

Figure 22:
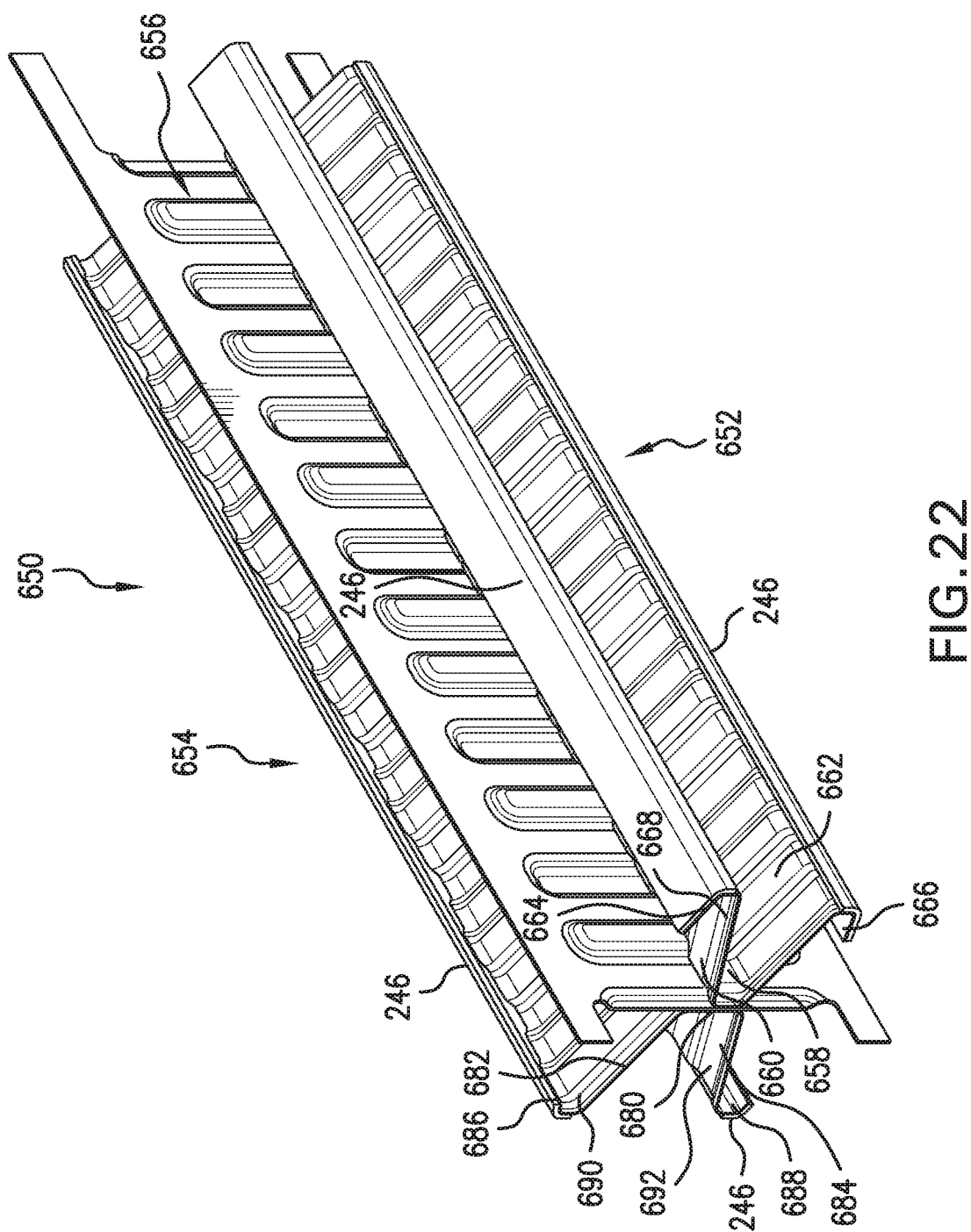
FIG. 22 is a perspective view of an exemplary reinforcement member according to a further embodiment of the present disclosure for the structural member of the vehicle body portion of FIG. 1.

FIG. 22 depicts an exemplary reinforcement member 650 according to another embodiment of the present disclosure. The reinforcement member 650 incudes an outer section 652, an inner section 654, and a tension web 656 interposed between and directly contacting the outer section 652 and the inner section 654. According to one aspect, the outer section 652 is substantially hat-shaped and includes a base member 658 and first and second legs 660, 662 extending outwardly from the base member 658. Flanges 664, 666 located on end portions 668, 670 of the respective first and second legs 660, 662 have placed thereon the adhesive 246.

Similarly, the inner section 654 is also substantially hat-shaped and includes a base member 680 and first and second legs 682, 684 extending outwardly from the base member 680. As depicted, the base member 680 is sized greater than the base member 658. Flanges 686, 688 located on end portions 690, 692 of the respective first and second legs 682, 684 have placed thereon the adhesive 246. Each of the outer section 502, inner section 504 and tension web 506 can include a first metal or metal alloy, and can be formed of a steel or steel alloy. This allows the components 652, 654, 656 of the exemplary reinforcement member 650 to be fixedly attached to one another, such as by welding.

Figure 23:
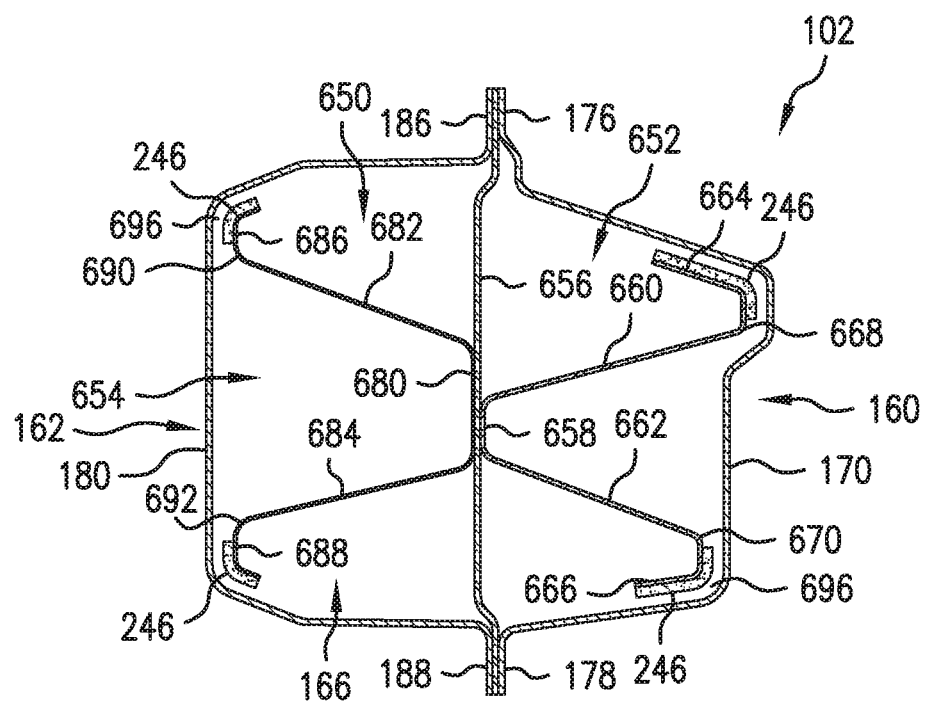
FIG. 23 is a cross-sectional view of the structural member of the vehicle body portion of FIG. 1 taken along line A-A of FIG. 1, the structural member including the reinforcement member of FIG. 22 prior to attachment to the structural member.
Figure 24:
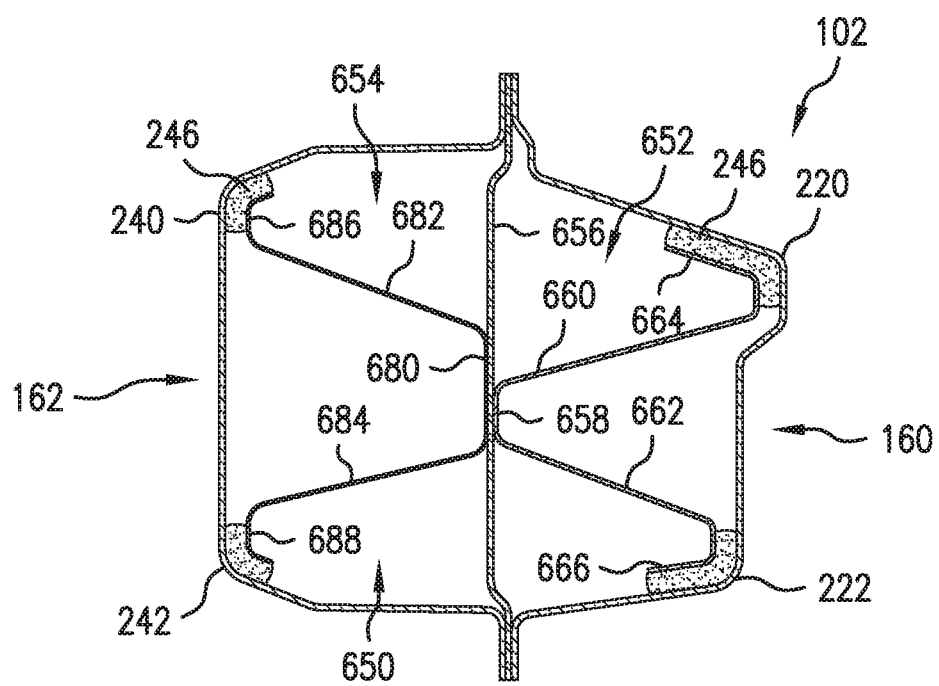
FIG. 24 depicts the reinforcement member of FIG. 23 fixedly attached to the structural member.

As shown in FIGS. 23 and 24, the reinforcement member 650 is positioned in the cavity 166 of the structural member 102 such that a gap 696 is initially provided between the reinforcement member 650 and the inner surfaces of the outer and inner panel members 160, 162. As indicated previously, the gap 696 allows for the provision of the anticorrosion coating on the inner surface of the structural member by an electrocoat process. The outer section 652 faces the outer panel member 160 with the first and second legs 660, 662 extending toward the inner surface of the outer panel member 160, and the inner section 654 faces the inner panel member 162 with the first and second legs 682, 684 extending toward the inner surface of the inner panel member 162. The tension web 656 is secured to the outer and inner panel members 160, 162 of the structural member 102 by fixedly attaching the tension web 656 to the upper flanges 176, 186 and lower flanges 178, 188 of the outer and inner panel members 160, 162. The adhesive 246 attaches the flanges 664, 666 to the respective upper and lower corner portions 220, 222 of the outer panel member 160 and attaches the flanges 686, 688 to the respective upper and lower corner portions 240, 242 of the inner panel member 162.

Figure 25:
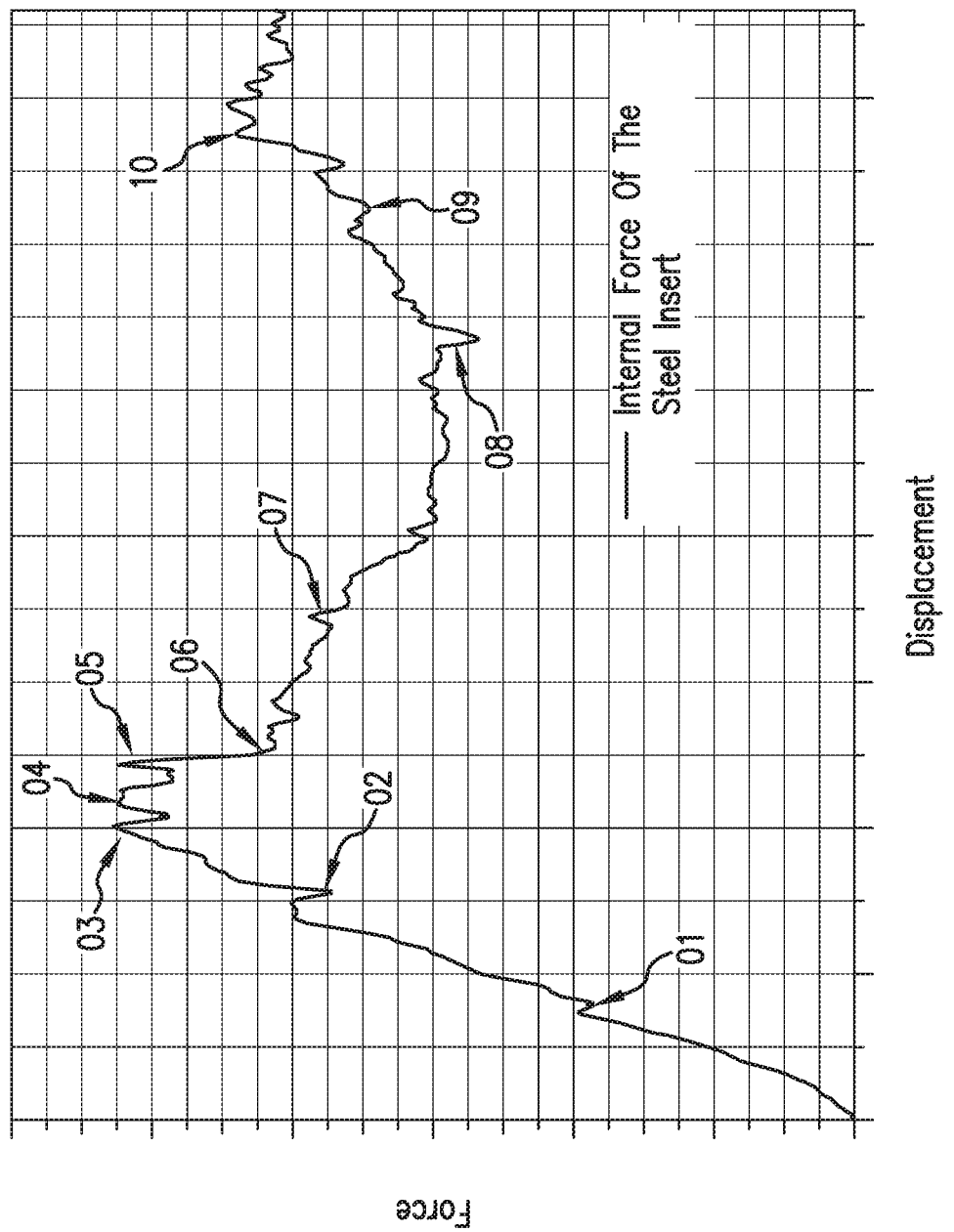
FIG. 25 is a graph illustrating impact force/displacement of the structural member including the reinforcement member of FIG. 22 caused by a side impact to the structural member.

FIG. 25 graphically depicts an impact or test barrier force verses displacement caused by a side impact to the structural member or side sill 102 having the reinforcement member 650 positioned in the cavity 166 of the structural member. FIGS. 26A-26J schematically depict, in cross-section, the deformation of the structural member 102 and reinforcement member 650 at selected points on the graph of FIG. 25. Similar to the previous embodiments of the reinforcement member, the first and second legs 660, 662 of the outer section 652 and the first and second legs 682, 684 of the inner section 654 of the exemplary reinforcement member 650 define a lateral load path from the outer panel member 160 toward the inner panel member 162 during a side impact to the structural member 102.

Figure 26A:
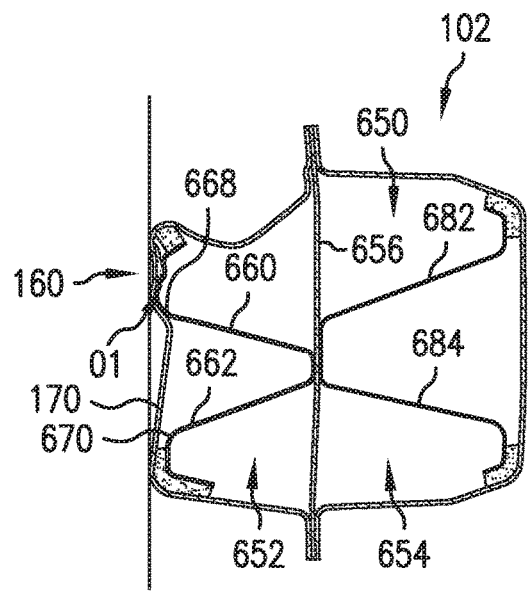
FIGS. 26A-26J depict the displacement of the structural member and reinforcement member of FIG. 22 at selected points on the graph of FIG. 25.
Figure 26B:
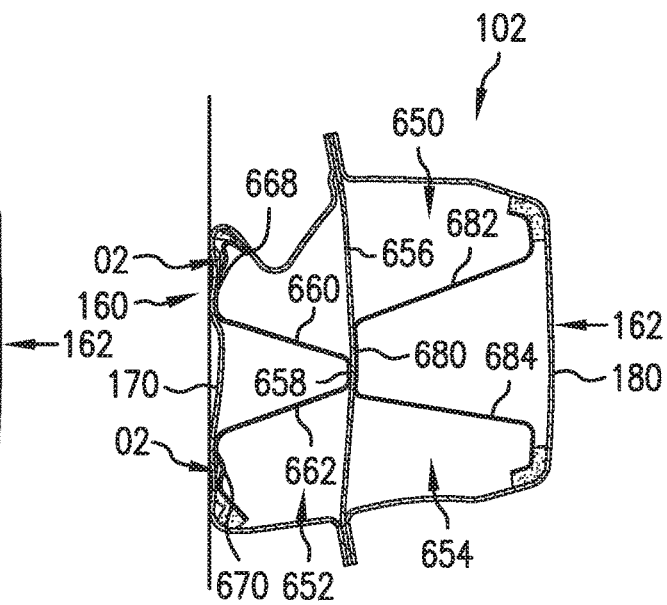
Figure 26C:
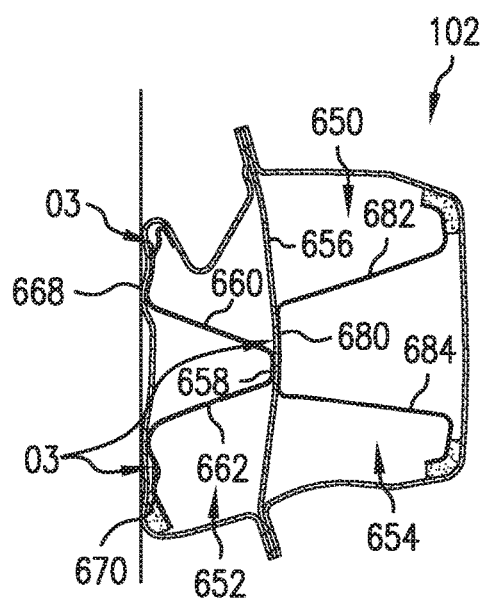
Figure 26D:
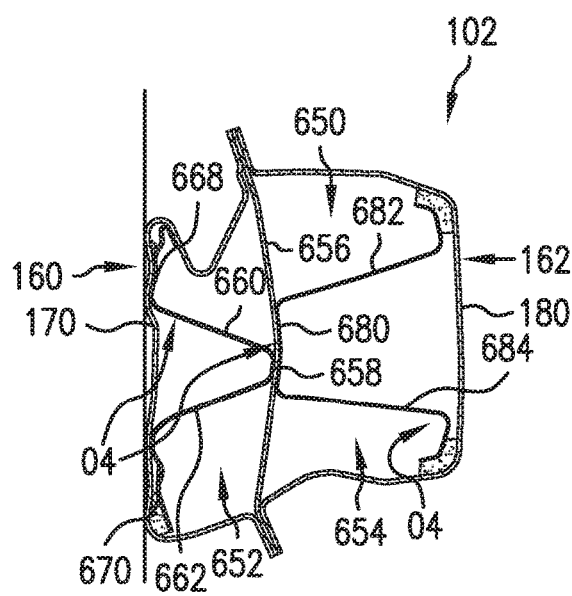

In FIGS. 26A and 26B, initial force from a side impact to the outer panel member 160 of the structural member 102 causes partial deformation of the side wall 170 and the first and second legs 660, 662 of the outer section 652 (see point 01). The end portions 668, 670 of the first and second legs 660, 662 start to fold onto the side wall 170 (see point 02). In FIG. 26C, the lateral load continues to fold the first and second legs 660, 662 of the outer section 652 at point 03. Further, the base member 658 of the outer section 652 bulges the tension web 656 together with the base member 680 of the inner section 654 toward the side wall 180 of the inner panel member 162 (see point 03). FIG. 26D depicts deformation of the base member 680 and the end portion 692 of the second leg 684 of the inner section 654 (see point 04).

Figure 26E:
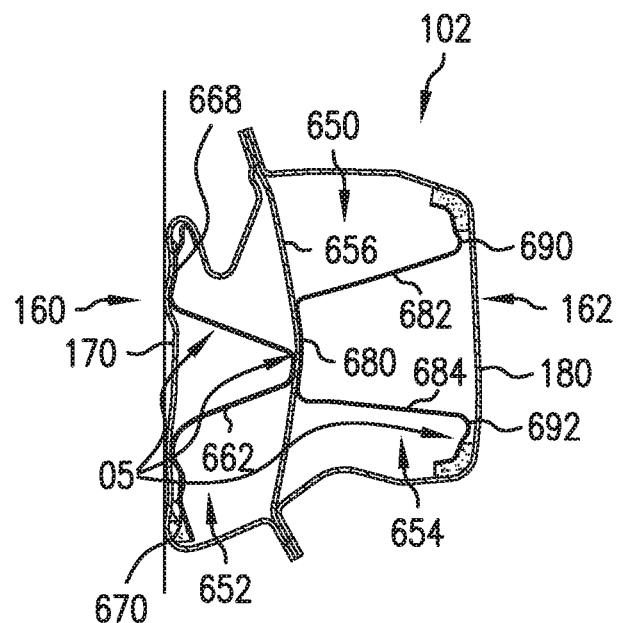
Figure 26F:
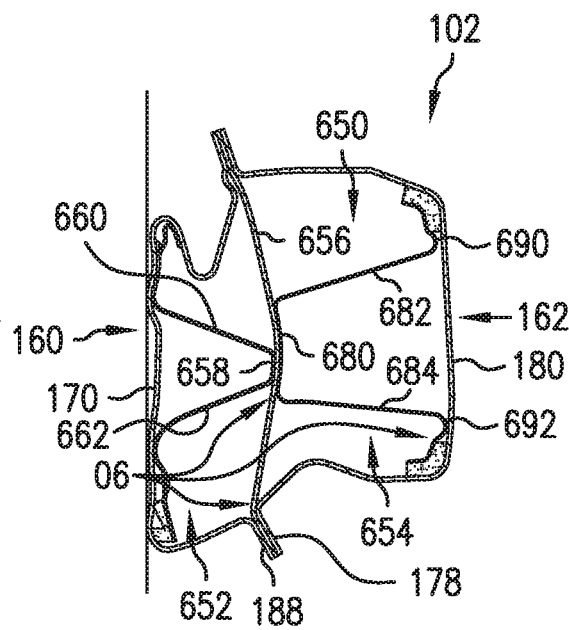
Figure 26G:
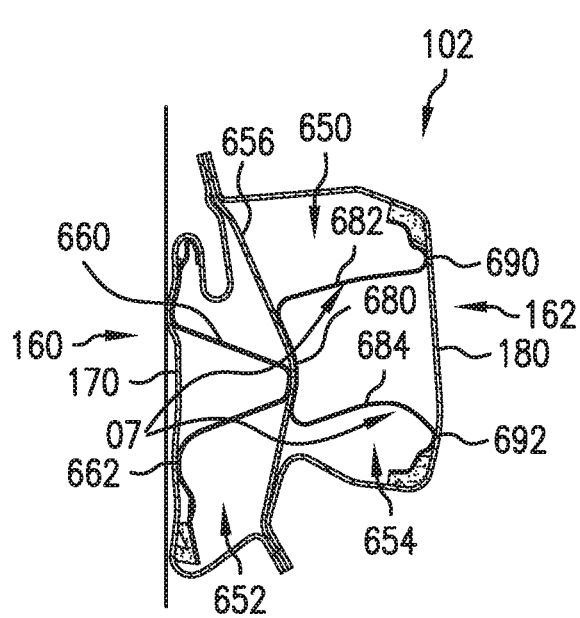
Figure 26H:
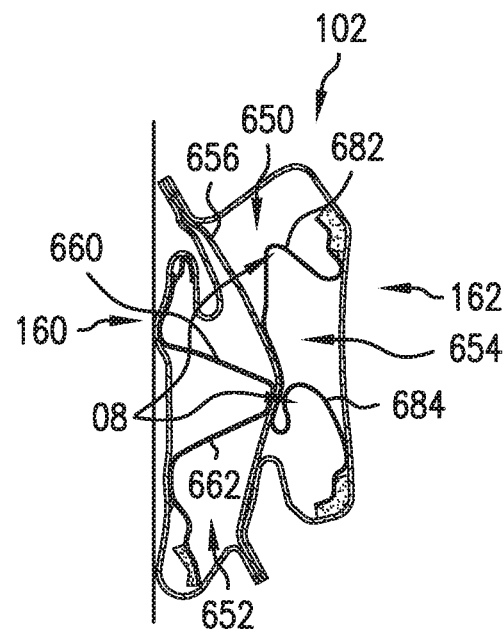
Figure 26I:
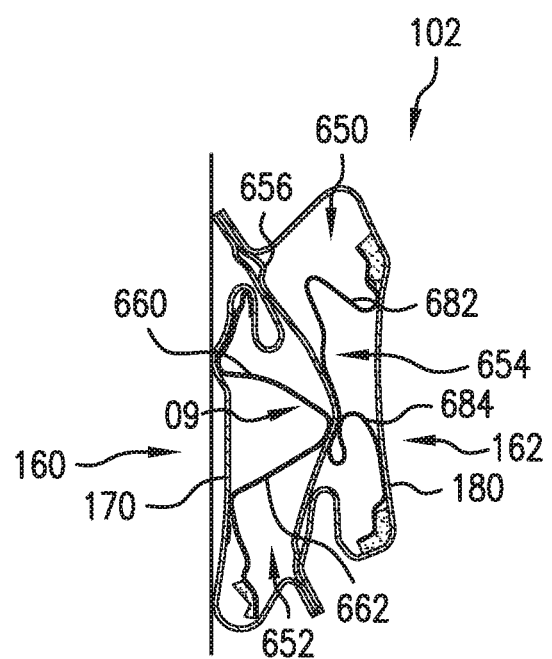
Figure 26J:
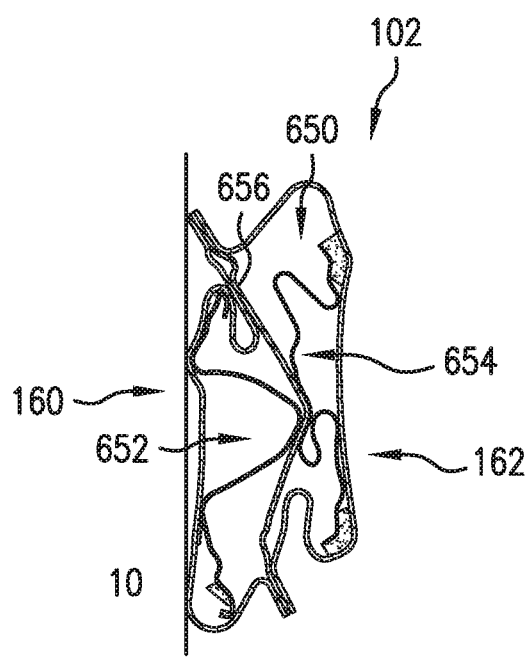

FIG. 26E depicts at point 05 further deformation of the first and second legs 660, 662 of the outer section 652 and the first and second legs 682, 684 of the inner section 654. FIG. 26F at point 06 shows deformation of the connection of the tension web 656 to the flanges 178, 188 of the outer and inner panel members 160, 162. FIGS. 26G and 26H depict the first and second legs 682, 684 of the inner section 656 being folded in a vehicle height direction toward the side wall 180 of the inner panel member 162 (see points 07 and 08). FIG. 26I depicts the first and second legs 682, 684 of the inner section 654 further deformed along the side wall 180 (see point 09). FIG. 26J depicts a final deformed state of the structural member 102 and reinforcement member 650 at point 10 on the graph of FIG. 25.

For the above embodiments of the reinforcement members 120, 300, 400, 500, 650, a vehicle body construction method will now be described. In the exemplary method, an elongated structural member 102 having an inner surface and defining an elongated cavity 166 is provided. The structural member 102 can be defined by an outer panel member 160 attached to an inner panel member 162. The structural member includes a first metal or metal alloy, and can be formed of a steel or steel alloy.

Next, a reinforcement member 120, 300, 400, 500, 650 is provided. The reinforcement member is adapted for insertion in the cavity 166 with a gap between the reinforcement member and the inner surface of the structural member 102. As set forth in detail above, the reinforcement member 120, 300, 400, 500, 650 comprises an outer section 122, 302, 402, 502, 652, an inner section 124, 304, 404, 504, 654 and a tension web 126, 306, 406, 506, 656 interposed between the inner and outer sections. The outer section 122, 302, 402, 502 can include a closed cross-sectional portion 130, 310, 410, 510 in direct contact with the tension web and having a side wall part 152, 336, 436, 536 spaced from and substantially parallel to the tension web 126, 306, 406, 506. The outer section and the tension web include a second metal or metal alloy different than the first metal or metal alloy, and can be formed of an aluminum or aluminum alloy. The inner section includes one of the first metal or metal alloy, the second metal or metal alloy, a reinforced polymer, and a honeycomb structure 480.

Next, an adhesive 246 can be applied onto contact portions of the reinforcement member 120, 300, 400, 500, 650. For example, the adhesive can be applied to contact portions of both the outer section and inner section of the reinforcement member. Next, the reinforcement member 120, 300, 400, 500, 650 can be installed within the structural member 120 to reinforce the structural member. Such installing of the reinforcement member 120, 300, 400, 500, 650 within the structural member 120 can include positioning the reinforcement member within the structural member 120 so that a gap is provided between the adhesive 246 and the inner surfaces of the outer panel member 160 and inner panel member 162. This allows anticorrosion fluid to flow between the reinforcement member 120, 300, 400, 500, 650 and the inner surface of the structural member 102. Next, the method includes subsequently applying heat to the adhesive 246 to expand the adhesive and bond the contact portions of the reinforcement member to the structural member 102.

Applied to the vehicle frame construction, positioning the reinforcement member 120, 300, 400, 500, 650 within the structural member 102 can involve positioning the reinforcement member with the adhesive 246 already applied thereon on one of the parts that comprise the structural member (e.g., the inner panel member 162) and then the other of the parts that comprise the structural member (e.g., the outer panel member 160) can be combined to enclose the reinforcement member. At this stage, the adhesive 246 has not yet had heat applied for heat activation thereof and thus does not fully function to define structural joints between the inner surface of the structural member 102 and the contact portions of the reinforcement member. However, when heat is applied to the adhesive 246 (e.g., as the vehicle body passes through various heating apparatus, e.g., ovens, to address surface finishing of the vehicle body), the adhesive 246 expands and bonds the contact portions of the reinforcement member 120, 300, 400, 500, 650 to the structural member 102. At this stage, the reinforcement member is fully installed within the structural member 102 and the structural member 102 is reinforced by the reinforcement member.

As is evident from the foregoing embodiments, a method of reinforcing a structural member 102 of a vehicle body is also provided. The structural member 102 includes an inner surface defining an elongated cavity 166, and an outer panel member 160 joined to an inner panel member 162. The method comprises providing a reinforcement member 120, 300, 400, 500, 650 including an outer section 122, 302, 402, 502, 652, an inner section 124, 304, 404, 504, 654 and a tension web 126, 306, 406, 506, 656 interposed between and directly secured to the outer and inner sections; providing an adhesive 246 on the reinforcement member 120, 300, 400, 500, 650; securing the tension web to the structural member 102 so that the tension web substantially separates the outer and inner panel members 160, 162; providing a gap between the adhesive 246 and the inner surface of the structural member 102 prior to activation of the adhesive 246; and activating the adhesive 246 to expand the adhesive outward from the reinforcement member into engagement with the inner surface of the structural member 102.

The outer section 122, 302, 402, 502 of the exemplary reinforcement member can include a closed cross-sectional portion 130, 310, 410, 510 and the method further includes positioning the closed cross-sectional portion in direct contact with the tension web and securing the inner section at the same location on the tension web as the closed cross-sectional portion. According to one aspect, the closed cross-sectional portion 310, 410, 510 is rectangular shaped, and the method includes configuring substantially horizontal wall parts of the closed cross-sectional portion to fold inwardly into the closed cross-sectional portion during a side impact to the outer panel member 160 of the structural member 102. According to one aspect, at least one of the outer section and inner section can include first and second legs extending toward the structural member 102 and the method includes configuring a portion each of the first and second legs to fold at least partially into the tension web during a side impact to the outer panel member 160 of the structural member. According to another aspect, the inner section 404 includes a honeycomb structure 480 having a plurality of opening, and the method includes orienting the opening substantially normal to a longitudinal axis of the structural member 102.

Figure 27:
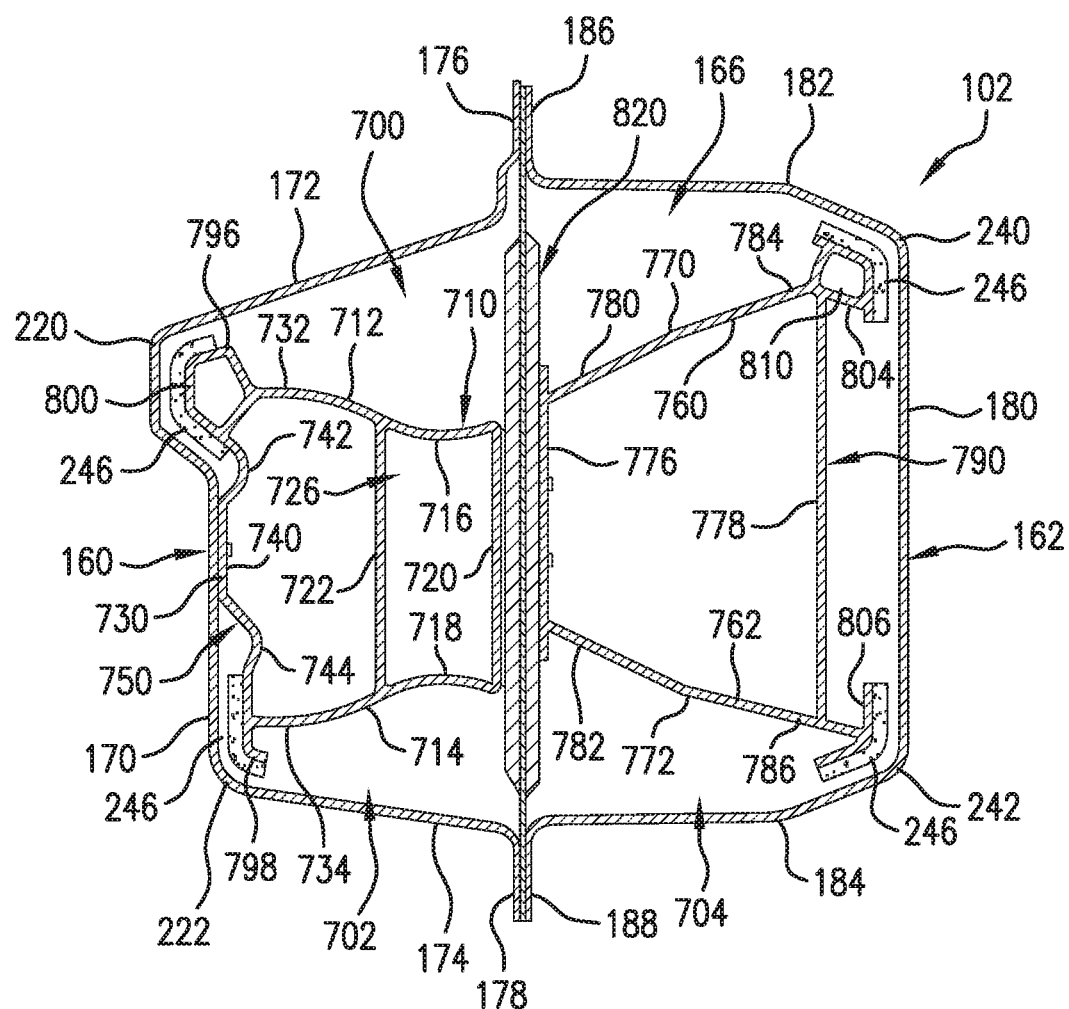
FIG. 27 is a cross-sectional view of the structural member of the vehicle body portion of FIG. 1 taken along line A-A of FIG. 1, the structural member including an exemplary reinforcement member according to another embodiment of the present disclosure fixedly attached to the structural member.

FIG. 27 depicts an exemplary reinforcement member 700 according to another aspect of the present disclosure. The reinforcement member 700 includes an outer section 702 and an inner section 704. The outer section 702 of the reinforcement member 700 includes a first closed cross-sectional portion 710 and first and second legs 712, 714 extending outwardly from the first closed cross-sectional portion 710. It should be appreciated that the first closed cross-sectional portion 710 effectively shortens the first and second legs 712, 714, making the first and second legs 712, 714 stiffer in compression. The first closed cross-sectional portion 710 is at least partially defined by respective end portions 716, 718 of the first and second legs 712, 714. The end portions 716, 718 define substantially horizontal wall parts of the first closed cross-sectional portion 710. The first closed cross-sectional portion 710 is further defined by substantially vertical wall parts 720, 722. The substantially horizontal wall parts 716, 718 of the first closed cross-sectional portion 710 are at least partially curved toward one another, and are adapted to at least partially collapse into an enclosed space 726 defined by the first cross-sectional portion 710. The outer section 702 of the reinforcement member 700 further includes an outer substantially vertically wall part 730 interconnecting opposite end portions 732, 734 of the respective first and second legs 712, 714. The substantially vertically wall part 730 includes a centrally located section 740 and curved sections 742, 744 provided on opposite ends of the central section 740. The substantially vertically wall parts 722, 730 and the end portions 732, 734 define a second closed cross-sectional portion 750.

The inner section 704 of the exemplary reinforcement member 700 includes first and second legs 760, 762. At least one of the first and second legs 760, 762 of the inner section 704 has a kink or bend which moves the one leg slightly toward the other leg. The kink is provided to control deformation of that leg during a side or lateral impact to the structural member. As depicted, the first leg 760 includes an upward kink 770 located substantially centrally on the first leg 760, and the second leg 762 includes a downward kink 772 located substantially centrally on the second leg 762. The inner section 704 further includes a pair of substantially vertical wall parts 776, 778. The substantially vertical wall part 776 interconnects end portions 780, 782 of the respective first and second legs 760, 762. And the substantially vertical wall part 778 interconnects opposite end portions 784, 786 of the respective first and second legs 760, 762. The first and second legs 760, 762 together with the substantially vertical wall parts 776, 778 define a closed cross-sectional portion 790.

As shown in FIG. 27, when initially positioned in the cavity 166 of the structural member 102 a gap is provided between the reinforcement member 700 and the inner surfaces of the outer and inner panel members 160, 162 which allows for the provision of the anticorrosion coating on the inner surface of the structural member 102 by an electrocoat process. The outer section 702 faces the outer panel member 160 with the first and second legs 712, 714 extending toward the inner surface of the outer panel member 160, and the inner section 704 faces the inner panel member 162 with the first and second legs 762, 764 extending toward the inner surface of the inner panel member 162. The end portions 732, 734 of the respective first and second legs 712, 714 of the outer section 702 are provided with flanges 796, 798 shaped to conform to respective upper and lower corner portions 220, 222 of the outer panel member 160. As depicted, the flange 796 is at least partially defined by a closed cross-sectional portion or lobe 800. Similarly, end portions 784, 786 of the respective first and second legs 760, 762 of the inner section 704 are provided with flanges 804, 806 shaped to conform to respective upper and lower corner portions 240, 242 of the inner panel member 162. As depicted, the flange 804 is at least partially defined by a closed cross-sectional portion or lobe 810. The lobes 800, 810 enhance bend performance of the reinforcement member 700.

Figure 29:
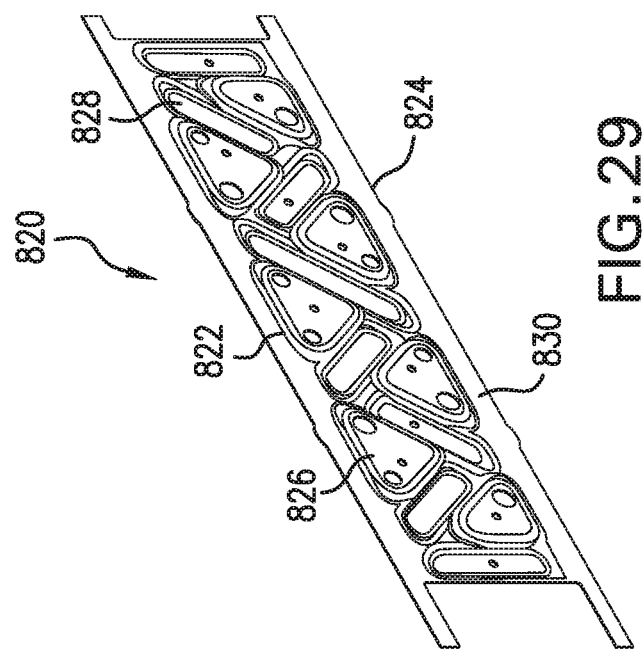
FIGS. 28 and 29 are perspective views of a tension web for the reinforcement member of FIG. 27.
Figure 28:
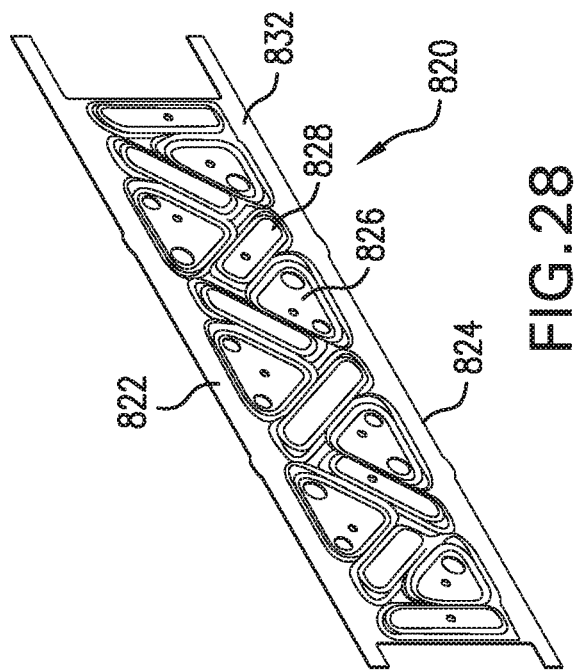

To secure the reinforcement member 700 with the cavity 166 of the structural member 102, the substantially vertical wall parts 720, 776 of the respective outer and inner sections 702, 704 are secured to a tension web 820. As shown in FIGS. 28 and 29, the tension web 820 includes an upper portion 822 and a lower portion 824. A plurality of formations 826, 828 (e.g., depressions or cavities) are provided on the tension web 820. The formations 826 are of a first shape (e.g., a triangular shape) and protrude from a first surface 830 of the tension web. The formations 828 are of a second shape (e.g., a rectangular shape) and protrude from a second opposite surface 830 of the tension web 820. According to one aspect, the formations 826 are separated from one another by the formations 828. As indicated previously, the structural member 102 includes a first metal or a metal alloy, and can be formed of a steel or steel alloy. The tension member 820 can also be formed of the first metal or metal alloy allowing the upper and lower portions 822, 824 to be directly connected to the respective upper flanges 176, 186 and the lower flanges 178, 188 of the outer and inner panel members 160, 162. The outer and inner sections 702, 704 of the reinforcement member 700 are formed of a second metal or metal alloy different from the first metal or metal alloy (e.g., an aluminum or aluminum alloy). This allows the outer and inner sections 702, 704 to be integrally formed as a one-piece, unitary member, such as by an extrusion process.

The substantially vertical wall part 720 of the outer section 702 is adhered to the tension web 820 and the substantially vertical wall part 776 of the inner section 704 is fastened to the tension web 820 (e.g., by use of a self-piercing rivet). Similarly, the central section 740 of the substantially vertical wall part 730 of the outer section 702 is secured to the side wall 170 of the outer panel member 160 (e.g., by use of a self-piercing rivet). Because of the differing materials an adhesive/insulator can be placed between the tension web 820 and the wall part 720 and between the side wall 170 and the wall part 730 to prevent galvanic corrosion. The adhesive 246 is secured to each of the flanges 796, 798 of the outer section 702 and each of the flanges 804, 806 of the inner section 704.

FIGS. 30-36 depict an exemplary reinforcement member 850 according to another aspect of the present disclosure. The reinforcement member 850 includes an outer section 852, an inner section 854, and the tension web 820 interposed between the outer and inner sections 852, 854. The outer section 852 of the reinforcement member 850 includes substantially horizontal wall parts (i.e., first and second legs) 860, 862 and substantially vertical wall parts 864, 866. The wall parts 860-866 of the outer section 852 define a closed cross-sectional portion 870 having an enclosed space 872. In the depicted embodiment, each of the first and second legs 860, 862 can be arcuate shaped, curved away from the enclosed space 872 (i.e., the first and second legs 860, 862 curved toward the respective top and bottom walls 172, 174 of the outer panel member 160). With this configuration, the first and second legs 860, 862 are adapted to at least partially collapse toward the respective top and bottom walls 172, 174 during a side/lateral impact to the structural member 102. The substantially vertical wall part 864 interconnects end portions 880, 882 of the respective first and second legs 860, 862, and the substantially vertical wall part 866 interconnects opposite end portions 886, 888 of the respective first and second legs 860, 862. The end portions 880, 882 of the respective first and second legs 860, 862 can be provided with flanges 890, 892 which are substantially aligned with the substantially vertical wall part 864, thereby defining extensions of the substantially vertical wall part 864. Further, the end portions 886, 888 of the respective first and second legs 860, 862 include flanges 896, 898 shaped to conform to respective upper and lower corner portions 220, 222 of the outer panel member 160. As depicted, each of the flanges 896, 898 is spaced from respective end portions of the substantially vertical wall part 866. The flange 896 can be at least partially defined by a closed cross-sectional portion or lobe 900 and the flange 898 can be substantially parallel to the substantially vertical wall part 866.

The inner section 854 of the exemplary reinforcement member 850 includes substantially horizontal wall parts (i.e., first and second legs) 910, 912 and substantially vertical wall parts 914, 916. Similar to the outer section 852, the wall parts 910-916 of the inner section 854 define a closed cross-sectional portion 920 having an enclosed space 922. In the depicted embodiment, each of the first and second legs 910, 912 can be arcuate shaped, curved toward the respective top and bottom walls 182, 184 of the inner panel member 162. With this configuration, the first and second legs 910, 912 are adapted to at least partially collapse toward the respective top and bottom walls 182, 184 during a side/lateral impact to the structural member 102. The substantially vertical wall part 914 interconnects end portions 930, 932 of the respective first and second legs 910, 912, and the substantially vertical wall part 916 interconnects opposite end portions 936, 938 of the respective first and second legs. The end portions 930, 932 of the respective first and second legs 910, 912 can be provided with flanges 940, 942 which are substantially aligned with the substantially vertical wall part 914, thereby defining extensions of the substantially vertical wall part 914. Further, the end portions 936, 938 of the respective first and second legs 910, 912 include flanges 946, 948 shaped to conform to respective upper and lower corner portions 240, 242 of the inner panel member 162. As depicted, the flange 946 can be at least partially defined by a closed cross-sectional portion or lobe 950, and each of the flanges 946, 948 extends laterally outwardly past the substantially vertical wall part 916. The lobes 900, 950 enhance bend performance of the reinforcement member 850.

Figure 36:
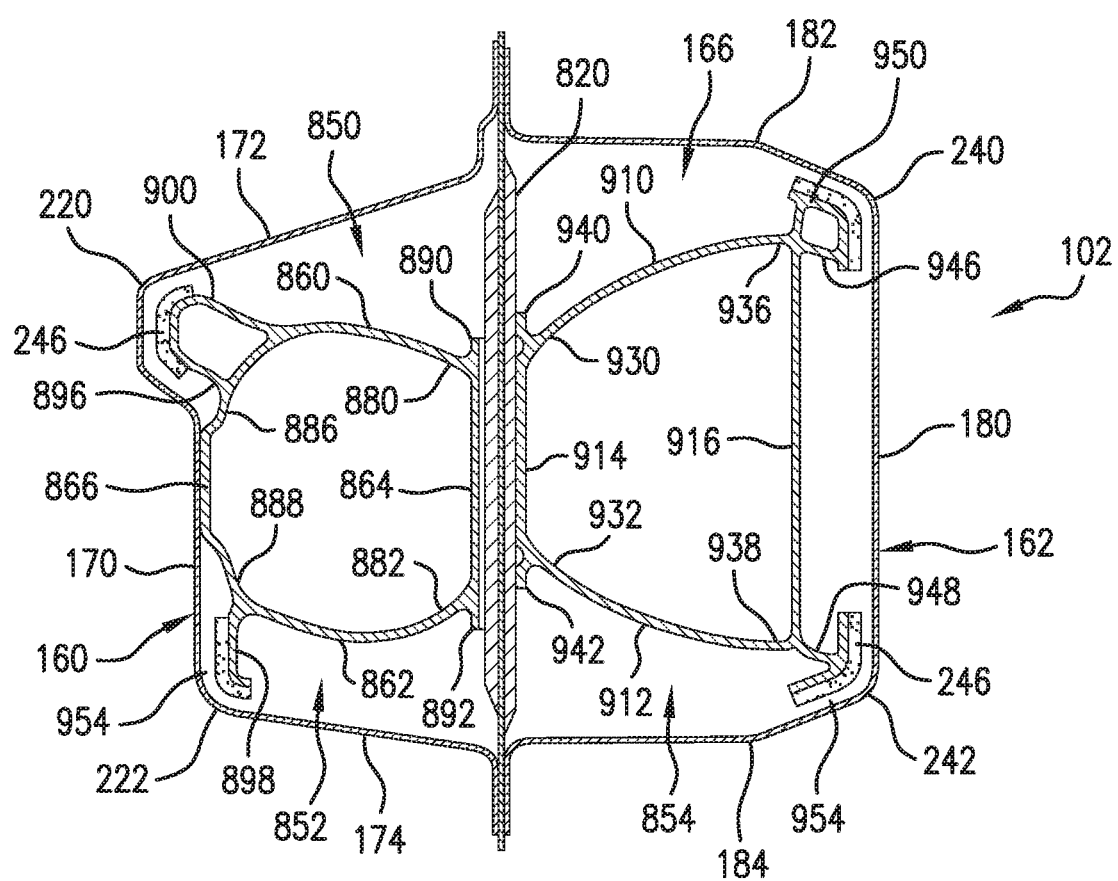
FIG. 36 is a cross-sectional view of the structural member of the vehicle body portion of FIG. 1 taken along line A-A of FIG. 1, the structural member including the reinforcement member of FIG. 31 prior to attachment to the structural member.

As shown in FIG. 36, the reinforcement member 850 is positioned in the cavity 166 of the structural member 102 wherein a gap 954 is provided between the reinforcement member 850 and the inner surfaces of the outer and inner panel members 160, 162. Again, the gap 954 allows for the provision of the anticorrosion coating on the inner surface of the structural member by an electrocoat process. The outer section 852 faces the outer panel member 160 with the first and second legs 860, 862 extending toward the inner surface of the outer panel member 160, and the inner section 854 faces the inner panel member 162 with the first and second legs 910, 912 extending toward the inner surface of the inner panel member 162.

To secure the reinforcement member 850 with the cavity 166 of the structural member 102, the substantially vertical wall parts 864, 914 of the respective outer and inner sections 852, 854 are adhered to the tension web 820. Similarly, the substantially vertical wall part 866 of the outer section 852 is adhered to the side wall 170 of the outer panel member 160. It should be appreciated that each of the substantially vertical wall parts 864, 914 can be fastened to the tension web 820 and the substantially vertical wall part 866 can be fastened to the side wall 170 (e.g., by use of self-piercing rivets). Again, the structural member 102 and the tension member 820 includes a first metal or a metal alloy, and can be formed of a steel or steel alloy. The outer and inner sections 852, 854 are formed of a second metal or metal alloy different from the first metal or metal alloy (e.g., an aluminum or aluminum alloy), which allows the outer and inner sections 852, 854 to be integrally formed as a one-piece, unitary member, such as by an extrusion process. Because of the differing materials an adhesive/insulator can be placed between the tension web 820 and the wall parts 864, 914 and between the side wall 170 and the wall part 866 to prevent galvanic corrosion. The adhesive 246 is secured to each of the flanges 896, 898 of the outer section 852 and each of the flanges 946, 948 of the inner section 854.

FIGS. 37-41 depict an exemplary reinforcement member 1000 according to another aspect of the present disclosure. The reinforcement member 1000 includes the outer section 852, an inner section 1004, and the tension web 820 interposed between the outer and inner sections 852, 1004. The inner section 1004 includes a base member 1010 including a plurality of projections or bumpers extending laterally therefrom. In the illustrated embodiment, the plurality of projections includes an array of spaced first projections or bumpers 1012 and an array of spaced second projections or bumpers 1014 provided below the first bumpers 1012. As shown, each of the first and second bumpers 1012, 1014 can be elongated (in a lateral direction) polygonal shaped members. Further, each of the first bumpers 1012 can have a shape differing from a shape of a neighboring (e.g., adjacent) first bumper 1012, and each of the second bumpers 1014 can have a shape differing from a shape of a neighboring (e.g., adjacent) second bumper 1014. And each first bumper 1012 can have a shape differing from a shape of the second bumper 1014 located below that first bumper. Although, it should be appreciated that at least some of the first and second bumpers 1012, 1014 can be similarly shaped. Still further, each of the first and second bumpers 1012, 1014 can be adapted to tune or control deformation and bending of the inner section 1004 during a side impact to the structural member 102. The base member 1010 also includes a first flange 1020 and a second flange 1022, and each of the first and second flanges can extend continuously without interruption along the longitudinal extent of the base member 1010. The first bumpers 1012 are interconnected by the first flange 1020, and the second bumpers 1014 are interconnected by the second flange 1022. A distal end portion 1026 of the first flange 1020 has a shape complimentary to the upper corner portion 240 of the inner panel member 162. And a distal end portion 1028 of the second flange 1022 has a shape complimentary to the lower corner portion 242 of the inner panel member 162.

According to one aspect, a plurality of spaced apart first reinforcing ribs (i.e., gussets) 1030 can be provided between the first flange 1020 and the first bumpers 1012, and a plurality of spaced apart second reinforcing ribs (i.e. gussets) 1032 can be provided between the second flange 1022 and the second bumpers 1014. It should be appreciated that the first and second reinforcing ribs 1030, 1032 can define in cross-section respective kink or bends 1036, 1038 adapted to further control deformation and bending of the inner section 1004 to prevent breakage of the inner section 1004 during a side impact to the structural member 102. In the depicted embodiment, a plurality of third reinforcing ribs 1040 can extend between the first and second flanges 1020, 1022, thereby interconnecting the first and second bumpers 1012, 1014. Each of the third reinforcing ribs 1040 can be generally X or H-shaped, and as shown the third reinforcing ribs 1040 are generally H-shaped including a first segment 1042, a second segment 1044 and a third segment 1046 connecting the first and second segments. Each of the first and second segments 1042, 1044 can be curved toward one another and an opening can be provided in the third segment 1046 for weight reduction.

The inner section 1004 of the exemplary reinforcement member 1000 is a one-piece, unitary member formed of a reinforced polymer. In one embodiment, the inner section 1004 is formed from a fiber reinforced plastic including a plastic matrix material that encapsulates a fiber material. For example, the plastic matrix material can be nylon and/or the fiber material can be a plurality of glass fibers, which provides preferred structural characteristics while maintaining a reasonable weight for the inner section 1004.

Figure 41:
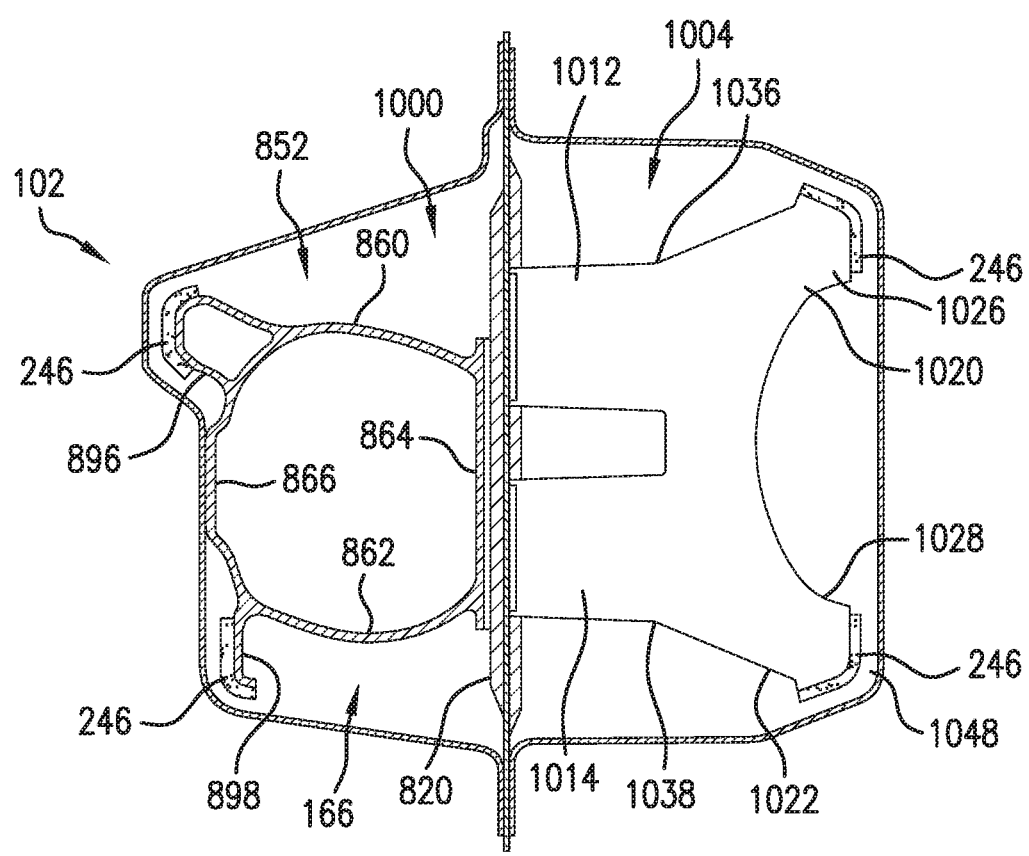
FIG. 41 is a cross-sectional view of the structural member of the vehicle body portion of FIG. 1 taken along line A-A of FIG. 1, the structural member including the reinforcement member of FIG. 38 prior to attachment to the structural member.

As shown in FIG. 41, the reinforcement member 1000 is initially positioned in the structural member 102 such that a gap 1048 is provided between the reinforcement member 1000 and the inner surfaces of the outer and inner panel members 160, 162. Again, the gap 1048 allows for the provision of the anticorrosion coating on the inner surface of the structural member by an electrocoat process. The outer section 852 is secured within the structural member 102 in the same manner described above. The inner section 1004 is positioned within the structural member 102 with the first and second flanges 1020, 1022 facing the inner panel member 162. The base member 1010 (particularly each of the first and second bumpers 1012, 1014) can be adhered to the tension web 820 via adhesive and/or selective first and second bumpers can be attached to the tension web 820 by conventional fasteners, such as clips or rivets. The adhesive 246 is provided on the distal end portions 1026, 1028 of the respective first and second flanges 1020, 1022, which attaches the distal end portions to the respective upper and lower corner portions 240, 242 of the inner panel member 162.

FIGS. 42-46 depict an exemplary reinforcement member 1050 according to yet another aspect of the present disclosure. The reinforcement member 1050 includes an outer section 1052, the inner section 854, and the tension web 820 interposed between the outer and inner sections 1052, 854. The outer section 1052 includes a base member 1054 having a plurality of projections or bumpers extending laterally therefrom. According to one aspect, the plurality of projections includes an array of spaced first projections or bumpers 1056 and an array of spaced second projections or bumpers 1058 provided below the first bumpers 1056. Each of the first bumpers 1056 can be elongated (in a lateral direction) polygonal shaped members, and in the depicted embodiment sidewalls 1062, 1064 of the first bumpers 1056 can be generally triangular shaped, allowing the side walls to serve as reinforcing gussets for the first bumpers 1052. Still further, as shown the sidewalls 1062, 1064 together with upper walls 1066 of the first bumpers 1056 can converging toward one another adjacent the base member 1054, and with this arrangement an upper part of each of the first bumpers 1056 can be generally tent-shaped. The second bumpers 1058 can also be elongated polygonal shaped members, and in the depicted embodiment are shaped similar to the first bumpers 1056. Although, it should be appreciated that selected of the first and second bumpers 1056, 1058 can have differing shapes allowing each of the first and second bumpers to tune or control deformation and bending of the outer section 1052 during a side impact to the structural member 102. Upper and lower longitudinally extending reinforcing ribs 1070, 1072 are provided on the base member 1054, the upper reinforcing rib 1070 interconnecting the first bumpers 1056 and the lower reinforcing rib 1072 interconnecting the second bumpers 1058. According to one aspect, the base member 1054 can further include at least one longitudinally extending third reinforcing rib 1074 located between the upper and lower ribs 1070, 1072, and in the illustrated embodiment, a pair of third reinforcing ribs 1074 is provided on the base member 1054. Further, a plurality of fourth reinforcing ribs 1076 can be provided on the base member 1054, the fourth reinforcing ribs extending between and interconnecting the first and second bumpers 1056, 1058. A distal end portion of each of the first bumpers 1056 can have a shape complimentary to the upper corner portion 220 of the outer panel member 160, and a distal end portion of each second bumper 1058 can have a shape complimentary to the lower corner portion 222 of the outer panel member 160.

Similar to the inner section 1004 of the reinforcement member 1000, the outer section 1052 of the exemplary reinforcement member 1050 is a one-piece, unitary member formed of a reinforced polymer. In one embodiment, the outer section 1052 is formed from a fiber reinforced plastic including a plastic matrix material that encapsulates a fiber material. For example, the plastic matrix material can be nylon and/or the fiber material can be a plurality of glass fibers, which provides preferred structural characteristics while maintaining a reasonable weight for the outer section 1052.

Figure 46:
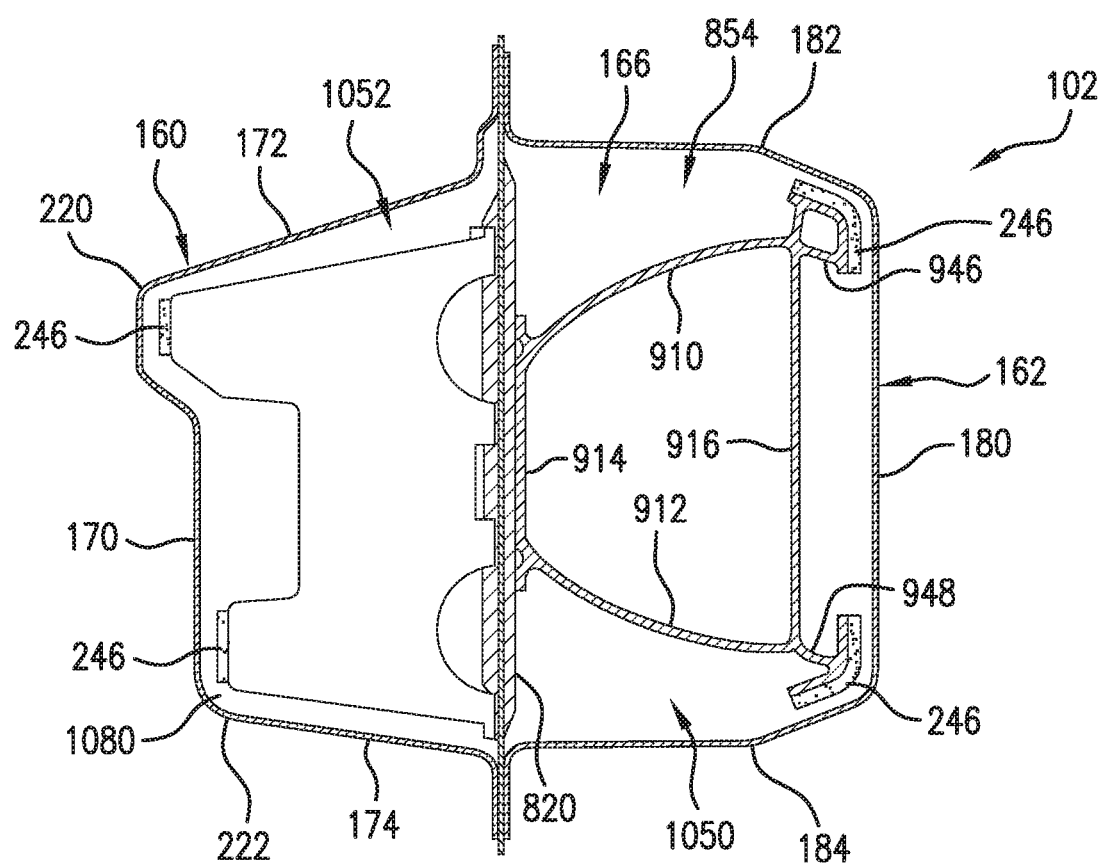
FIG. 46 is a cross-sectional view of the structural member of the vehicle body portion of FIG. 1 taken along line A-A of FIG. 1, the structural member including the reinforcement member of FIG. 43 prior to attachment to the structural member.

As shown in FIG. 46, the reinforcement member 1050 is initially positioned in the structural member 102 such that a gap 1080 is provided between the reinforcement member 1050 and the inner surfaces of the outer and inner panel members 160, 162. Like the previous embodiments, the gap 1080 allows for the provision of the anticorrosion coating on the inner surface of the structural member by an electrocoat process. The outer section 1052 is positioned within the structural member 102 with the first and second bumpers 1056, 1058 facing the sidewall 170 of the outer panel member 160. The base member 1054, particularly the reinforcing ribs 1070, 1072, 1074 of the base member 1054, can be adhered to the tension web 820 via adhesive and/or attached to the tension web 820 by conventional fasteners, such as clips or rivets. The adhesive 246 is provided on the distal end portions of the respective first and second bumpers 1056, 1058, which attaches the distal end portions to the respective upper and lower corner portions 220, 222 of the outer panel member 160. The inner section 854 is secured within the structural member 102 in the same manner described above.

Figure 47:
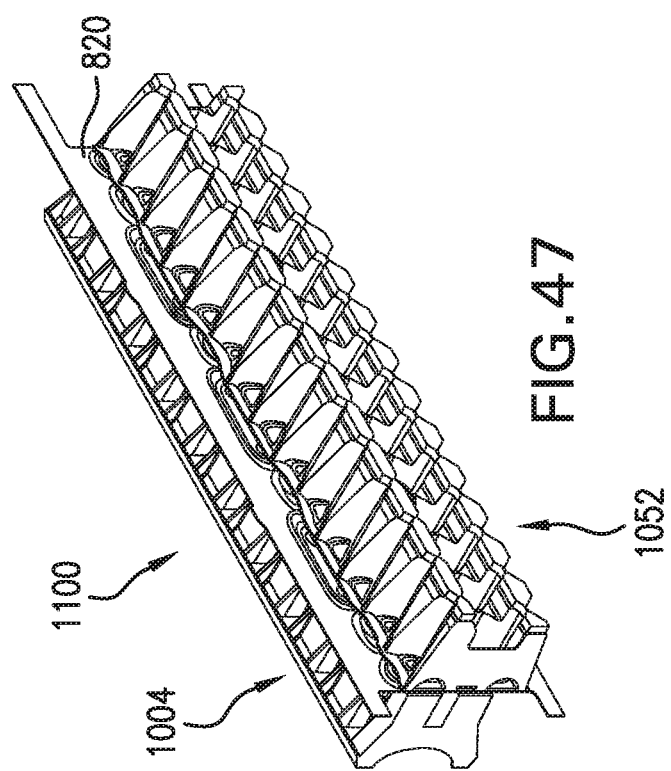
FIGS. 47 and 48 are perspective views of an exemplary reinforcement member according to a further embodiment of the present disclosure for the structural member of the vehicle body portion of FIG. 1.
Figure 48:
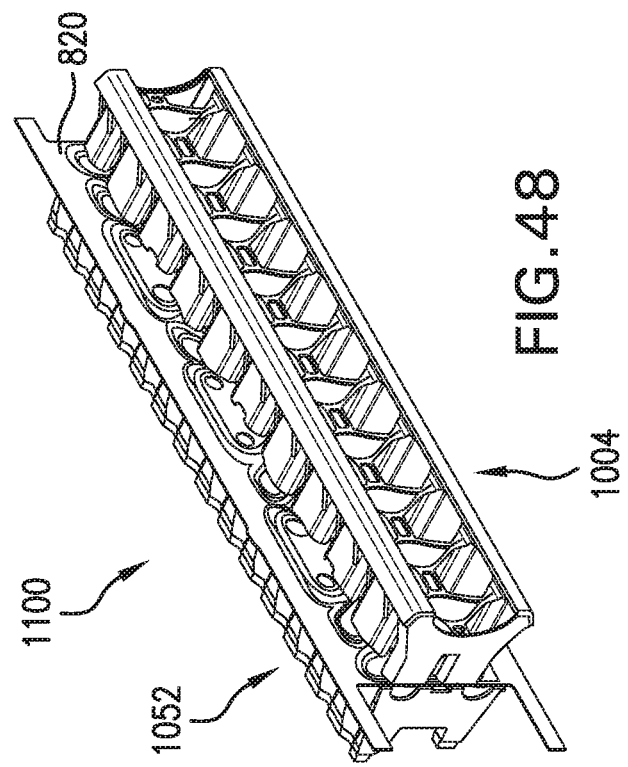
Figure 49:
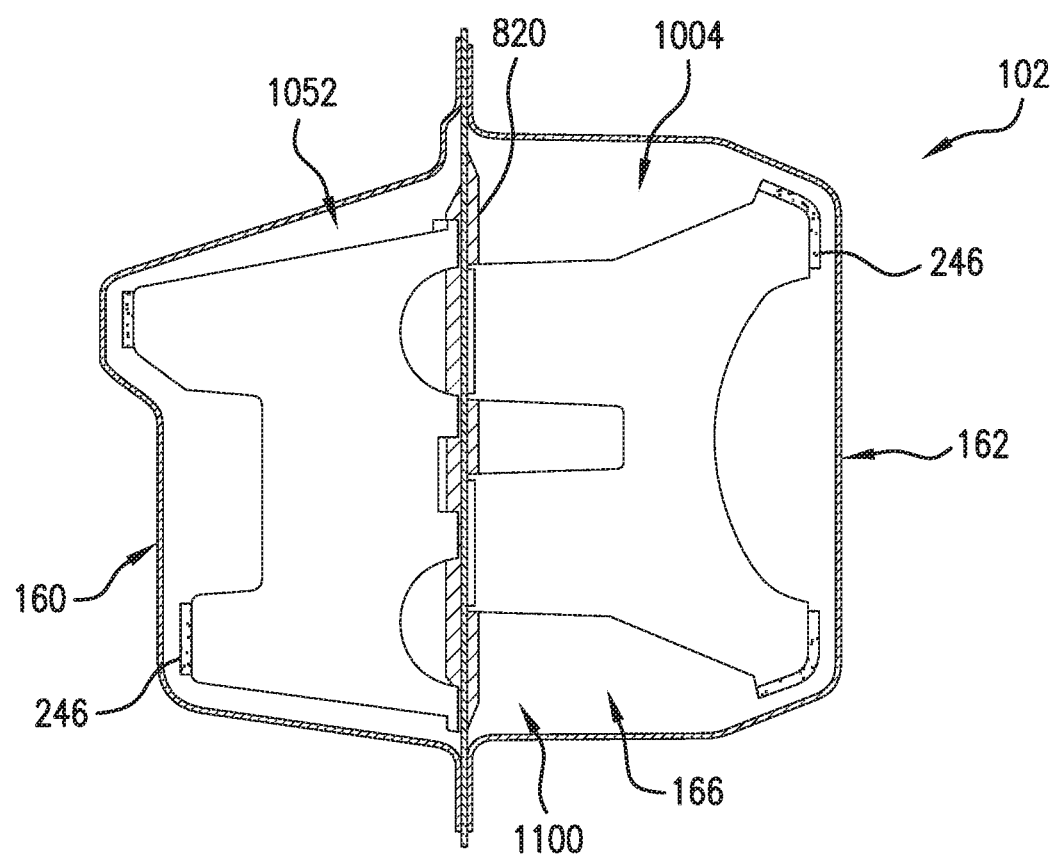
FIG. 49 is a cross-sectional view of the structural member of the vehicle body portion of FIG. 1 taken along line A-A of FIG. 1, the structural member including the reinforcement member of FIG. 48 prior to attachment to the structural member.

FIGS. 47-49 depict an exemplary reinforcement member 1100 according to yet another aspect of the present disclosure. The reinforcement member 1100 includes the outer section 1052, the inner section 1004, and the tension web 820 interposed between the outer and inner sections 1052, 1004. Because the structural components of the reinforcement member 1110 were described above, further description of the reinforcement member 1100 will be omitted for conciseness.

FIGS. 50 and 51 depict an exemplary reinforcement member 1120 according to still yet another aspect of the present disclosure. The reinforcement member 1120 includes the outer section 852, the inner section 404, and the tension web 820 interposed between the outer and inner sections 1052, 1004. Because the structural components of the reinforcement member 1120 were described above, further description of the reinforcement member 1120 will be omitted for conciseness.

Figure 52:
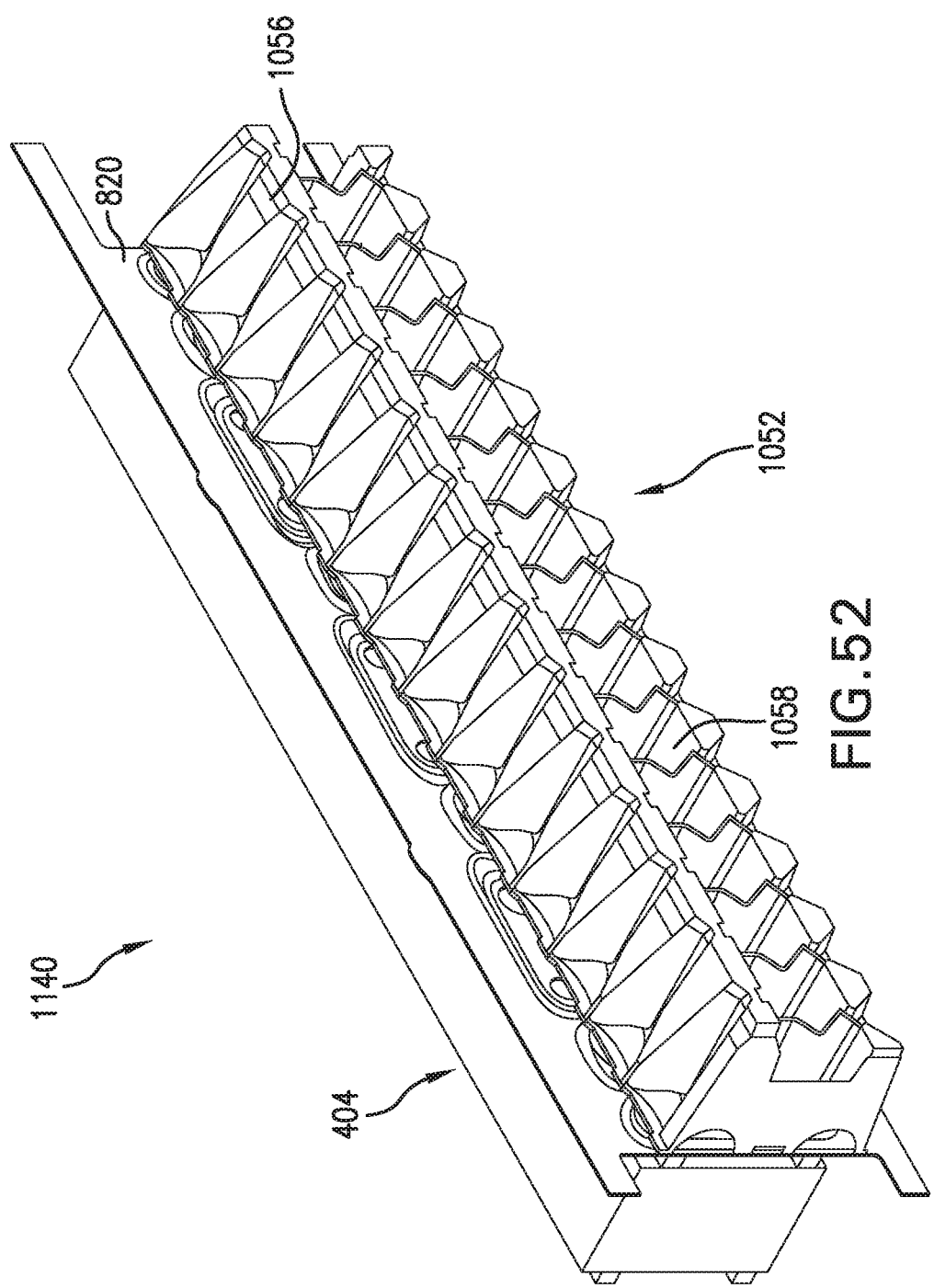
FIG. 52 is a perspective view of an exemplary reinforcement member according to a further embodiment of the present disclosure for the structural member of the vehicle body portion of FIG. 1.
Figure 53:
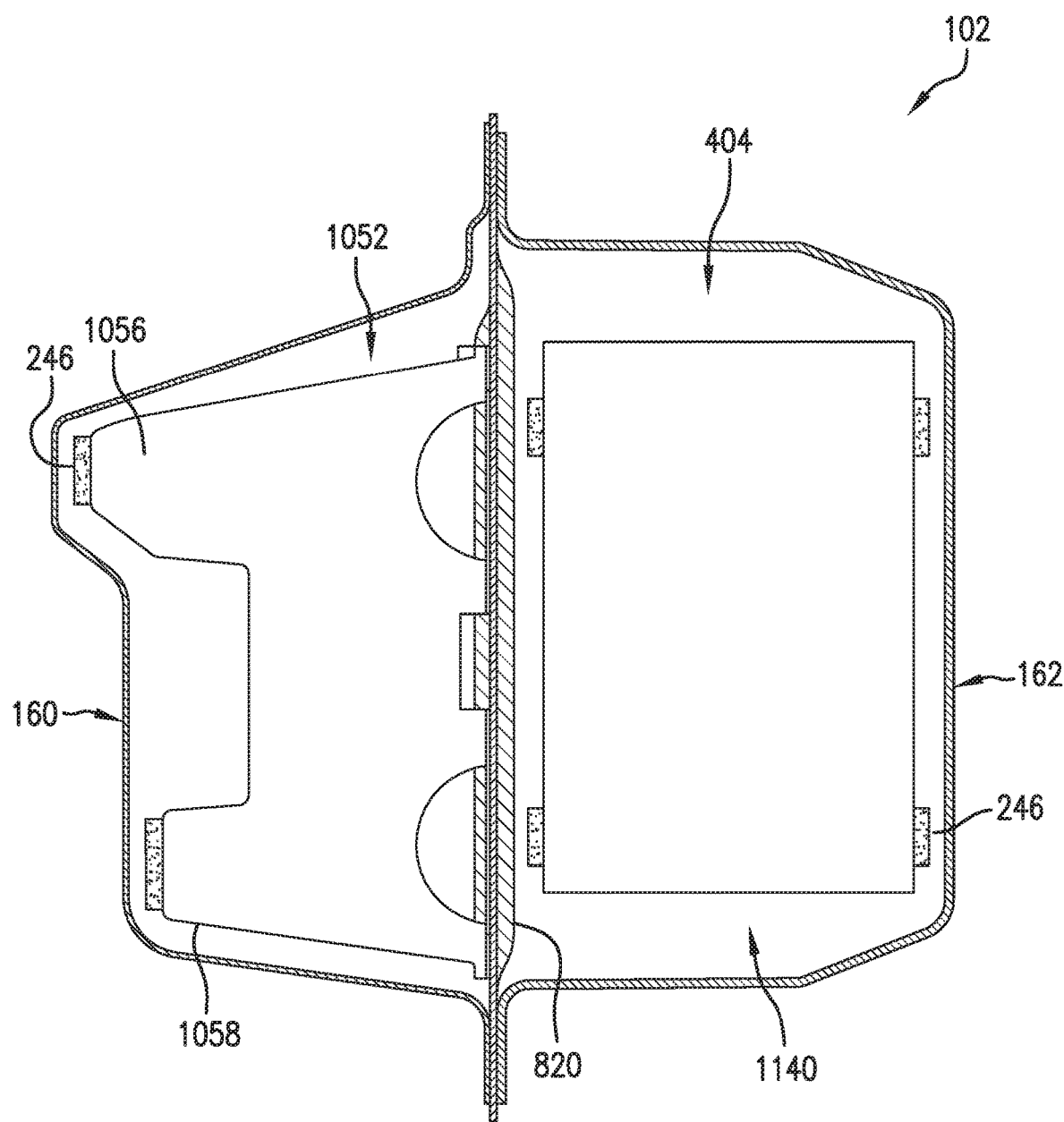
FIG. 53 is a cross-sectional view of the structural member of the vehicle body portion of FIG. 1 taken along line A-A of FIG. 1, the structural member including the reinforcement member of FIG. 52 prior to attachment to the structural member.
Figure 54:
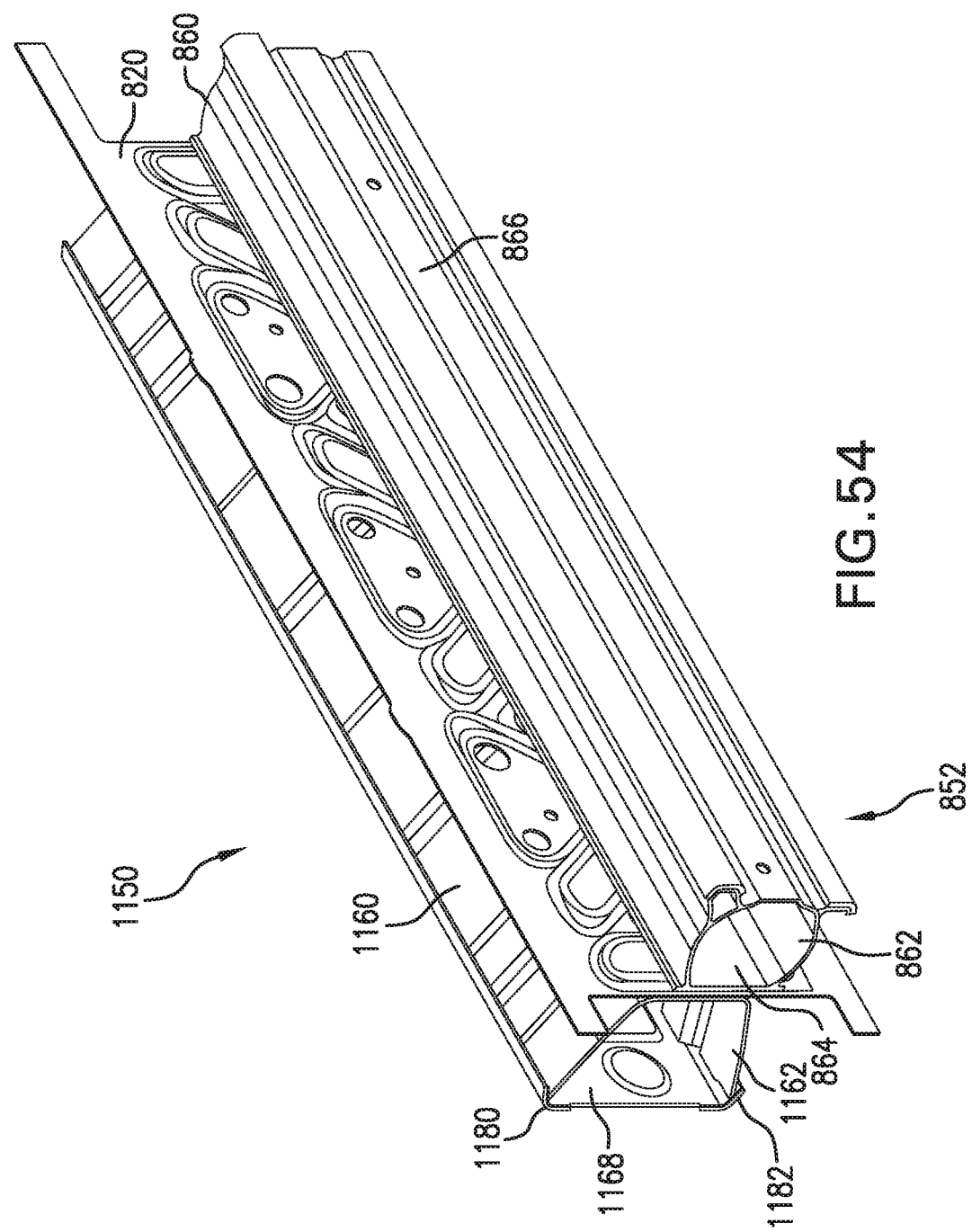
FIGS. 54 and 55 are perspective views of an exemplary reinforcement member according to a further embodiment of the present disclosure for the structural member of the vehicle body portion of FIG. 1.
Figure 55:
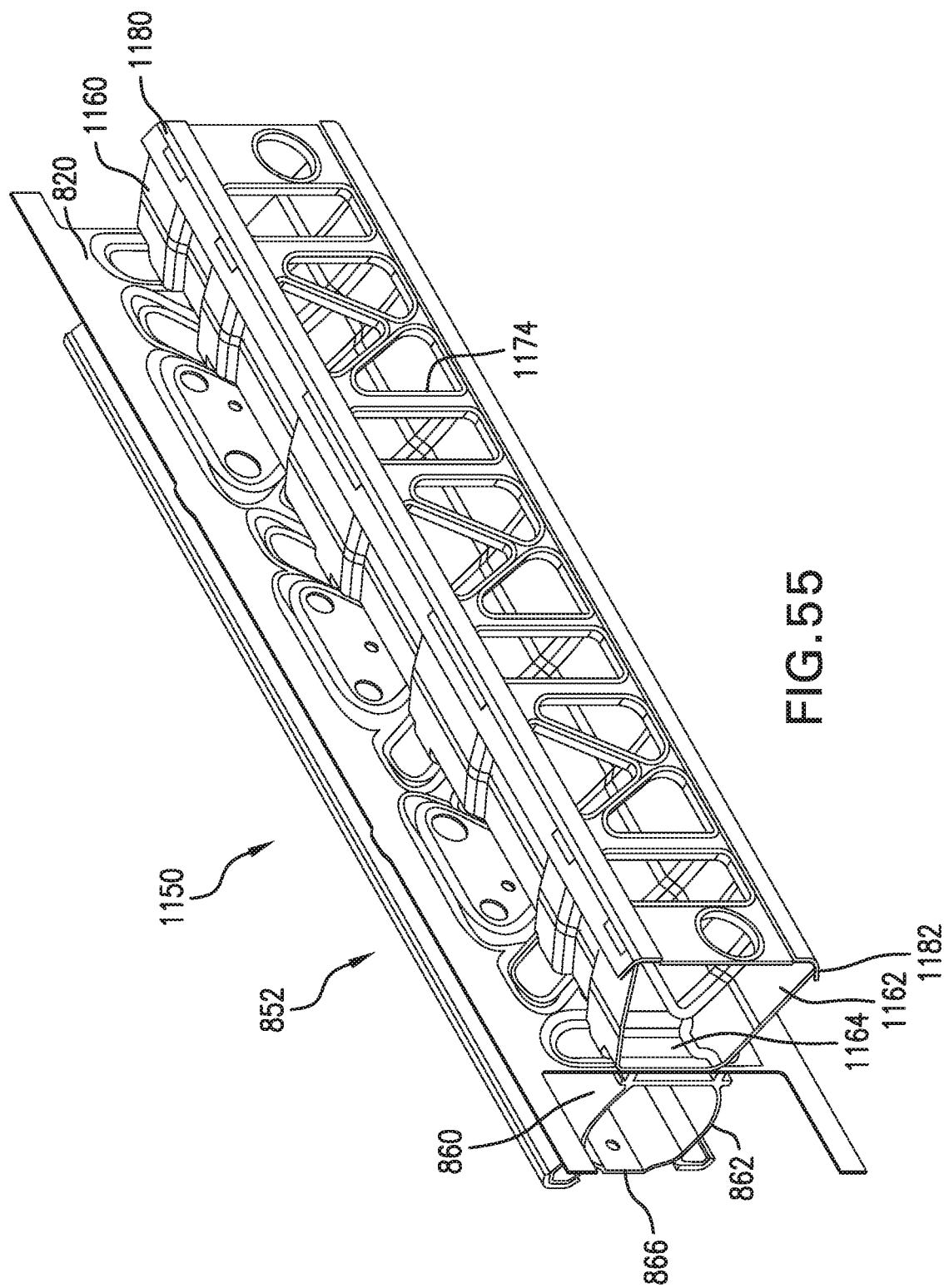
Figure 56:
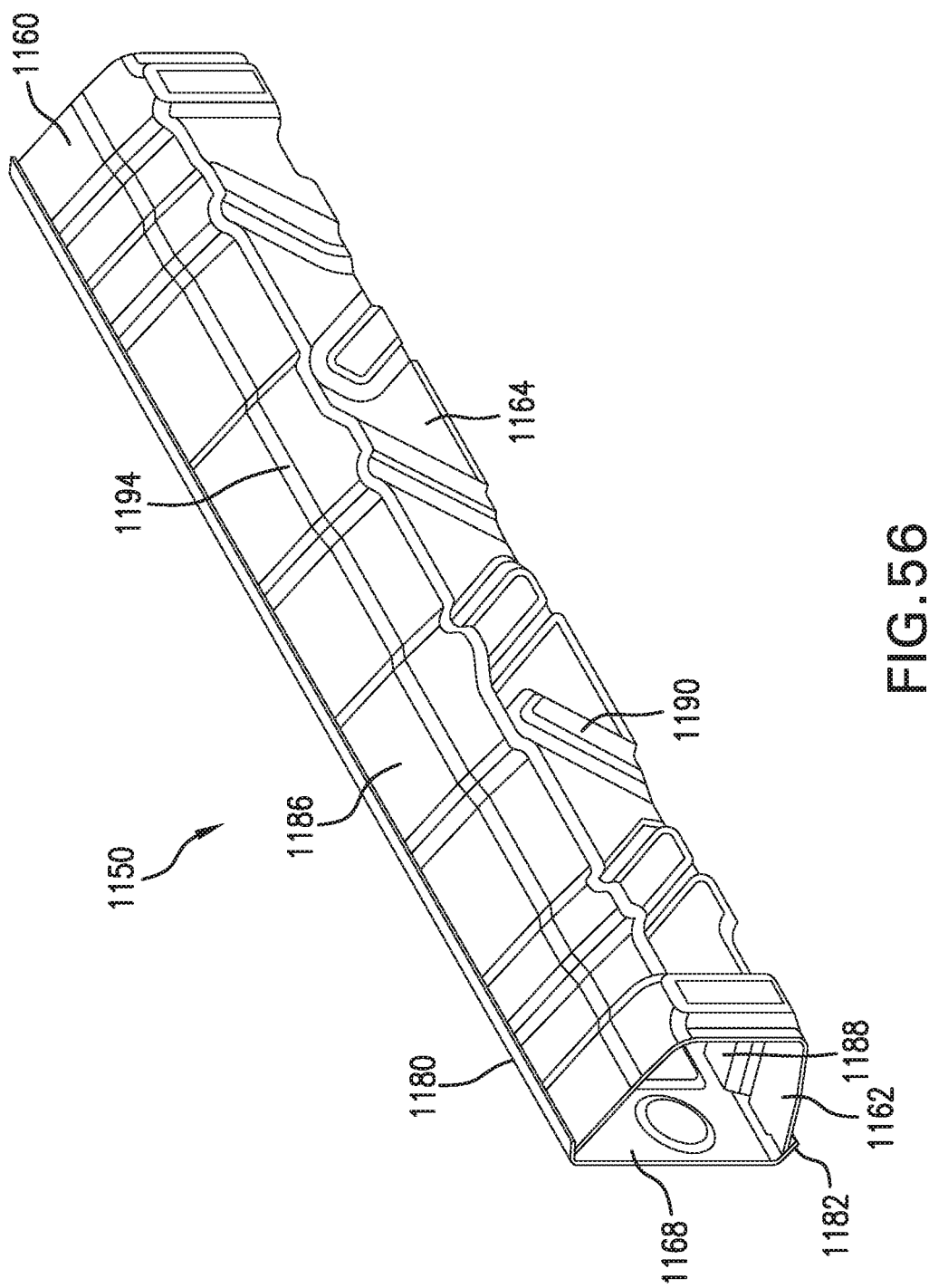
FIGS. 56 and 57 are perspective views of an inner section for the reinforcement member of FIGS. 54 and 55.
Figure 57:
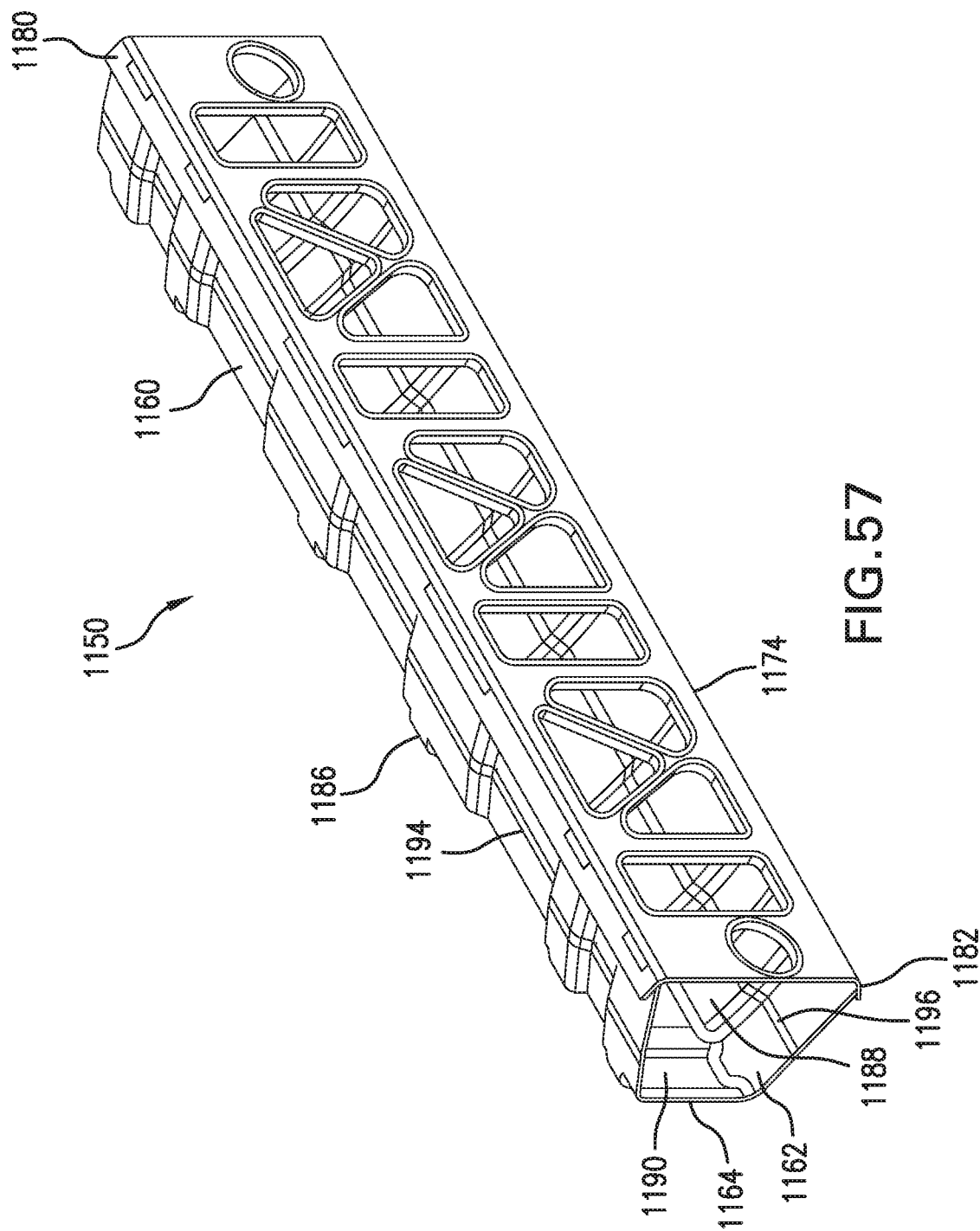

FIGS. 52 and 53 depict an exemplary reinforcement member 1140 according to still yet another aspect of the present disclosure. The reinforcement member 1140 includes the outer section 1052, the inner section 404, and the tension web 820 interposed between the outer and inner sections 1052, 1004. Again, because the structural components of the reinforcement member 1140 were described above, further description of the reinforcement member 1140 will be omitted for conciseness.

FIGS. 54-58 depict an exemplary reinforcement member 1150 according to still yet another aspect of the present disclosure. The reinforcement member 1150 includes the outer section 852, an inner section 1154, and the tension web 820 interposed between the outer and inner sections 852, 1154. The inner section 1154 of the reinforcement member 1150 includes a generally hat-shaped section 1158 defined by first and second legs 1160, 1162 extending outwardly (in a lateral direction) from a substantially vertical base member 1164 (which is in contact with the tension web 820). A separate cover member 1168 is secured to end portions 1170, 1172 of the respective first and second legs 1160, 1162, the cover member 1168 defining a substantially vertical wall part of the inner section 1154. The cover member 1168 can be provided with cutouts 1174 to reduce the weight of the inner section 1154. End portions 1180, 1182 of the cover member 1168 are shaped to conform to the respective upper and lower corner portions 240, 242 of the inner panel member 162. Each of the first and second legs 1160, 1162 and the base member 1164 can include respective strengthening ribs 1186, 1188, 1190. Further, at least one of the first and second legs 1160, 1162 of the inner section has a kink or bend which moves the one leg slightly toward the other leg during a side or lateral impact to the structural member 102, thereby providing a controlled deformation of that leg during impact. As depicted, the first leg 1160 includes an upward kink 1194 located substantially centrally on the first leg 1160, and the second leg 1162 includes a downward kink 1196 located substantially centrally on the second leg 762. The inner section 1154 can be formed of the same or similar first metal or metal alloy as the structural member 102 and the tension web 820.

Figure 58:
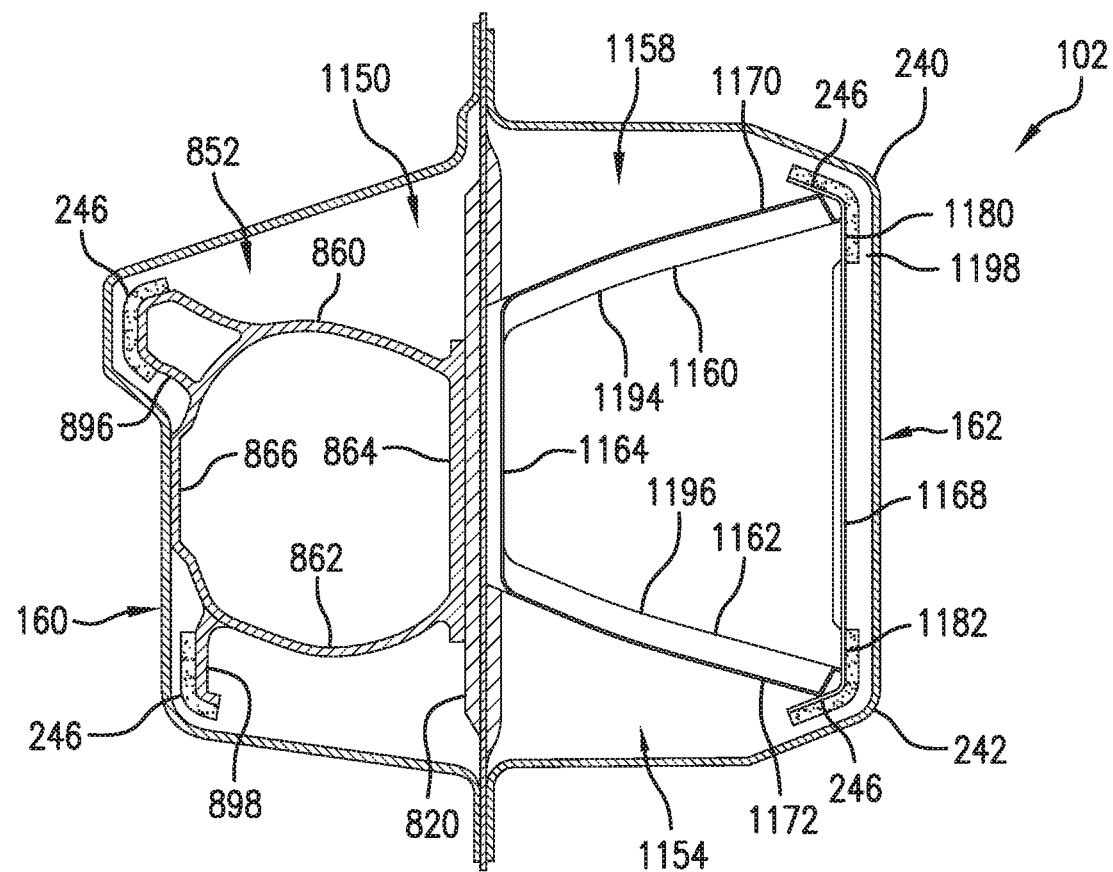
FIG. 58 is a cross-sectional view of the structural member of the vehicle body portion of FIG. 1 taken along line A-A of FIG. 1, the structural member including the reinforcement member of FIG. 55 prior to attachment to the structural member.

As shown in FIG. 58, the reinforcement member 1150 is initially positioned in the structural member 102 such that a gap 1198 is provided between the reinforcement member 1150 and the inner surfaces of the outer and inner panel members 160, 162. Like the previous embodiments, the gap 1198 allows for the provision of the anticorrosion coating on the inner surface of the structural member by an electrocoat process. The outer section 852 is secured within the structural member 102 in the same manner described above. The inner section 1154 is positioned within the structural member 102 with the first and second legs 1160, 1162 extending toward the sidewall 180 of the inner panel member 162 and the cover member 1168 spaced from and facing the sidewall 180. The base member 1164 can be attached to the tension web 820 by conventional fasteners, such as self-piercing rivets, and, if needed, an adhesive/insulator can be placed between the tension web 820 and base member 1164 to prevent galvanic corrosion. The adhesive 246 is provided on the end portions 1180, 1182 of the cover member 1168, which attaches the inner section 1150 to the inner panel member 162.

Figure 59:
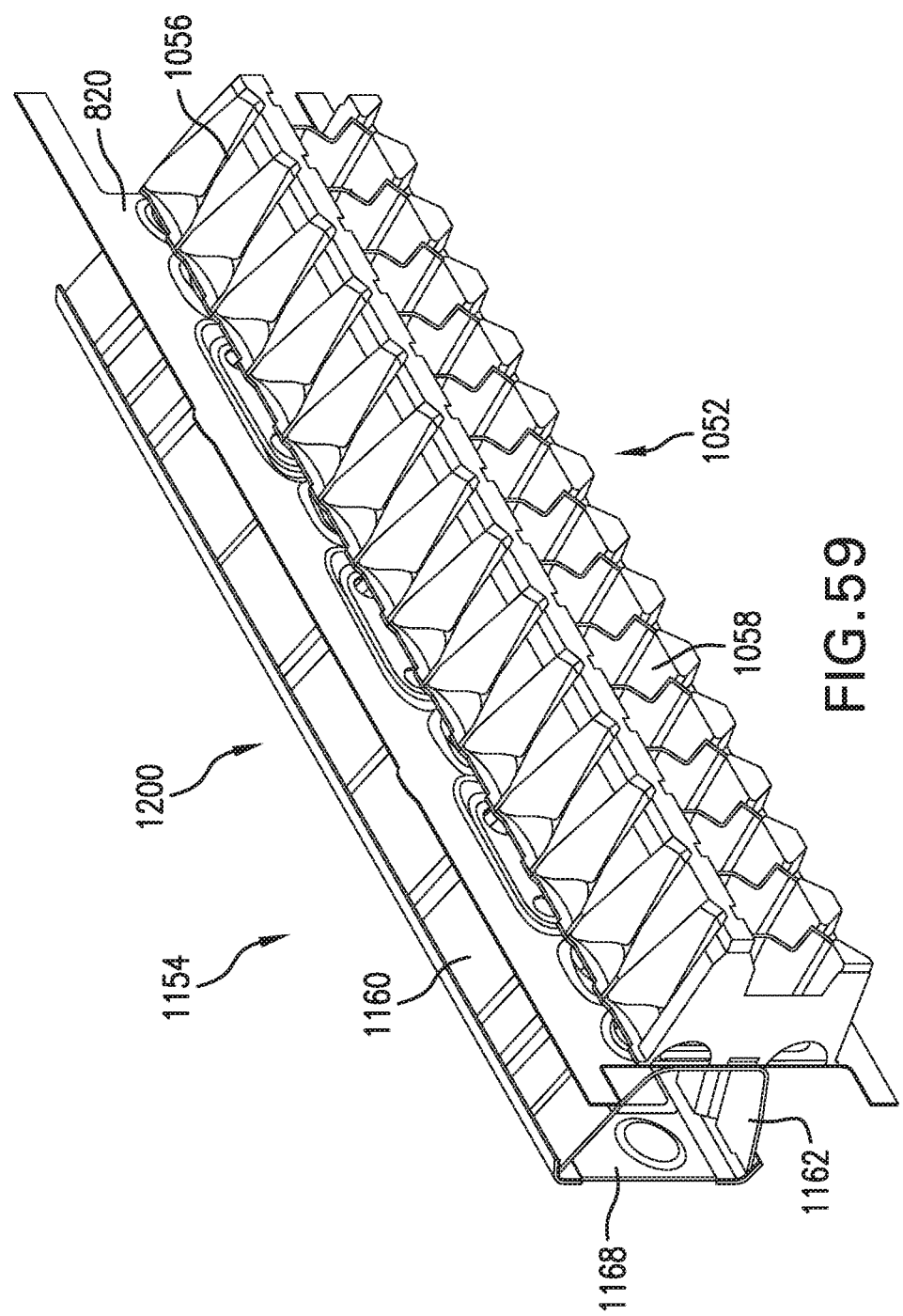
FIGS. 59 and 60 are perspective views of an exemplary reinforcement member according to a further embodiment of the present disclosure for the structural member of the vehicle body portion of FIG. 1.
Figure 60:
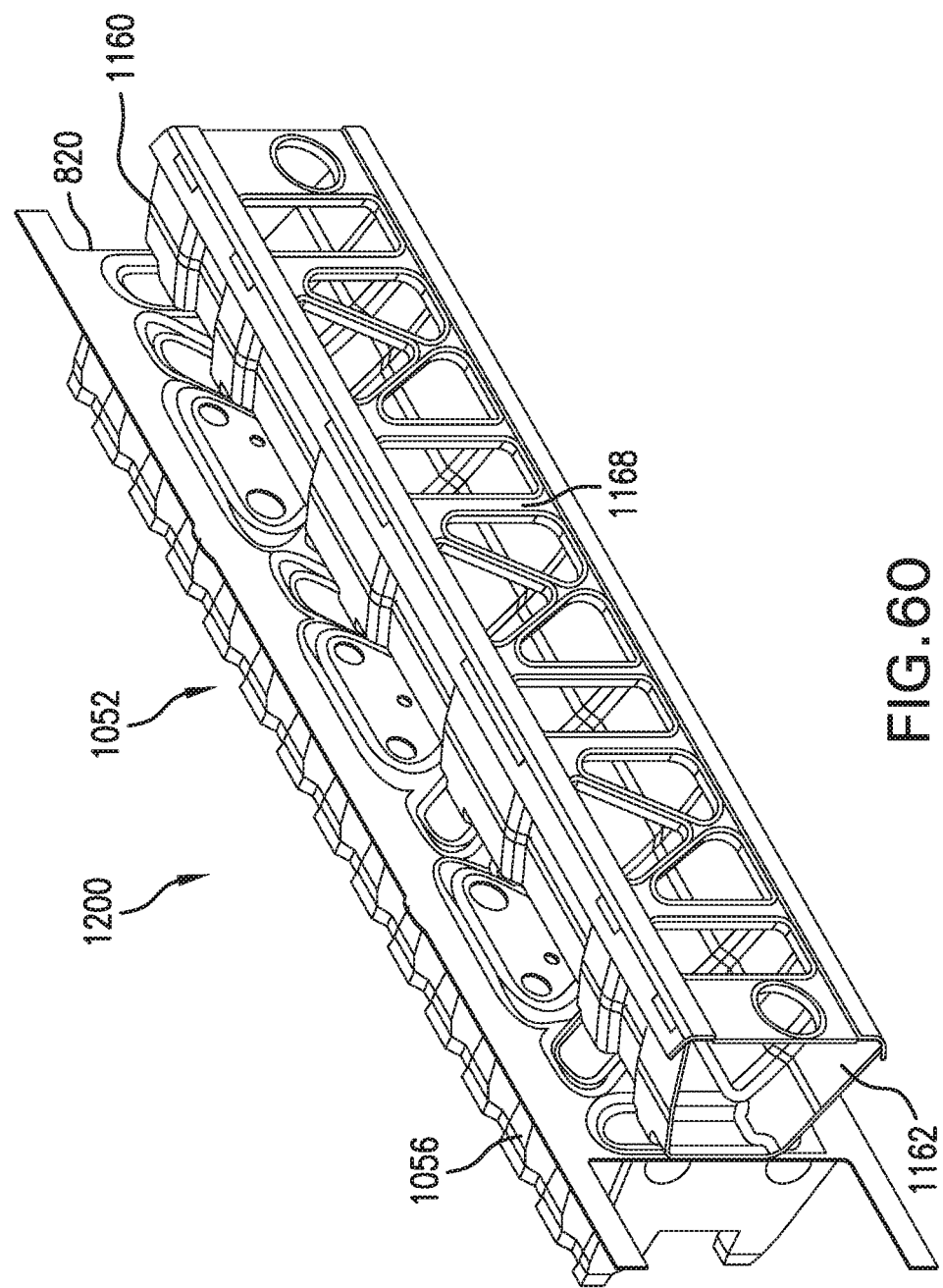
Figure 61:
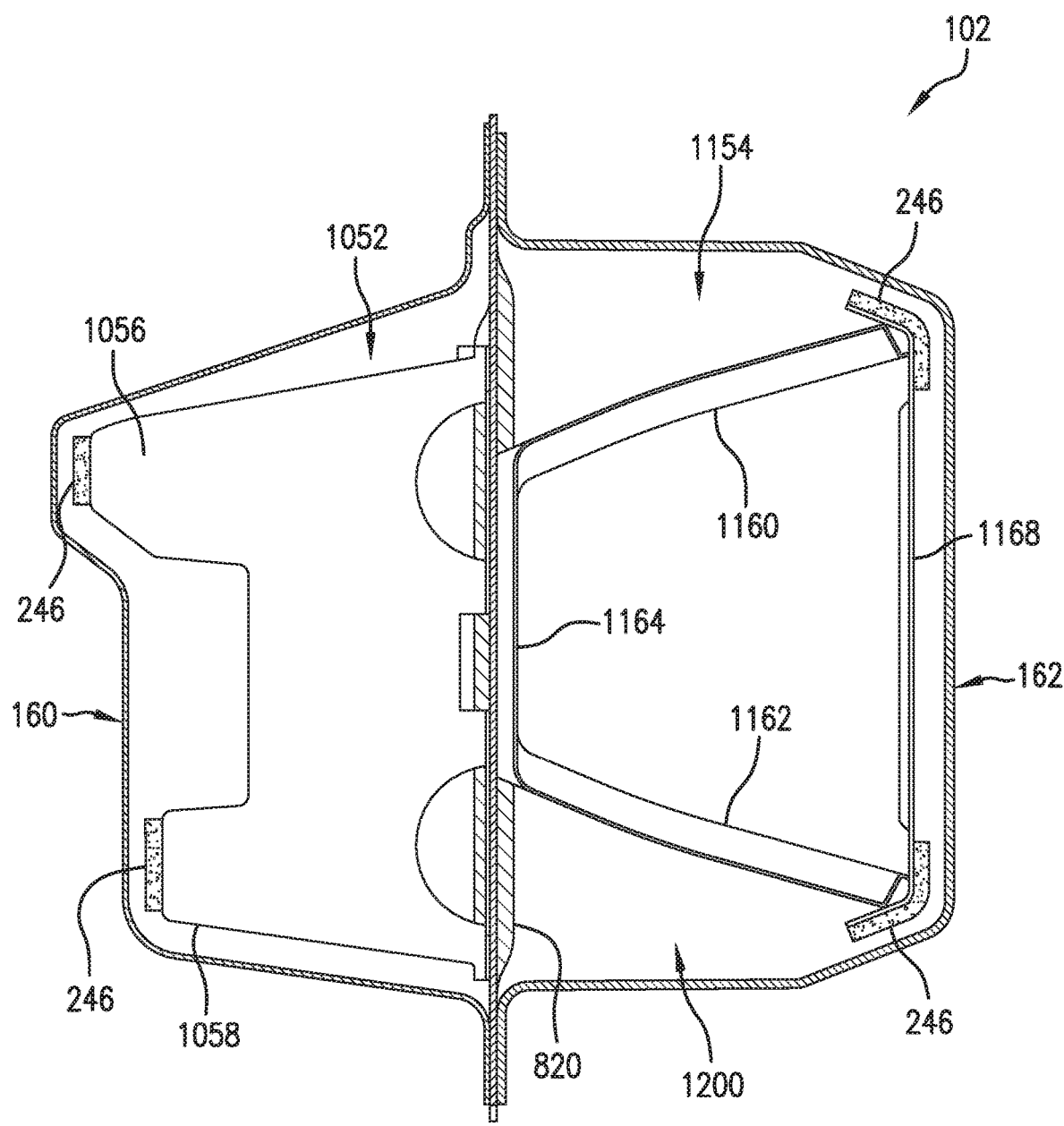
FIG. 61 is a cross-sectional view of the structural member of the vehicle body portion of FIG. 1 taken along line A-A of FIG. 1, the structural member including the reinforcement member of FIG. 60 prior to attachment to the structural member.

FIGS. 59-61 depict an exemplary reinforcement member 1200 according to still yet another aspect of the present disclosure. The reinforcement member 1200 includes the outer section 1052, the inner section 1154, and the tension web 820 interposed between the outer and inner sections 1052, 1004. Because the structural components of the reinforcement member 1200 were described above, further description of the reinforcement member 1200 will be omitted for conciseness.

For the above embodiments of the reinforcement members 700, 850, 1000, 1050, 1100, 1120, 1140, 1150, 1200, a vehicle body construction method will now be described. In the exemplary method, an elongated structural member 102 having an inner surface and defining an elongated cavity 166 is provided. The structural member 102 can be defined by an outer panel member 160 attached to an inner panel member 162. The structural member 102 and the tension web 820 each includes a first metal or metal alloy, and can be formed of a steel or steel alloy.

Next, a reinforcement member 700, 850, 1000, 1050, 1100, 1120, 1140, 1150, 1200 is provided. The reinforcement member is adapted for insertion in the cavity 166 with a gap between the reinforcement member and the inner surface of the structural member 102. As set forth in detail above, the reinforcement member 700, 850, 1000, 1050, 1100, 1120, 1140, 1150, 1200 comprises an outer section 702, 852, 1052, an inner section 704, 854, 1004, 1154 and a tension web 820 interposed between the inner and outer sections. The outer section includes one of a second metal or metal alloy different than the first metal or metal alloy, and can be formed of an aluminum or aluminum alloy, and a reinforced polymer. The inner section includes one of the first metal or metal alloy, the second metal or metal alloy, a reinforced polymer, and a honeycomb structure.

Next, an adhesive 246 can be applied onto contact portions of the reinforcement member 700, 850, 1000, 1050, 1100, 1120, 1140, 1150, 1200. For example, the adhesive can be applied to contact portions of both the outer section and inner section of the reinforcement member. Next, the reinforcement member 700, 850, 1000, 1050, 1100, 1120, 1140, 1150, 1200 can be installed within the structural member 120 to reinforce the structural member. Such installing of the reinforcement member within the structural member can include positioning the reinforcement member 700, 850, 1000, 1050, 1100, 1120, 1140, 1150, 1200 within the structural member 120 so that a gap is provided between the adhesive 246 and the inner surfaces of the outer panel member 160 and inner panel member 162. This allows anticorrosion fluid to flow between the reinforcement member and the inner surface of the structural member. Next, the method includes subsequently applying heat to the adhesive 246 to expand the adhesive and bond the contact portions of the reinforcement member 700, 850, 1000, 1050, 1100, 1120, 1140, 1150, 1200 to the structural member 102.

Applied to the vehicle frame construction, positioning the reinforcement member 700, 850, 1000, 1050, 1100, 1120, 1140, 1150, 1200 within the structural member 102 can involve positioning the reinforcement member with the adhesive 246 already applied thereon on one of the parts that comprise the structural member (e.g., the inner panel member 162) and then the other of the parts that comprise the structural member (e.g., the outer panel member 160) can be combined to enclose the reinforcement member. At this stage, the adhesive 246 has not yet had heat applied for heat activation thereof and thus does not fully function to define structural joints between the inner surface of the structural member 102 and the contact portions of the reinforcement member. However, when heat is applied to the adhesive 246 (e.g., as the vehicle body passes through various heating apparatus, e.g., ovens, to address surface finishing of the vehicle body), the adhesive 246 expands and bonds the contact portions of the reinforcement member 700, 850, 1000, 1050, 1100, 1120, 1140, 1150, 1200 to the structural member 102. At this stage, the reinforcement member is fully installed within the structural member 102 and the structural member 102 is reinforced by the reinforcement member.

As is evident from the foregoing embodiments, a method of reinforcing a structural member 102 of a vehicle body is also provided. The structural member 102 includes an inner surface defining an elongated cavity 166, and an outer panel member 160 joined to an inner panel member 162. The method comprises providing a reinforcement member 700, 850, 1000, 1050, 1100, 1120, 1140, 1150, 1200 including 702, 852, 1052, an inner section 704, 854, 1004, 1154 and a tension web 820 interposed between and directly secured to the outer and inner sections; providing an adhesive 246 on the reinforcement member 700, 850, 1000, 1050, 1100, 1120, 1140, 1150, 1200; securing the tension web to the structural member 102 so that the tension web substantially separates the outer and inner panel members 160, 162; providing a gap between the adhesive 246 and the inner surface of the structural member 102 prior to activation of the adhesive 246; and activating the adhesive 246 to expand the adhesive outward from the reinforcement member into engagement with the inner surface of the structural member 102.

The exemplary method further includes securing the projections 1056, 1058 of the outer section 1052 to the inner surface of the structural member 102 and securing the base member 1054 of the outer section 1052 to the tension web 820. And the exemplary method further includes securing the projections 1012, 1014 of the inner section 1004 to the tension web 820 and securing the base member 1010 of the inner section 1004 to the inner surface of the structural member 102.

It will be appreciated that the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle body comprising:
a structural member having an inner surface defining an elongated cavity, the structural member including an outer panel member joined to an inner panel member;
a reinforcement member positioned in the cavity of the structural member wherein a gap is provided between the reinforcement member and the inner surface of the structural member, the reinforcement member including:
an outer section facing the outer panel member and having a first closed cross-sectional portion,
a separate inner section facing the inner panel member and having a second closed cross-sectional portion, and
a tension web interposed between and contacting the outer section and inner section, the tension web being secured to the outer panel member and inner panel member; and
an adhesive secured to the reinforcement member, the adhesive is activatable to expand toward the inner surface of the structural member to define a joint between the reinforcement member and the structural member and to at least partially fill the gap.

2. The vehicle body of claim 1, wherein the outer section of the reinforcement member includes first and second laterally extending legs and third and fourth vertically extending legs, the first and second legs interconnected by the third and fourth legs to define the first closed cross-sectional portion, the third leg secured to the tension web, the fourth leg secured to the outer panel member.

3. The vehicle body of claim 2, each of the first and second legs of the outer section is arcuate shaped, curved away from the first closed cross-sectional portion, the first and second legs adapted to at least partially collapse toward respective top and bottom walls of the outer panel member during a side impact to the structural member.

4. The vehicle body of claim 2, wherein end portions of the first and second legs of the outer section are shaped to conform to respective upper and lower corner portions of the outer panel member, and the end portion of at least one of the first and second legs of the outer section includes a first lobe.

5. The vehicle body of claim 1, wherein the inner section of the reinforcement member includes first and second laterally extending legs and third and fourth vertically extending legs, the first and second legs interconnected by the third and fourth legs to define the second closed cross-sectional portion, the third leg secured to the tension web, the fourth leg spaced from the inner panel member.

6. The vehicle body of claim 5, each of the first and second legs of the inner section is arcuate shaped, curved away from the second closed cross-sectional portion, the first and second legs adapted to at least partially collapse toward respective top and bottom walls of the inner panel member during a side impact to the structural member.

7. The vehicle body of claim 5, wherein end portions of the first and second legs of the inner section are shaped to conform to respective upper and lower corner portions of the inner panel member, and the end portion of at least one of the first and second legs of the inner section includes a second lobe.

8. The vehicle body of claim 1, wherein each of the outer panel member and inner panel member of the structural member is hat-shaped in cross-section and includes upper and lower weld flanges, the upper and lower flanges of the outer member being fixedly attached to the respective upper and lower flanges of the inner panel member, wherein an upper portion of the tension web is secured to the upper flanges of the outer and inner panel members and a lower portion of the tension web is secured to the lower flanges of the outer and inner panel members.

9. The vehicle body of claim 8, wherein the structural member includes a first metal or metal alloy, and each of the outer section and inner section of the reinforcement member includes a second metal or metal alloy different from the first metal or metal alloy.

10. The vehicle body of claim 9, wherein the tension web is formed of the first metal or metal alloy, and an insulating material is placed between the tension web and the respective outer and inner sections to prevent galvanic corrosion.

11. A vehicle body comprising:
a structural member having an inner surface defining an elongated cavity, the structural member including an outer panel member joined to an inner panel member;
a reinforcement member positioned in the cavity of the structural member wherein a gap is provided between the reinforcement member and the inner surface of the structural member, the reinforcement member including:
an outer section facing the outer panel member,
a separate inner section facing the inner panel member, the inner section includes a base member having a plurality of bumpers extending laterally therefrom, and
a tension web interposed between and contacting the outer section and inner section, the tension web being secured to the outer panel member and inner panel member; and
an adhesive secured to the reinforcement member, the adhesive is activatable to expand toward the inner surface of the structural member to define a joint between the reinforcement member and the structural member and to at least partially fill the gap.

12. The vehicle body of claim 11, wherein the outer section of the reinforcement member includes first and second laterally extending legs and third and fourth vertically extending legs, the first and second legs interconnected by the third and fourth legs to define a closed cross-sectional portion, the third leg secured to the tension web, the fourth leg secured to the outer panel member.

13. The vehicle body of claim 12, each of the first and second legs of the outer section is arcuate shaped, curved away from the closed cross-sectional portion, the first and second legs adapted to at least partially collapse toward respective top and bottom walls of the outer panel member during a side impact to the structural member.

14. The vehicle body of claim 11, wherein the plurality of bumpers of the inner section of the reinforcement member includes an array of spaced first bumpers and an array of spaced second bumpers provided below the first bumpers, the first and second bumpers are adapted to tune or control deformation and bending of the inner section during a side impact to the structural member.

15. The vehicle body of claim 14, wherein the base member includes a first flange adapted to interconnect the first bumpers and a second flange adapted to interconnect the first bumpers, distal end portions of the first and second flanges shaped to conform to respective upper and lower corner portions of the inner panel member.

16. A vehicle body comprising:
a structural member having an inner surface defining an elongated cavity, the structural member including an outer panel member joined to an inner panel member;
a reinforcement member positioned in the cavity of the structural member wherein a gap is provided between the reinforcement member and the inner surface of the structural member, the reinforcement member including:
an outer section facing the outer panel member, the outer section includes a base member having a plurality of bumpers extending laterally therefrom,
a separate inner section facing the inner panel member, and
a tension web interposed between and contacting the outer section and inner section, the tension web being secured to the outer panel member and inner panel member; and
an adhesive secured to the reinforcement member, the adhesive is activatable to expand toward the inner surface of the structural member to define a joint between the reinforcement member and the structural member and to at least partially fill the gap.

17. The vehicle body of claim 16, wherein the plurality of bumpers of the outer section of the reinforcement member includes an array of spaced first bumpers and an array of spaced second bumpers provided below the first bumpers, the first and second bumpers are adapted to tune or control deformation and bending of the outer section during a side impact to the structural member.

18. The vehicle body of claim 17, wherein distal end portion of each of the first bumpers is shaped to conform to an upper corner portion of the outer panel member, and a distal end portion of each second bumper is shaped to conform to a lower corner portion of the outer panel member.

19. The vehicle body of claim 16, wherein the inner section of the reinforcement member includes first and second laterally extending legs and third and fourth vertically extending legs, the first and second legs interconnected by the third and fourth legs to define a closed cross-sectional portion, the third leg secured to the tension web, the fourth leg spaced from the inner panel member.

20. The vehicle body of claim 19, each of the first and second legs of the inner section is arcuate shaped, curved away from the closed cross-sectional portion, the first and second legs adapted to at least partially collapse toward respective top and bottom walls of the inner panel member during a side impact to the structural member.

* * * * *